United States Patent
Proctor, Jr.

(10) Patent No.: US 8,155,096 B1
(45) Date of Patent: Apr. 10, 2012

(54) ANTENNA CONTROL SYSTEM AND METHOD

(75) Inventor: James A. Proctor, Jr., Indiatlantic, FL (US)

(73) Assignee: IPR Licensing Inc., Wilmington, DE (US)

( * ) Notice: Subject to any disclaimer, the term of this patent is extended or adjusted under 35 U.S.C. 154(b) by 1569 days.

(21) Appl. No.: 09/999,172

(22) Filed: Nov. 30, 2001

Related U.S. Application Data

(60) Provisional application No. 60/251,148, filed on Dec. 4, 2000, provisional application No. 60/250,908, filed on Dec. 1, 2000.

(51) Int. Cl.
  *H04B 7/216* (2006.01)
  *H04B 1/00* (2006.01)
  *H04B 7/00* (2006.01)
(52) U.S. Cl. .......... 370/342; 370/335; 455/69; 455/522; 455/562.1
(58) Field of Classification Search ............ 455/69, 455/522, 562.1, 126; 343/734
  See application file for complete search history.

(56) References Cited

U.S. PATENT DOCUMENTS

| | | | |
|---|---|---|---|
| 3,560,978 A | 2/1971 | Himmel et al. | |
| 3,725,938 A | 4/1973 | Black et al. | |
| 3,742,498 A | 6/1973 | Dunn | |
| 3,846,799 A | 11/1974 | Guegen | |
| 3,950,753 A | 4/1976 | Chisholm | |
| 4,021,813 A | 5/1977 | Black et al. | |
| 4,099,184 A | 7/1978 | Rapshys | |
| 4,107,469 A | 8/1978 | Jenkins | |
| 4,170,766 A | 10/1979 | Pridham et al. | |
| 4,260,994 A | 4/1981 | Parker | |
| 4,290,071 A | 9/1981 | Fenwick | |
| 4,387,378 A | 6/1983 | Henderson | |
| 4,448,155 A | 5/1984 | Hillebrand et al. | |
| 4,488,155 A | 12/1984 | Wu | |
| 4,577,316 A | 3/1986 | Schiff | |
| 4,599,733 A | 7/1986 | Gutleber | |
| 4,625,308 A | 11/1986 | Kim et al. | |
| 4,631,546 A | 12/1986 | Dumas et al. | |
| 4,642,806 A | 2/1987 | Hewitt et al. | |
| 4,675,863 A | 6/1987 | Paneth et al. | |

(Continued)

FOREIGN PATENT DOCUMENTS

DE  28 12 575 A1  9/1979

(Continued)

OTHER PUBLICATIONS

Chelouah, A., et al. "Angular Diversity Based on Beam Switching of Circular Arrays for HIPERLAN Terminals," *Electronics Letters*, vol. 36, No. 5, Mar. 2, 2000, pp. 387-388.

(Continued)

*Primary Examiner* — Ayaz Sheikh
*Assistant Examiner* — Blanche Wong
(74) *Attorney, Agent, or Firm* — Volpe and Koenig, P.C.

(57) ABSTRACT

Each of multiple directional transmissions from an antenna array of a subscriber unit are received at a base unit. Based on the detected quality of received signals at the base unit, directional transmissions from the antenna array that produce a higher quality of received signal at the base unit receiver are identified. Feedback messages can be used to notify the subscriber unit which of the directional transmissions are optimal. Consequently, settings of an antenna array at the subscriber unit can be adjusted to support more efficient directional transmissions from the subscriber unit to the base unit.

9 Claims, 5 Drawing Sheets

U.S. PATENT DOCUMENTS

| | | | |
|---|---|---|---|
| 4,700,197 A | 10/1987 | Milne | |
| 4,817,089 A | 3/1989 | Paneth et al. | |
| 4,841,526 A | 6/1989 | Wilson et al. | |
| 4,862,453 A | 8/1989 | West et al. | |
| 4,866,709 A | 9/1989 | West et al. | |
| 4,912,705 A | 3/1990 | Paneth et al. | |
| 4,949,395 A | 8/1990 | Rydbeck | |
| 4,954,950 A | 9/1990 | Freeman et al. | |
| 5,022,024 A | 6/1991 | Paneth et al. | |
| 5,027,125 A | 6/1991 | Tang | |
| 5,027,348 A | 6/1991 | Curry, Jr. | |
| 5,027,400 A | 6/1991 | Baji et al. | |
| 5,038,149 A | 8/1991 | Aubry et al. | |
| 5,056,109 A | 10/1991 | Gilhousen et al. | |
| 5,068,916 A | 11/1991 | Harrison et al. | |
| 5,101,416 A | 3/1992 | Fenton et al. | |
| 5,103,459 A | 4/1992 | Gilhousen et al. | |
| 5,114,375 A | 5/1992 | Wellhausen et al. | |
| 5,115,309 A | 5/1992 | Hang | |
| 5,117,236 A | 5/1992 | Chang et al. | |
| 5,124,981 A | 6/1992 | Golding | |
| 5,130,983 A | 7/1992 | Heffner, III | |
| 5,166,929 A | 11/1992 | Lo | |
| 5,226,044 A | 7/1993 | Gupta et al. | |
| 5,235,343 A | 8/1993 | Audren et al. | |
| 5,257,283 A | 10/1993 | Gilhousen et al. | |
| 5,267,262 A | 11/1993 | Wheatley, III | |
| 5,268,900 A | 12/1993 | Hluchyj et al. | |
| 5,280,472 A | 1/1994 | Gilhousen et al. | |
| 5,282,222 A | 1/1994 | Fattouche et al. | |
| 5,293,172 A | 3/1994 | Lamberty et al. | |
| 5,294,939 A | 3/1994 | Sanford et al. | |
| 5,303,240 A * | 4/1994 | Borras et al. | 370/347 |
| 5,325,394 A | 6/1994 | Bruckert | |
| 5,325,419 A | 6/1994 | Connolly et al. | |
| 5,337,316 A * | 8/1994 | Weiss et al. | 714/716 |
| 5,339,316 A | 8/1994 | Diepstraten | |
| 5,353,332 A | 10/1994 | Raith et al. | |
| 5,355,374 A | 11/1994 | Hester et al. | |
| 5,373,502 A | 12/1994 | Turban | |
| 5,375,124 A | 12/1994 | D'Ambrogio et al. | |
| 5,377,192 A | 12/1994 | Gooding et al. | |
| 5,388,102 A | 2/1995 | Griffith et al. | |
| 5,394,473 A | 2/1995 | Davidson | |
| 5,412,429 A | 5/1995 | Glover | |
| 5,414,728 A | 5/1995 | Zehavi | |
| 5,422,887 A | 6/1995 | Diepstraten et al. | |
| 5,430,452 A | 7/1995 | DuBois | |
| 5,437,055 A | 7/1995 | Wheatley, III | |
| 5,442,625 A | 8/1995 | Gitlin et al. | |
| 5,446,727 A | 8/1995 | Bruckert et al. | |
| 5,463,629 A | 10/1995 | Ko | |
| 5,471,463 A | 11/1995 | Hulbert | |
| 5,479,176 A | 12/1995 | Zavrel, Jr. | |
| 5,481,533 A | 1/1996 | Honig et al. | |
| 5,487,180 A | 1/1996 | Ohtake | |
| 5,490,136 A | 2/1996 | Sereno et al. | |
| 5,493,569 A | 2/1996 | Buchholz et al. | |
| 5,502,447 A | 3/1996 | Kumpfbeck et al. | |
| 5,511,068 A | 4/1996 | Sato | |
| 5,537,397 A | 7/1996 | Abramson | |
| 5,537,414 A | 7/1996 | Takiyasu et al. | |
| 5,550,828 A | 8/1996 | Gries et al. | |
| 5,559,789 A | 9/1996 | Nakano et al. | |
| 5,577,022 A | 11/1996 | Padovani et al. | |
| 5,581,575 A | 12/1996 | Zehavi et al. | |
| 5,585,850 A | 12/1996 | Schwaller | |
| 5,586,119 A | 12/1996 | Scribano et al. | |
| 5,590,409 A | 12/1996 | Sawahashi et al. | |
| 5,592,178 A | 1/1997 | Chang et al. | |
| 5,592,468 A | 1/1997 | Sato | |
| 5,592,470 A | 1/1997 | Rudrapatna et al. | |
| 5,592,471 A | 1/1997 | Briskman | |
| 5,598,416 A | 1/1997 | Yamada et al. | |
| 5,598,417 A | 1/1997 | Crisler et al. | |
| 5,606,580 A | 2/1997 | Mourot et al. | |
| 5,617,102 A | 4/1997 | Prater | |
| 5,617,423 A | 4/1997 | Li et al. | |
| 5,619,492 A | 4/1997 | Press et al. | |
| 5,619,524 A | 4/1997 | Ling et al. | |
| 5,621,752 A | 4/1997 | Antonio et al. | |
| 5,634,199 A | 5/1997 | Gerlach et al. | |
| 5,642,348 A | 6/1997 | Barzegar et al. | |
| 5,642,377 A | 6/1997 | Chung et al. | |
| 5,652,764 A | 7/1997 | Kanzaki et al. | |
| 5,655,001 A | 8/1997 | Cline et al. | |
| 5,657,326 A | 8/1997 | Burns et al. | |
| 5,657,358 A | 8/1997 | Panech et al. | |
| 5,663,958 A | 9/1997 | Ward | |
| 5,663,990 A | 9/1997 | Bolgiano et al. | |
| 5,673,259 A | 9/1997 | Quick, Jr. | |
| 5,680,142 A | 10/1997 | Smith et al. | |
| 5,684,794 A | 11/1997 | Lopez et al. | |
| 5,687,194 A | 11/1997 | Paneth et al. | |
| 5,689,502 A | 11/1997 | Scott | |
| 5,604,730 A | 12/1997 | Tiedemann, Jr. | |
| 5,697,059 A | 12/1997 | Carney | |
| 5,699,364 A | 12/1997 | Sato et al. | |
| 5,708,656 A | 1/1998 | Noneman et al. | |
| 5,712,869 A | 1/1998 | Lee et al. | |
| 5,715,236 A | 2/1998 | Gilhousen et al. | |
| 5,726,981 A | 3/1998 | Ylitervo et al. | |
| 5,734,646 A | 3/1998 | I et al. | |
| 5,739,784 A | 4/1998 | Jan et al. | |
| 5,742,592 A | 4/1998 | Scholefield et al. | |
| 5,745,484 A | 4/1998 | Scott | |
| 5,758,288 A | 5/1998 | Dunn et al. | |
| 5,764,648 A | 6/1998 | Yamane et al. | |
| 5,767,807 A | 6/1998 | Pritchett | |
| 5,781,542 A | 7/1998 | Tanaka et al. | |
| 5,781,543 A | 7/1998 | Ault et al. | |
| 5,784,406 A | 7/1998 | DeJaco et al. | |
| 5,790,549 A | 8/1998 | Dent | |
| 5,790,551 A | 8/1998 | Chan | |
| 5,793,744 A | 8/1998 | Kanerva et al. | |
| 5,802,046 A | 9/1998 | Scott | |
| 5,802,465 A | 9/1998 | Hamalainen et al. | |
| 5,805,994 A | 9/1998 | Perreault et al. | |
| 5,812,131 A | 9/1998 | Bertram | |
| 5,825,807 A | 10/1998 | Kumar | |
| 5,828,659 A | 10/1998 | Teder et al. | |
| 5,828,662 A | 10/1998 | Jalali et al. | |
| 5,838,720 A | 11/1998 | Morelli | |
| 5,841,768 A | 11/1998 | Ozluturk et al. | |
| 5,844,894 A | 12/1998 | Dent | |
| 5,845,211 A | 12/1998 | Roach | |
| 5,854,786 A | 12/1998 | Henderson et al. | |
| 5,856,971 A | 1/1999 | Gitlin et al. | |
| 5,859,840 A | 1/1999 | Tiedemann, Jr. et al. | |
| 5,859,879 A | 1/1999 | Bolgiano et al. | |
| 5,862,476 A | 1/1999 | Hasegawa | |
| 5,867,527 A | 2/1999 | Ziv et al. | |
| 5,872,786 A | 2/1999 | Shobatake | |
| 5,873,043 A | 2/1999 | Comer | |
| 5,881,060 A | 3/1999 | Morrow et al. | |
| 5,881,368 A | 3/1999 | Grob et al. | |
| 5,884,196 A | 3/1999 | Lekven et al. | |
| 5,892,774 A | 4/1999 | Zehavi et al. | |
| 5,893,035 A | 4/1999 | Chen | |
| 5,894,473 A | 4/1999 | Dent | |
| 5,896,376 A | 4/1999 | Alperovich et al. | |
| 5,898,929 A | 4/1999 | Haartsen | |
| 5,903,834 A | 5/1999 | Wallstedt et al. | |
| 5,905,473 A | 5/1999 | Taenzer | |
| 6,069,880 A | 5/1999 | Owen et al. | |
| 5,910,944 A | 6/1999 | Callicotte et al. | |
| 5,910,945 A | 6/1999 | Garrison et al. | |
| 5,914,950 A | 6/1999 | Tiedemann, Jr. et al. | |
| 5,915,216 A | 6/1999 | Lysejko | |
| 5,923,650 A | 7/1999 | Chen et al. | |
| 5,926,500 A | 7/1999 | Odenwalder | |
| 5,930,230 A | 7/1999 | Odenwalder et al. | |
| 5,933,781 A | 8/1999 | Willenegger et al. | |
| 5,943,362 A | 8/1999 | Saito | |
| 5,946,356 A | 8/1999 | Felix et al. | |
| 5,949,814 A | 9/1999 | Odenwalder et al. | |
| 5,950,131 A | 9/1999 | Vilmur | |

| Patent No. | Date | Inventor(s) |
|---|---|---|
| 5,956,332 A | 9/1999 | Rasanen et al. |
| 5,959,980 A | 9/1999 | Scott |
| 5,960,361 A | 9/1999 | Chen |
| 5,963,559 A | 10/1999 | Ohki |
| 5,966,374 A | 10/1999 | Rasanen |
| 5,974,036 A | 10/1999 | Acharya et al. |
| 5,982,760 A | 11/1999 | Chen |
| 5,990,806 A | 11/1999 | Mock et al. |
| 5,991,279 A | 11/1999 | Haugli et al. |
| 5,991,284 A | 11/1999 | Willenegger et al. |
| 5,991,618 A | 11/1999 | Hall |
| 6,001,800 A | 12/1999 | Mehta et al. |
| 6,002,690 A | 12/1999 | Takayama et al. |
| 6,005,852 A | 12/1999 | Kokko et al. |
| 6,005,855 A | 12/1999 | Zehavi et al. |
| 6,009,106 A | 12/1999 | Rustad et al. |
| 6,011,800 A | 1/2000 | Nadgauda et al. |
| 6,016,312 A | 1/2000 | Storn et al. |
| 6,028,868 A | 2/2000 | Yeung et al. |
| 6,031,827 A | 2/2000 | Rikkinen et al. |
| 6,031,832 A | 2/2000 | Turina |
| 6,034,638 A | 3/2000 | Thiel et al. |
| 6,037,905 A | 3/2000 | Koscica et al. |
| 6,038,450 A | 3/2000 | Brink et al. |
| 6,049,535 A | 4/2000 | Ozukturk |
| 6,049,538 A | 4/2000 | Scott |
| 6,052,385 A | 4/2000 | Kanerva et al. |
| 6,058,338 A | 5/2000 | Agashe et al. |
| 6,064,678 A | 5/2000 | Sindhushayana et al. |
| 6,069,883 A | 5/2000 | Ejzak et al. |
| 6,070,071 A * | 5/2000 | Chavez et al. ............ 455/422.1 |
| 6,075,974 A | 6/2000 | Saints et al. |
| 6,078,572 A | 6/2000 | Tanno et al. |
| 6,081,536 A | 6/2000 | Gorsuch et al. |
| 6,088,324 A * | 7/2000 | Sato .............................. 370/203 |
| 6,088,335 A | 7/2000 | I et al. |
| 6,094,421 A | 7/2000 | Scott |
| 6,094,576 A | 7/2000 | Häkkinen et al. |
| 6,097,733 A | 8/2000 | Basu et al. |
| 6,097,972 A | 8/2000 | Saints et al. |
| 6,100,843 A | 8/2000 | Proctor, Jr. et al. |
| 6,101,176 A | 8/2000 | Honkasalo et al. |
| 6,101,179 A | 8/2000 | Soliman |
| 6,104,708 A | 8/2000 | Bergamo |
| 6,111,863 A | 8/2000 | Rostoker et al. |
| 6,112,092 A | 8/2000 | Benveniste |
| 6,115,370 A | 9/2000 | Struhsaker et al. |
| 6,118,767 A | 9/2000 | Shen et al. |
| 6,134,233 A | 10/2000 | Kay |
| 6,151,332 A | 11/2000 | Gorsuch et al. |
| 6,157,616 A | 12/2000 | Whitehead |
| 6,157,619 A | 12/2000 | Ozluturk et al. |
| 6,161,013 A | 12/2000 | Anderson et al. |
| 6,163,707 A | 12/2000 | Miller |
| 6,169,731 B1 | 1/2001 | Stewart et al. |
| 6,169,759 B1 | 1/2001 | Kanterakis et al. |
| 6,185,184 B1 | 2/2001 | Mattaway et al. |
| 6,185,266 B1 * | 2/2001 | Kuchi et al. ................... 375/347 |
| 6,188,678 B1 | 2/2001 | Prescott |
| 6,188,903 B1 | 2/2001 | Gardner et al. |
| 6,196,362 B1 | 2/2001 | Darcie et al. |
| 6,198,723 B1 | 3/2001 | Parruck et al. |
| 6,201,966 B1 | 3/2001 | Rinne et al. |
| 6,208,871 B1 | 3/2001 | Hall et al. |
| 6,212,175 B1 | 4/2001 | Harsch |
| 6,212,220 B1 | 4/2001 | Proctor, Jr. et al. |
| 6,215,798 B1 | 4/2001 | Carneheim et al. |
| 6,219,342 B1 | 4/2001 | Rege |
| 6,222,828 B1 | 4/2001 | Ohlson et al. |
| 6,222,832 B1 | 4/2001 | Proctor, Jr. |
| 6,222,873 B1 | 4/2001 | Bang et al. |
| 6,226,279 B1 | 5/2001 | Hansson et al. |
| 6,226,527 B1 | 5/2001 | Dalsgaard et al. |
| 6,233,439 B1 | 5/2001 | Jalali |
| 6,236,646 B1 | 5/2001 | Beming et al. |
| 6,236,647 B1 | 5/2001 | Amalfitano |
| 6,236,674 B1 | 5/2001 | Morelli et al. |
| 6,243,372 B1 | 6/2001 | Petch et al. |
| 6,246,673 B1 | 6/2001 | Tiedemann et al. |
| 6,246,715 B1 | 6/2001 | Park et al. |
| RE37,301 E | 7/2001 | Lo |
| 6,256,509 B1 | 7/2001 | Tanaka et al. |
| 6,259,683 B1 | 7/2001 | Sekine et al. |
| 6,262,980 B1 | 7/2001 | Leung et al. |
| 6,263,013 B1 | 7/2001 | Hendrickson |
| 6,269,075 B1 | 7/2001 | Tran |
| 6,269,088 B1 | 7/2001 | Masui et al. |
| 6,272,168 B1 | 8/2001 | Lomp et al. |
| 6,272,354 B1 | 8/2001 | Saaroi |
| 6,275,478 B1 | 8/2001 | Tiedemann, Jr. |
| 6,278,701 B1 | 8/2001 | Ayyagari et al. |
| 6,285,665 B1 | 9/2001 | Chuah |
| 6,292,474 B1 | 9/2001 | Ali et al. |
| 6,301,286 B1 | 10/2001 | Kanterakis et al. |
| 6,301,291 B1 | 10/2001 | Rouphael et al. |
| 6,304,215 B1 | 10/2001 | Proctor, Jr. et al. |
| 6,307,840 B1 | 10/2001 | Wheatley, III et al. |
| 6,310,859 B1 | 10/2001 | Morita et al. |
| 6,314,300 B1 | 11/2001 | Nakashima et al. |
| 6,317,092 B1 | 11/2001 | de Schweinitz et al. |
| 6,320,851 B1 | 11/2001 | Kim et al. |
| 6,332,008 B1 | 12/2001 | Giallorenzi et al. |
| 6,337,668 B1 | 1/2002 | Ito et al. |
| 6,353,412 B1 | 3/2002 | Soliman |
| 6,353,645 B1 | 3/2002 | Solve et al. |
| 6,356,555 B1 | 3/2002 | Rakib et al. |
| 6,366,570 B1 | 4/2002 | Bhagalia |
| 6,366,786 B1 | 4/2002 | Norman et al. |
| 6,370,117 B1 | 4/2002 | Koraitim et al. |
| 6,373,830 B1 | 4/2002 | Ozluturk |
| 6,373,834 B1 | 4/2002 | Lundh et al. |
| 6,377,548 B1 | 4/2002 | Chuah |
| 6,377,809 B1 | 4/2002 | Rezaiifar et al. |
| 6,388,997 B1 | 5/2002 | Scott |
| 6,388,999 B1 | 5/2002 | Gorsuch et al. |
| 6,389,000 B1 | 5/2002 | Jou |
| 6,396,804 B2 | 5/2002 | Odenwalder |
| 6,396,823 B1 | 5/2002 | Park et al. |
| 6,414,947 B1 | 7/2002 | Legg et al. |
| 6,418,148 B1 | 7/2002 | Kumar et al. |
| 6,424,645 B1 | 7/2002 | Kawabata et al. |
| 6,426,960 B2 | 7/2002 | Antonio |
| 6,452,911 B1 | 9/2002 | Seo |
| 6,452,913 B1 | 9/2002 | Proctor, Jr. |
| 6,453,176 B1 * | 9/2002 | Lopes et al. ................ 455/562.1 |
| 6,456,608 B1 | 9/2002 | Lomp |
| 6,466,800 B1 | 10/2002 | Sydon et al. |
| 6,469,991 B1 | 10/2002 | Chuah |
| 6,473,623 B1 | 10/2002 | Benveniste |
| 6,483,816 B2 | 11/2002 | Tsunehara et al. |
| 6,490,461 B1 * | 12/2002 | Muller .......................... 455/522 |
| 6,498,785 B1 | 12/2002 | Derryberry et al. |
| 6,498,790 B1 | 12/2002 | Shaheen et al. |
| 6,498,939 B1 * | 12/2002 | Thomas ..................... 455/562.1 |
| 6,501,787 B1 | 12/2002 | Odenwalder et al. |
| 6,504,830 B1 | 1/2003 | Östberg et al. |
| 6,512,751 B1 | 1/2003 | Struhsaker et al. |
| 6,512,931 B1 | 1/2003 | Kim et al. |
| 6,519,452 B1 | 2/2003 | Agostino et al. |
| 6,519,651 B1 | 2/2003 | Dillon |
| 6,522,639 B1 | 2/2003 | Kitade et al. |
| 6,526,039 B1 | 2/2003 | Dahlman et al. |
| 6,526,064 B1 | 2/2003 | Bousquet |
| 6,526,281 B1 | 2/2003 | Gorsuch et al. |
| 6,532,226 B1 | 3/2003 | Lehtinen et al. |
| 6,532,365 B1 | 3/2003 | Anderson et al. |
| 6,535,545 B1 | 3/2003 | Ben-Bassat et al. |
| 6,542,481 B2 | 4/2003 | Foore et al. |
| 6,545,986 B1 | 4/2003 | Stellakis |
| 6,545,994 B2 | 4/2003 | Nelson et al. |
| 6,546,252 B1 * | 4/2003 | Jetzek et al. ................... 455/437 |
| 6,563,808 B1 | 5/2003 | Cox et al. |
| 6,567,391 B1 | 5/2003 | Moon |
| 6,567,416 B1 | 5/2003 | Chuah |
| 6,567,670 B1 * | 5/2003 | Petersson ...................... 455/522 |
| 6,570,865 B2 | 5/2003 | Masui et al. |
| 6,571,296 B1 | 5/2003 | Dillon |
| 6,574,211 B2 | 6/2003 | Padovani et al. |

| | | |
|---|---|---|
| 6,587,446 B2 | 7/2003 | Sarkar et al. |
| 6,597,913 B2 | 7/2003 | Natarajan |
| 6,611,231 B2 | 8/2003 | Crilly et al. |
| 6,611,514 B1 | 8/2003 | Moulsley |
| 6,621,807 B1 | 9/2003 | Jung et al. |
| 6,621,808 B1* | 9/2003 | Sadri .................. 370/335 |
| 6,628,945 B1 | 9/2003 | Koorapaty et al. |
| 6,633,554 B1 | 10/2003 | Dalal |
| 6,647,000 B1 | 11/2003 | Persson et al. |
| 6,674,739 B1 | 1/2004 | Lee et al. |
| 6,687,509 B2 | 2/2004 | Schmutz et al. |
| 6,690,652 B1* | 2/2004 | Sadri .................. 370/252 |
| 6,690,938 B1 | 2/2004 | Chin |
| 6,697,642 B1* | 2/2004 | Thomas ............ 455/562.1 |
| 6,707,804 B2 | 3/2004 | Proctor, Jr. |
| 6,707,806 B1 | 3/2004 | Kato |
| 6,717,916 B1 | 4/2004 | Ahn et al. |
| 6,718,180 B1* | 4/2004 | Lundh et al. ............ 455/522 |
| 6,724,740 B1 | 4/2004 | Choi et al. |
| 6,724,743 B1 | 4/2004 | Pigeonnat |
| 6,731,954 B1* | 5/2004 | Katz .................. 455/562.1 |
| 6,735,188 B1 | 5/2004 | Becker et al. |
| 6,760,596 B1* | 7/2004 | Fiorini et al. ............ 455/522 |
| 6,768,727 B1 | 7/2004 | Sourour et al. |
| 6,775,558 B1 | 8/2004 | Ranta et al. |
| 6,782,277 B1* | 8/2004 | Chen et al. ............ 342/359 |
| 6,785,247 B1* | 8/2004 | Lee .................. 370/311 |
| 6,788,661 B1* | 9/2004 | Ylitalo et al. ............ 370/334 |
| 6,795,416 B1 | 9/2004 | Han et al. |
| 6,804,219 B2 | 10/2004 | Koo et al. |
| 6,807,221 B1 | 10/2004 | Kim et al. |
| 6,826,169 B1 | 11/2004 | Nagatani et al. |
| 6,831,910 B1 | 12/2004 | Moon et al. |
| 6,845,089 B1 | 1/2005 | Gu et al. |
| 6,868,075 B1* | 3/2005 | Narvinger et al. ............ 370/335 |
| 6,925,068 B1 | 8/2005 | Stanwood et al. |
| 6,931,252 B1* | 8/2005 | Aroudaki ............ 455/446 |
| 6,934,319 B2 | 8/2005 | Subramanian |
| 6,940,845 B2* | 9/2005 | Benveniste ............ 370/349 |
| 6,954,444 B2 | 10/2005 | Ji et al. |
| 6,956,840 B1 | 10/2005 | Proctor, Jr. |
| 6,963,540 B2 | 11/2005 | Choi et al. |
| 6,977,910 B1* | 12/2005 | Hosur et al. ............ 370/318 |
| 6,999,471 B1 | 2/2006 | Frazer et al. |
| 7,027,420 B2 | 4/2006 | Hamalainen |
| 7,046,717 B2 | 5/2006 | Kanterakis et al. |
| 7,079,507 B2 | 7/2006 | Toskala et al. |
| 7,079,523 B2 | 7/2006 | Nelson, Jr. et al. |
| 7,092,372 B1 | 8/2006 | Jensen et al. |
| 7,099,629 B1 | 8/2006 | Bender |
| 7,136,377 B1 | 11/2006 | Tweedly et al. |
| 7,158,504 B2 | 1/2007 | Kadaba et al. |
| 7,218,623 B1 | 5/2007 | Proctor, Jr. |
| 7,221,664 B2 | 5/2007 | Proctor, Jr. |
| 7,224,683 B1 | 5/2007 | Marque-Pucheu et al. |
| 7,236,467 B2* | 6/2007 | Kono .................. 370/320 |
| 7,266,107 B2 | 9/2007 | Choi et al. |
| 7,340,256 B2 | 3/2008 | Speight |
| 2001/0030990 A1 | 10/2001 | Rouphael et al. |
| 2001/0033558 A1 | 10/2001 | Matsuki |
| 2001/0036200 A1 | 11/2001 | Nelson et al. |
| 2001/0038674 A1 | 11/2001 | Trans |
| 2001/0039191 A1 | 11/2001 | Maierhofer |
| 2002/0009061 A1* | 1/2002 | Willenegger ............ 370/328 |
| 2002/0012332 A1 | 1/2002 | Tiedemann et al. |
| 2002/0045441 A1 | 4/2002 | Ralston et al. |
| 2002/0080024 A1 | 6/2002 | Nelson et al. |
| 2002/0097700 A1 | 7/2002 | Alastalo |
| 2002/0141478 A1 | 10/2002 | Ozluturk et al. |
| 2003/0060224 A1* | 3/2003 | Nelson et al. ............ 455/522 |
| 2003/0095517 A1 | 5/2003 | Proctor, Jr. |
| 2003/0123401 A1 | 7/2003 | Dean |
| 2004/0005078 A1 | 1/2004 | Tillotson |
| 2004/0009785 A1* | 1/2004 | Nelson et al. ............ 455/522 |
| 2004/0047328 A1 | 3/2004 | Proctor et al. |
| 2004/0073803 A1 | 4/2004 | Keramane |
| 2004/0160910 A1 | 8/2004 | Gorsuch et al. |
| 2004/0180696 A1 | 9/2004 | Foore et al. |
| 2005/0202823 A1 | 9/2005 | Shaheen et al. |
| 2005/0208961 A1* | 9/2005 | Willenegger ............ 455/522 |
| 2008/0225766 A1 | 9/2008 | Roy et al. |

FOREIGN PATENT DOCUMENTS

| | | |
|---|---|---|
| DE | 2812575 | 9/1979 |
| EP | 0 443 061 | 8/1991 |
| EP | 0 526 106 | 2/1993 |
| EP | 0 682 423 | 11/1995 |
| EP | 0 682 426 | 11/1995 |
| EP | 0 719 062 | 6/1996 |
| EP | 0 720 309 | 7/1996 |
| EP | 0 475 698 | 3/1997 |
| EP | 0 760 564 | 3/1997 |
| EP | 0 773 636 | 5/1997 |
| EP | 0 808 074 | 11/1997 |
| EP | 0 910 176 | 4/1999 |
| EP | 0 959 851 | 11/1999 |
| EP | 1 018 809 | 12/2000 |
| EP | 1 102 512 | 5/2001 |
| EP | 0 907 262 | 8/2005 |
| GB | 2 326 524 | 12/1998 |
| JP | 59-050603 | 3/1984 |
| JP | 59050603 | 3/1984 |
| JP | 02-177643 | 7/1990 |
| JP | 03-049324 | 3/1991 |
| JP | 04-284033 | 10/1992 |
| JP | 05-030006 | 2/1993 |
| JP | 07-067164 | 3/1995 |
| JP | 07-095151 | 4/1995 |
| JP | 07-131398 | 5/1995 |
| JP | 07-264098 | 10/1995 |
| JP | 08-065273 | 3/1996 |
| JP | 08-242482 | 9/1996 |
| JP | 09-023203 | 1/1997 |
| JP | 09-046270 | 2/1997 |
| JP | 09-055693 | 2/1997 |
| JP | 2000-013867 | 1/2000 |
| JP | 2000-188597 | 7/2000 |
| TW | 566045 | 12/2003 |
| TW | 200536325 | 11/2005 |
| WO | 93/15573 | 8/1993 |
| WO | 95/08900 | 3/1995 |
| WO | 96/08934 | 3/1996 |
| WO | 96/19050 | 6/1996 |
| WO | 96/37081 | 11/1996 |
| WO | 96/27994 | 12/1996 |
| WO | 97/46041 | 4/1997 |
| WO | 97/23073 | 6/1997 |
| WO | 97/26726 | 7/1997 |
| WO | 97/32412 | 9/1997 |
| WO | 97/46044 | 12/1997 |
| WO | 98/09455 | 3/1998 |
| WO | 99/14869 | 3/1999 |
| WO | 99/25125 | 5/1999 |
| WO | 99/31811 | 6/1999 |
| WO | 99/52306 | 10/1999 |
| WO | 99/63382 | 12/1999 |
| WO | 99/63682 | 12/1999 |
| WO | 00/72464 | 11/2000 |
| WO | WO 00/72464 | * 11/2000 |

OTHER PUBLICATIONS

Durnan, G.J., et al., "Switched Parasitic Feeds for Parabolic Antenna Angle Diversity," *Microwave and Optical Tech. Letters*, vol. 23, No. 4, Nov. 20, 1999, pp. 200-203.

Durnan, G.J., et al., "Optimization of Microwave Parabolic Antenna Systems Using Switched Parasitic Feed Structures," URSI National Science Meeting, Boulder, CO, Jan. 4-8, 2000, p. 323.

Giger, A.J., *Low-Angle Microwave Propagation: Physics and Modeling*, Norwood, MA: Artech House, 1991.

Harrington, R.F., "Reactively Controlled Antenna Arrays," *IEEE APS International Symposium Digest*, Amherst, MA Oct. 1976, pp. 62-65.

Harrington, R. F. "Reactively Controlled Directive Arrays," *IEEE Trans. Antennas and Propagation*, vol. AP-26, No. 3, May 1978, pp. 390-395.

James, J.R. et al., "Electrically Short Monopole Antennas with Dielectric or Ferrite Coatings," *Proc. IEEE*, vol. 125, Sep. 1978, pp. 793-803.

James, J.R., et al., "Reduction of Antenna Dimensions with Dielectric Loading," *Electronics Letters*, vol. 10, No. 13, May 1974, pp. 263-265.

King, R.W.P., "The Many Faces of the Insulated Antenna," *Proc. IEEE*, vol. 64, No. 2, Feb. 1976, pp. 228-238.

Kingsley, S.P., et al., "Beam Steering and Monopulse Processing of Probe-Fed Dielectric Resonator Antennas," *IEEE Proc. -Radar, Sonar Navig.*, vol. 146, No. 3, Jun. 1999, pp. 121-125.

Knight, P., "Low-Frequency Behaviour of the Beverage Aerial," *Electronics Letters*, vol. 13, No. 1, Jan. 1977, pp. 21-22.

Long, S. A., et al., "The Resonant Cylindrical Dielectric Cavity Antenna," *IEEE Trans. Antennas and Propagation*, vol. AP-31, No. 3, May 1983, pp. 406-412.

Lu, J., et al., "Multi-beam Switched Parasitic Antenna Embedded in Dielectric for Wireless Communications Systems," *Electronics Letters*, vol. 37, No. 14, Jul. 5, 2001, pp. 871-872.

Luzwick, J., et al., "A Reactively Loaded Aperture Antenna Array," *IEEE Trans. Antennas and Propagation*, vol. AP-26, No. 4, Jul. 1978, pp. 543-547.

Milne, R.M.T., "A Small Adaptive Array Antenna for Mobile Communications," *IEEE APS International Symposium Digest*, 1985, pp. 797-800.

McAllister, M.W. et al., "Resonant Hemispherical Dielectric Antenna," *Electronics Letters*, vol. 20, No. 16, Aug. 1984, pp. 657-659.

McAllister, M.E. et al., "Rectangular Dielectric Resonator Antenna," *Electronics Letters*, vol. 19, No. 6, Mar. 1983, pp. 218-219.

Preston, S., et al., "Direction Finding Using a Switched Parasitic Antenna Array," *IEEE APS International Symposium Digest*, Montreal, Canada, 1997, pp. 1024-1027.

Preston, S.L., et al., "Base-Station Tracking in Mobile Communications Using a Switched Parasitic Antenna Array," *IEEE Trans. Antennas and Propagation*, vol. 46, No. 6, Jun. 1998, pp. 841-844.

Preston, S.L., et al., "Systemic Approach to the Design of Directional Antennas Using Switched Parasitic and Switched Active Elements," *Asia Pacific Microwave Conference Proceedings*, Yokohama, Japan, 1998, pp. 531-534.

Preston, S.L., et al., "Size Reduction of Switched Parasitic Directional Antennas Using Genetic Algorithm Optimisation Techniques," *Asia Pacific Microwave Conference Proceedings*, Yokohama, Japan, 1998, pp. 1401-1404.

Preston, S.L., et al., "A Multibeam Antenna Using Switched Parasitic and Switched Active Elements for Space-Division Multiple Access Applications," *IEICE Trans. Electron.*, vol. E82-C, No. 7, Jul. 1999, pp. 1202-1210.

Preston, S.L., et al., "Electronic Beam Steering Using Switched Parasitic Patch Elements," *Electronics Letters*, vol. 33, No. 1, Jan. 2, 1997, pp. 7-8.

Ruze, J., "Lateral-Feed Displacement in a Paraboloid," *IEEE Trans. Antennas and Propagation*, vol. 13, 1965, pp. 660-665.

Scott, N.L., et al., "Diversity Gain from a Single-Port Adaptive Antenna Using Switched Parasitic Elements Illustrated with a Wire and Monopole Prototype," *IEEE Trans. Antennas and Propagation*, vol. 47, No. 6, Jun. 1999, pp. 1066-1070.

Sibille, A., et al., "Circular Switched Monopole Arrays for Beam Steering Wireless Communications," *Electronics Letters*, vol. 33, No. 7, Mar. 1997, pp. 551-552.

Vaughn, R., "Switched Parasitic Elements for Antenna Diversity," *IEEE Trans. Antennas and Propagation*, vol. 47, No. 2, Feb. 1999, pp. 399-405.

Chelouah, A., et al., "Angular Diversity Based on Beam Switching of Circular Arrays for Hiperlan Terminals," *Electronics Letters*, vol. 36, vol. 36, No. 5, pp. 387-388, (Mar. 2, 2000).

Durnan, G.J., et al., "Switched Parasitic Feeds for Parabolic Antenna Angle Diversity," *Microwave and Optical Tech. Letters*, vol. 23, No. 4, pp. 200-2003(Nov. 20, 1999).

Durnan, G.J., et al. "Optimization of Microwave Parabolic Antenna Systems Using Switched Parasitic Feed Structures," URSI National Science Meeting, Boulder, CO, p. 323, (Jan. 4-8, 2000).

Giger, A.J., *Low-Angle Microwave Propagation: Physics and Modeling*, Norwood, MA, Artech House, (1991).

Harrington, R.F., "Reactively Controlled Antenna Arrays," *IEEE APS International Symposium Digest*, Amherst, MA, pp. 62-65, (Oct. 1976).

Harrington, R.F., "Reactively Controlled Directive Arrays," *IEEE Trans. Antennas and Propagation*, vol. AP-26, No. 3, pp. 390-395, (May 1978).

James , J.R. et al., "Electrically Short Monopole Antennas with Dielectric or Ferrite Coatings," Proc. IEEE, vol. 125, pp. 793-803, (Sep. 1978).

James, J.R., et al., "Reduction of Antenna Dimensions with Dielectric Loading," *Electronics Letters*, vol. 10, No. 13, pp. 263-265, (May 1974).

King, R.W.P., "The Many Faces of the Insulated Antenna," Proc. IEEE, vol. 64, No. 2, pp. 228-238, (Feb. 1976).

Kingsley, S.P., et al., "Beam Steering and Monopulse Processing of Probe-Fed Dielectric Resonator Antennas," *IEEE Proc.-Radar, Sonar, Navigation*,vol. 146, No. 3, pp. 121-125, (Jun. 1999).

Knight, P., "Low-Frequency Behavior of the Beverage Aerial," *Electronics Letter*, vol. 13, No. 1, pp. 21-22, (Jan. 1977).

Long, S.A., et al., "The Resonant Cylindrical Dielectric Cavity Antenna," *IEEE Trans. Antennas and Propagation*, vol. AP-31, No. 3, pp. 406-412, (May 1983).

Lu, J., et al., "Multi-beam Switched Parasitic Antenna Embedded in Dielectric for Wireless Communications Systems," *Electronics Letters*, vol. 37, No. 14, pp. 871-872, (Jul. 5, 2001).

Luzwick, J., et al., "A Reactively Loaded Aperture Antenna Array," *IEEE Trans. Antennas and Propagation*, vol. AP-26, No. 4, pp. 543-547, (Jul. 1978).

Milne, R.M.T., "A Small Adaptive Array Antenna for Mobile Communications," *IEEE APS International Symposium Digest*, pp. 797-800, (1985).

McCallister, M.W. et al., "Resonant Hemispherical Dielectric Antenna," *Electronics Letters*, vol. 20, No. 16, pp. 657-659, (Aug. 1984).

McCallister, M.W., et al., "Rectangular Diaelectric Resonator Antenna," *Electronics Letter*, vol. 19, No. 6, pp. 218-219, (Mar. 1983).

Preston, S., et al., "Directin Finding Using a Switched Parasitic Antenna Array," *IEEE APS International Symposium Digest*, Montreal, Canada, pp. 1024-1027, (1997).

Preston, S.L., et al., "Base-Station Tracking in Mobil Communications using a Switched Parasitic Antenna Array," *IEEE Trans. Antennas and Propagation*, vol. 46, No. 6, pp. 841-844, (Jun. 1998).

Preston, S.L., et al., "Systematic Approach to the Design of Directional Antennas Using Switched Parasitic and Switched Active Elements," *Asia Pacific Microwave Conference Proceedings*, Yokohama, Japan, pp. 531-534, (1998).

Preston, S.L., et al., "Size Reduction of Switched Parasitic Directional Antennas Using Genetic Algorithm Optimization Technoques," *Asia Pacific Microwave Conference Proceedings*, Yokohama, Japan, pp. 1401-1404, (1998).

Preston, S.L., et al., "A Multibeam Antenna Using Switched Parasitic and Switched Active Elements for Space-Division multiple Access Applications" *IEICE Trans. Electron.*, vol. E82-C, No. 7, pp. 1202-1210, (Jul. 1999).

Preston, S.L., et al., "Electronic Beam Steering Using Switched Parasitic Patch Elements," *Electronics Letters*, vol. 33, No. 1, pp. 7-8, (Jan. 2, 1997).

Ruze, J., "Lateral-Feed Displacement in a Paraboloid," *IEEE Trans. Antennas and Propagation*, vol. 13, pp. 660-665, (1965).

Scott, N.L., et al., "Diversity Gain from a Single-Port Adaptive Antenna Using Swirched Parasitic Elements Illustrated with Wire and Monopole Prototype," *IEEE Trans. Antennas and Propagation*, vol. 47, No. 6, pp. 1066-1070, (Jun. 1999).

Sinille, A., et al., "Circular Switched Monopole Arrays for beam Steering Wireless Communications," *Electronics Letters*, vol. 33, No. 7, pp. 551-552, (Mar. 1997).

Vaughn, R., "Switched Parasitic Elements for Antenna Diversity," *IEEE Trans. Antennas and Propagation*, vol. 47, No. 2, pp. 399-405, (Feb. 1999).

Budka et al., Cellular Digital Packet Data Networks, Bell Labs Technical Journal, Summer 1997, pp. 164-181.
Chung et al. Packet Synchronization and Identification for Incremental Redundancy Transmission in FH-CDMA Systems, 1992, IEEE, pp. 292-295.
*Data Service Options for Wideband Spread Spectrum Systems.* TIA/EIA Interim Standard. TIA/EIA/IS-707-A. Apr. 1999.
Data Service Options for Wideband Spread Spectrum Systems: Introduction, PN-3676. 1 (to be published as TIA/EIA/IS-707.1), Mar. 20, 1997 (Content Revision 1).
*Data Services Option Standard for Wideband Spread Spectrum Digital Cellular System.* TIA/EIA/IS-99. TIA/EIA Interim Standard. Jul. 1995.
*Data Services Options Standard for Wideband Spread Spectrum Systems: Packet Data Services.* PN-3676.5 (to be published as TIA/EIA/IS-707.5) Ballot Version, May 30, 1997.
Data Standard, Packet Data Section, PN-3676.5 (to be published as TIA/EIA/IS-Data.5), Dec. 8, 1996, Version 2 (Content Revision 3).
Draft Text for "*95C" Physical Layer (Revision 4), Part 1, Document #531-981-20814-95C, Part 1 on 3GPP2 website (ftp://ftp.3gpp2.org/tsgc/working/1998/1298_Maui/WG3-TG1/531-98120814-95c,%20part%201.pdf).
Draft Text for "95C" Physical Layer (Revision 4), Part 2, Document #531-981-20814-95C, part 2 on 3GGP2 website (ftp://ftp.3gpp2.org/tsgc/working/1998/1298_ Maui/WG3-TG1/531-98120814-95c,%20part%202.pdf, 1998).
Elhakeem, Congestion Control in Signalling Free Hybrid ATM/CDMA Satellite Network, IEEE, 1995, pp. 783-787.
Hall et al., Design and Analysis of Turbo Codes on Rayleigh Fading Channels, IEEE Journal on Selected Areas in Communications, vol. 16, No. 2, Feb. 1998, pp. 160-174.
*Introduction to cdma2000 Spread Spectrum Systems,* Release C. TIA/EIA Interim Standard. TIA/EIA.IS-2000.1-C. May, 2002.
Kumar et al, An Access Scheme for High Speed Packet Data Service on IS-95 based CDMA, Feb. 11, 1997.
Lau el at., A Channel-State-Dependent Bandwidth Allocation scheme for Integrated Isochronous and Bursty Media Data in a Cellular Mobile Information System, IEEE, 2000, pp. 524-528.
Liu et al., Channel Access and Interference Issues in Multi-Code DS-CDMA Wireless Packet (ATM) Networks, Wireless Networks 2, pp. 173-196, 1996.
Lucent Technologies Presentation First Slide Titled, Summary of Multi-Channel Signaling Protocol, Apr. 6, 1997.
Lucent Technologies Presentation First Slide Titled, Why Support Symmetric HSD (Phase 1C), Feb. 21, 1997.
Mobile Station-Base Station Compatibility Standard for Dual-Mode Wideband Spread Spectrum Cellular System, TIA Interim Standard, TIA/EIA/IS-95-A (Addendum to TIA/EIA/IS-95), May 1995.
Motorola, Version 1.0. *Motorola High Speed Data Air Interface Proposal Comparisions and Recommendations.* Jan. 27, 1997.
*MSC-BS Interface (A-Interface)* for Public 800 MHz. TIA/EiA/IS-634-A. TIA/EIA Interim Standard (Revision of TIA/EiA/IS-634) Jul. 1998.
Network Wireless Systems Offer Business Unit (NWS OBU), Feature Definition Document for Code Division Multiple Access (CDMA) Packet Mode Data Services, FDD-1444, Nov. 26, 1996.
Ott, David TR45.5, CDMA WBSS Technical Standards Meeting Summary. Feb. 24-28, 1997 Banff, Alberta.
Packet Data Service Option Standard for Wideband Spread Spectrum Systems, TIA/EIA Interim Standard, TIA/EIA/IS-657, Jul. 1996.
*Physical Layer Standard for cdma2000 Spread Spectrum Systems, Release C.* TIA/EIA Interim Standard. TIA/EIA/IS-2000.2C. May, 2002.
Reed et al., Iterative Multiuser Detection for CDMA with FEC: Near-Single-User Performance, IEEE Transactions on Communications, vol. 46, No. 12, Dec. 1998, pp. 1693-1699.
Shacham, et al., "A Selective-Repeat-ARQ Protocol for Parallel Channels and Its Resequencing Analysis," IEEE Transactions on Communications, XP000297814, 40 (4): 773-782 (Apr. 1997).
Simpson, W. (Editor). "RFC 1661—The Point-to-Point Protocol (PPP)." Network Working Group, Jul. 1994, pgs. 1-35. http://www.faqs.org/rfcs/rfc1661.html.
Skinner et al., Performance of Reverse-Link Packet Transmission in Mobile Cellular CDMAa Networks, IEEE, 2001, pp. 1019-1023.
Stage 1 Service Description for Data Services—High Speed Data Services (Version 0.10) CDG RF 38. Dec. 3, 1996.
*Support for 14.4 kbps Data Rate and PCS Interaction for Wideband Spread Spectrum Cellular Systems.* TSB74, Dec. 1995. TIA/EIA Telecommunications Systems Bulletin.
*Telecommunications Industry Association Meeting Summary.* Task Group I, Working Group III, Subcommittee TR45.5. Feb. 24-27, 1997. Banff, Alberta.
*Telecommunications Industry Association Meeting Summary.* Task Group I, Working Group III, Subcommittee TR45.5. Jan. 6-8, 1997. Newport Beach, California.
Tsui et al., "Sensitivity of Ew Receivers," Microwave Journal, vol. 25, pgs. 115-117, 120 (Nov. 1982).
*Upper Layer (Layer 3) Signaling Standard for cdma2000 Spread Spectrum Systems, Release C.* TIA/EIA Interim Standard. TIA/EIA/IS-2000.5-C. May, 2002.
Viterbi, The Path to Next Generation Services with CDMA, Qualcomm Incorporated, 1998 CDMA Americas Congress, Los Angeles, California, Nov. 19, 1998.
Wang et al., The Performance of Turbo-Codes in Asynchronous DS-CDMA, IEEE Global Communications Conference, Phoenix, Arizona, USA, Nov. 3-8, 1007, Gol. III, pp. 1548-1551.
Yang, Samuel C., "Principles of Code Division Multiple Access," In CDMA RF System Engineering, (MA: Artech House, Inc.), 1998, Chapter 4, pp. 75-103.
Attachment 2, *High Speed Data RLP* Lucent Technologies, Version 0.1, Jan. 16, 1997.
Azad et al., Multirate Spread Spectrum Direct Sequence CDMA Techniques, 1994, The Institute of Electrical Engineers.
Bell Labs Technical Journal, Lucent Technologies, vol. 2, No. 3, Summer 1997.
Budka et al., Cellular Digital Packet Data Networks, Bell Labs Technical Journal, Summer 1997, pp. 164-181.
Cellular Digital Packet Data, System Specification, Release 1.1, Jan. 19, 1995.
Chelouah, A., et al., "Angular Diversity Based on Beam Switching of Circular Arrays for Hiperlan Terminals," *Electronics Letters,* vol. 36, No. 5, pp. 387-388, (Mar. 2, 2000).
Chih-Lin I et al., IS-95 Enhancements for Multimedia Services, Bell Labs Technical Journal, pp. 60-87, Autumn 1996.
Chih-Lin I et al., Load and Interference Based Demand Assignment (LIDA) for Integrated Services in CDMA Wireless Systems, Nov. 18, 1996, pp. 235-241.
Chih-Lin I et al., Multi-Code CDMA Wireless Personal Communications Networks, Jun. 18, 1005.
Chih-Lin I et al., Performance of Multi-Code CDMA Wireless Personal Communications Networks, Jul. 25, 1995.
Chih-Lin I et al., Variable Spreading Gain CDAM with Adaptive Control for True Packet Switching Wireless Network, 1995, pp. 725-730.
Chung et al., Packet Synchronization and Identification for Incremental Redundancy Transmission in FH-CDMA Systems, 1992, IEEE, pp. 292-295.
*Data Service Options for Wideband Spread Spectrum Systems.* TIA/EIA Interim Standard. TIA/EIA/IS-707-A. Apr. 1999.
Data Service Options for Wideband Spread Spectrum Systems: Introduction, PN-3676. 1 (to be published as TIA/EIA/IS-707.1), Mar. 20, 1997 (Content Revision 1).
*Data Services Option Standard for Wideband Spread Spectrum Digital Cellular System.* TIA/EIA/IS-99. TIA/EIA Interim Standard. Jul. 1995.
*Data Services Options Standard for Wideband Spread Spectrum Systems: Packet Data Services.* PN-3676.5 (to be published as TIA/EIA/IS-707.5) *Ballot Version,* May 30, 1997.
Data Standard, Packet Data Section, PN-3676.5 (to be published as TIA/EIA/IS-Data.5), Dec. 8, 1996, Version 2 (Content Revision 3).
Draft Text for "*95C" Physical Layer (Revision 4), Part 1, Document #531-981-20814-95C, Part 1 on 3GPP2 website (ftp://ftp.3gpp2.org/tsgc/working/1998/1298_Maui/WG3-TG1/531-98120814-95c,%20part%201.pdf).

Draft Text for "95C" Physical Layer (Revision 4), Part 2, Document #531-981-20814-95C, part 2 on 3GGP2 website (ftp://ftp.3gpp2.org/tsgc/working/1998/1298_Maui/WG3-TG1/531-98120814-95c,%20part%202.pdf, 1998).

Durnan, G.J., et al., "Switched Parasitic Feeds for Parabolic Antenna Angle Diversity," *Microwave and Optical Tech. Letters*, vol. 23, No. 4, pp. 200-2003(Nov. 20, 1999).

Ejzak et al., Lucent Technologies Air Interface Proposal for CDMA High Speed Data Service, Revision 0.1, May 5, 1997.

Ejzak et al., Lucent Technologies Air Interface Proposal for CDMA High Speed Data Service, Apr. 14, 1997.

Ejzak, et al. *Proposal for High Speed Packet Data Service,* Version 0.1. Lucent Technologies, Jan. 16, 1997.

Elhakeem, Congestion Control in Signalling Free Hybrid ATM/CDMA Satellite Network, IEEE, 1995, pp. 783-787.

Giger, A.J., *Low-Angle Microwave Propagation: Physics and Modeling,* Norwood, MA, Artech House, (1991).

Hall et al., Design and Analysis of Turbo Codes on Rayleigh Fading Channels, IEEE Journal on Selected Areas in Communications, vol. 16, No. 2, Feb. 1998, pp. 160-174.

Harrington, R.F., "Reactively Controlled Antenna Arrays," *IEEE APS International Symposium Digest,* Amherst, MA, pp. 62-65, (Oct. 1976).

Harrington, R.F., "Reactively Controlled Directive Arrays," *IEEE Trans. Antennas and Propagation,* vol. AP-26, No. 3, pp. 390-395, (May 1978).

Heine, Gunnar, "The Air-Interface of GSM", in GSM Networks: Protocols, Terminology, and Implementation, (MA: Artech House, Inc.), pp. 89-100 (1999).

High Data Rate (HDR), cdmaOne optimized for high speed, high capacity data, Wireless Infrastructure, Qualcomm, Sep. 1998.

Hindelang et al., Using Powerful "Turbo" Codes for 14.4 Kbit/s Data Service in GSM or PCS Systems, IEEE Global Communications Conference, Phoenix, Arizona, USA, Nov. 3-8, 1997, vol. II, pp. 649-653.

Honkasalo, Harri. *High Speed Data Air Interface.* 1996.

*Introduction to cdma2000 Spread Spectrum Systems, Release C.* TIA/EIA Interim Standard. TIA/EIA/IS-2000.1-C. May, 2002.

James, J.R. et al., "Electrically Short Monopole Antennas with Dielectric or Ferrite Coatings," Proc. IEEE, vol. 125, pp. 793-803, (Sep. 1978).

King, R.W.P., "The Many Faces of the Insulated Antenna," Proc. IEEE, vol. 64, No. 2, pp. 228-238, (Feb. 1976).

Kingsley, S.P., et al., "Beam Steering and Monopulse Processing of Probe-Fed Dielectric Resonator Antennas," *IEEE Proc.-Radar, Sonar, Navigation,* vol. 146, No. 3, pp. 121-125, (Jun. 1999).

Knisely, Douglas, N. Telecommunications Industry Association Subcommittee TR-45.5—*Wideband Spread Spectrum Digital Technologies Standards.* Banff, Alberta. Feb. 24, 1997 (TR45.5197.02.24)21.

Krzymien et al., Rapid Acquisition Algorithms for Synchronization of Bursty Transmissions in CDMA Microcellular and Personal Wireless Systems, IEEE Journal on Selected Areas in Communications, vol. 14, No. 3, Apr. 1996, pp. 570-579.

Kumar et al, An Access Scheme for High Speed Packet Data Service on IS-95 based CDMA, Feb. 11, 1997.

Lau et al., A Channel-State-Dependent Bandwidth Allocation scheme for Integrated Isochronous and Bursty Media Data in a Cellular Mobile Information System, IEEE, 2000, pp. 524-528.

Lee et al., "A Novel Hybrid CDMA/TDMA Protocol with a Reservation Request Slot for Wireless ATM Networks," IEICE Transactions on Communications, vol. E82-B, No. 7, pp. 1073-1076 (Jul. 25, 1999).

Liu et al., Channel Access and Interference Issues in Multi-Code DS-CDMA Wireless Packet (ATM) Networks, Wireless Networks 2, pp. 173-196, 1996.

Long, S.A., et al., "The Resonant Cylindrical Dielectric Cavity Antenna," *IEEE Trans. Antennas and Propagation,* vol. AP-31, No. 3, pp. 406-412, (May 1983).

Lu, J., et al., "Multi-beam Switched Parasitic Antenna Embedded in Dielectric for Wireless Communications Systems," *Electronics Letters,* vol. 37, No. 14, pp. 871-872, (Jul. 5, 2001).

Lucent Technologies Presentation First Slide Titled, Summary of Multi-Channel Signaling Protocol, Apr. 6, 1997.

Lucent Technologies Presentation First Slide Titled, Why Support Symmetric HSD (Phase 1C), Feb. 21, 1997.

Luzwick, J., et al., "A Reactively Loaded Aperture Antenna Array," *IEEE Trans. Antennas and Propagation,* vol. AP-26, No. 4, pp. 543-547, (Jul. 1978).

McCallister, M.W. et al., "Resonant Hemispherical Dielectric Antenna," *Electronics Letters,* vol. 20, No. 16, pp. 657-659, (Aug. 1984).

McCallister, M.W., et al., "Rectangular Dielectric Resonator Antenna," *Electronics Letter,* vol. 19, No. 6, pp. 218-219, (Mar. 1983).

Melanchuk et al. *CDPD and Emerging Digital Cellular Systems,* Digest of Papers of COMPCN, Computer Society Conference 1996, Santa Clara, CA, No. CONF. 41, Feb. 25, 1996, pp. 2-8, XP000628458.

Milne, R.M.T., "A Small Adaptive Array Antenna for Mobile Communications," *IEEE APS International Symposium Digest,* pp. 797-800, (1985).

Mobile Station-Base Station Compatibility Standard for Dual-Mode Wideband Spread Spectrum Cellular System, TIA Interim Standard, TIA/EIA/IS-95-A (Addendum to TIA/EIA/IS-95), May 1995.

Mobile Station-Base Station Compatibility Standard for Wideband Spread Spectrum Cellular Systems, TIA/EIA Standard, TIA/EIA-95-B (Upgraded and Revision of TIA/EIA-95-A), Mar. 1999.

Motorola, Version 1.0. *Motorola High Speed Data Air Interface Proposal Comparisions and Recommendations.* Jan. 27, 1997.

MSC-BS *Interface (A-Interface) for Public* 800 *MHz.* TIA/EIA/IS-634-A. TIA/EIA Interim Standard (Revision of TIA/EIA/IS-634) Jul. 1998.

MSC-BS *Interface for Public* 800 *MHz.* TIA/EIA/IS-634. TIA/EIA Interim Standard, Dec. 1995.

Network Wireless Systems Offer Business Unit (NWS OBU), Feature Definition Document for Code Division Multiple Access (CDMA) Packet Mode Data Services, FDD-1444, NOv. 26, 1996.

Ott, David TR45.5, CDMA WBSS Technical Standards Meeting Summary. Feb. 24-28, 1997 Banff, Alberta.

Ovesjö Frederik, European Telecommunication Standard, SMG2 UMTS physical Layer Expert Group, "UTRA Physical Layer Descriptions FDD parts" (v0.4, Jun. 25, 1998), PP. 1-41, XP-002141421.

Packet Data Service Option Standard for Wideband Spread Spectrum Systems, TIA/EIA Interim Standard, TIA/EIA/IS-657, Jul. 1996.

*Physical Layer Standard for cdma2000 Spread Spectrum Systems, Release C.* TIA/EIA Interim Standard. TIA/EIA/IS-2000.2C. May, 2002.

Preston, S., et al., "Direction Finding Using a Switched Parasitic Antenna Array," *IEEE APS International Symposium Digest,* Montreal, Canada, pp. 1024-1027, (1997).

Preston, S.L., et al., 'A Multibeam Antenna Using Switched Parasitic and Switched Active Elements for Space-Division Multiple Access Applications, *IEICE Trans. Electron.,* vol. E82-C, No. 7, pp. 1202-1210, (Jul. 1999).

Preston, S.L., et al., "Base-Station Tracking in Mobile Communications using a Switched Parasitic Antenna Array," *IEEE Trans. Antennas and Propagation,* vol. 46, No. 6, pp. 841-844, (Jun., 1998).

Preston, S.L., et al., "Electronic Beam Steering Using Switched Parasitic Patch Elements," *Electronics Letters,* vol. 33, No. 1, pp. 7-8, (Jan. 2, 1997).

Preston, S.L., et al., "Size Reduction of Switched Parasitic Directional Antennas Using Genetic Algorithm Optimization Techniques," *Asia Pacific Microwave Conference Proceedings,* Yokohama, Japan, pp. 1401-1404, (1998).

Preston, S.L., et al., "Systematic Approach to the Design of Directional Antennas Using Switched Parasitic and Switched Active Elements," *Asia Pacific Microwave Conference Proceedings,* Yokohama, Japan, pp. 531-534, (1998).

Puleston, PPP Protocol Spoofing Control Protocol, Global Village Communication (UK) Ltd., Feb. 1996.

Reed et al., Iterative Multiuser Detection for CDMA with FEC: Near-Single-User Performance, IEEE Transactions on Communications, vol. 46, No. 12, Dec. 1998, pp. 1693-1699.

Ruze, J., "Lateral-Feed Displacement in a Paraboloid," *IEEE Trans. Antennas and Propagation,* vol. 13, pp. 660-665, (1965).

Shacham, et al., "A Selective-Repeat-ARQ Protocol for Parallel Channels and Its Resequencing Analysis," IEEE Transactions on Communications, XP000297814, 40 (4): 773-782 (Apr. 1997).

Sibille, A., et al., "Circular Switched Monopole Arrays for beam Steering Wireless Communications," *Electronics Letters*, vol. 33, No. 7, pp. 551-552, (Mar. 1997).

Simpson, W. (Editor). "RFC 1661—The Point-to-Point Protocol (PPP)." Network Working Group, Jul. 1994, pp. 1-35. http://www.faqs.org/rfcs/rfc1661.html.

Simpson, W. (Editor). "RFC 1662—PPP in HDLC-Like Framing." Network Working Group, Jul. 1994, pp. 1- 7. http://www.faqs.org/rfcs/rfc1662.html.

Skinner et al., Performance of Reverse-Link Packet Transmission in Mobile Cellular CDMA Networks, IEEE, 2001, pp. 1019-1023.

Stage 1 Service Description for Data Services—High Speed Data Services (Version 0.10) CDG RF 38. Dec. 3, 1996.

*Support for 14.4 kbps Data Rate and PCS Interaction for Wideband Spread Spectrum Cellular Systems.* TSB74, Dec. 1995. TIA/EIA Telecommunications Systems Bulletin.

*Telecommunications Industry Association Meeting Summary.* Task Group I, Working Group III, Subcommittee TR45.5. Feb. 24-27, 1997. Banff, Alberta.

*Telecommunications Industry Association Meeting Summary.* Task Group I, Working Group III, Subcommittee TR45.5. Jan. 6-8, 1997. Newport Beach, California.

TIA/EIA Interim Standards Mobile Station-Base Station Compatibility Standard for Dual-Mode Wideband Spread Spectrum Cellular System. TIA/EIA/IS-95 (Jul. 1993).

TSUI et al., "Sensitivity of EW Receivers," Microwave Journal, vol. 25, pp. 115-117, 120 (Nov. 1982).

*Upper Layer (Layer 3) Signaling Standard for cdma2000 Spread Spectrum Systems, Release C.* TIA/EIA Interim Standard. TIAa/EIA/IS-2000.5-C. May, 2002.

Vaughn, R., "Switched Parasitic Elements for Antenna Diversity," *IEEE Trans. Antennas and Propagation*, vol. 47, No. 2, pp. 399-405, (Feb. 1999).

Viterbi, The Path to Next Generation Services with CDMA, Qualcomm Incorporated, 1998 CDMA Americas Congress, Los Angeles, California, Nov. 19, 1998.

Wang et al., The Performance of Turbo-Codes in Asynchronous DS-CDMA, IEEE Global Communications Conference, Phoenix, Arizona, USA, Nov. 3-8, 1007, Gol. III, pp. 1548-1551.

www.cdg.org/nevvs/press/1997.asp. CDA Press Release Archive, 1997.

Yang, Samuel C., "Principles of Code Division Multiple Access," In CDMA RF System Engineering, (MA: Artech House, Inc.), 1998, Chapter 4, pp. 75-103.

Attachment 2, High Speed Data Rlp Lucent Technologies, Version 0.1, Jan. 16, 1997.

Azad et al., Multirate Spread Spectrum Direct Sequence CDMA Techniques, 1994, the Institute of Electrical.

Bell Labs Technical Journal, Lucent Technologies, vol. 2, No. 3, Summer 1997.

Budka et al., Cellular Digital Packet Data Networks, Bell Labs Technical Journal, Summer 1997, pp. 164-181.

Cellular Digital Packet Data, System Specification, Release 1.1, Jan. 19, 1995.

Chelouah, A., et al., "Angular Diversity Based on Beam Switching of Circular Arrays for Hiperlan Terminals," *Electronics Letters*, vol. 36, No. 5, pp. 387-388, (Mar. 2, 2000).

Chih-Lin I et al., IS-95 Enhancements for Multimedia Services, Bell Labs Technical Journal, pp. 60-87, Autumn 1996.

Chih-Lin I et al., Load and Interference Based Demand Assignment (LIDA) for Integrated Services in CDMA Wireless Systems, Nov. 18, 1996, pp. 235-241.

Chih-Lin I et al., Multi-Code CDMA Wireless Personal Communications Networks, Jun. 18, 1005.

Chih-Lin I et al., Performance of Multi-Code CDMA Wireless Personal Communications Networks, Jul. 25, 1995.

Chih-Lin I et al., Variable Spreading Gain CDMA with Adaptive Control for True Packet Switching Wireless Network, 1995, pp. 725-730.

Chung, Packet Synchronization and Identification for Incremental Redundancy Transmission in FH-CDMA systems, 1992, IEEE, pp. 292-295.

*Data Service Options for Wideband Spread Spectrum Systems.* TIA/EIAa Interim Standard. TIA/EIA/IS-707-A Apr. 1999.

Data Service Options for Wideband Spread Spectrum Systems: Introduction, PN-3676. 1 (to be published as TIA/EIA/IS-707.1), Mar. 20, 1997 (Content Revision 1).

*Data Services Option Standard for Wideband Spread Spectrum Digital Cellular System.* TIA/EIA/IS-99 TIA/EIA Interim Standard. Jul. 1995.

*Data Services Options Standard for Wideband Spread Spectrum Systems: Packet Data Services.* PN-3676.5 (to be published as TIA/EIA/IS-707.5) Ballot Version, May 30, 1997.

Data Standard, Packet Data Section, PN-3676.5 (to be published as TIA/EIA/IS-Data.5), Dec. 8, 1996, Version 2 (Content Revision 3).

Draft Text for "*95C" Physical Layer (Revision 4), Part 1, Document #531-981-20814-95C, Part 1 on 3GPP2 website (ftp://ftp.3gpp2.org/tsgc/working/1998/1298‾maui/WG3-TG1/531-9812014-95c,%20part%201.pdf).

Draft Text for "95C" Physical Layer (Revision 4), Part 2, Document #531-981-20814-95C, part 2 on 3GPP2 website (ftp://ftp.3gpp2.org/tsgc/working.1998/1298_Maui/WG3-TG1/531-98120814-95c,%20part%202.pdf, 1998).

Durnan, G.J., et al. "Optimization of Microwave Parabolic Antenna Systems Using Switched Parasitic Feed Structures," URSI National Science Meeting, Boulder, CO, p. 323, (Jan. 4-8, 2000).

Durnan, G.J., et al., "Switched Parasitic Feeds for Parabolic Antenna Angle Diversity," *Microwave and Optical Tech. Letters*, vol. 23, No. 4, pp. 200-2003(Nov. 20, 1999).

Ejzak et al., Lucent Technologies Air Interface Proposal for CDMA High Speed Data Service, Revision 0.1, May 5, 1997.

Ejzak et al., Lucent Technologies Air Interface Proposal for CDMA High Speed Data Service, Apr. 14, 1997.

Ejzak, et al. *Proposal for High Speed Packet Data Service, Version 0.1*. Lucent Technologies, Jan. 16, 1997.

Elhakeem, Congestion Control in Signalling Free Hybrid ATM/CDMA Satellite Network, IEEE, 1995, pp. 783-787.

Giger, A.J., *Low-Angle Microwave Propagation: Physics and Modeling*, Norwood, MA, Artech House, (1991).

Hall et al., Design and Analysis of Turbo Codes on Rayleigh Fading Channels, IEEE Journal on Selected Areas in Communications, vol. 16, No. 2, Feb. 1998, pp. 160-174.

Harrington, R.F., "Reactively Controlled Antenna Arrays," *IEEE APS International Symposium Digest*, Amherst, MA, pp. 62-65, (Oct. 1976).

Harrington, R.F., "Reactively Controlled Directive Arrays," *IEEE Trans. Antennas and Propagation*, vol AP-26, No. 3, pp. 390-395, (May 1978).

Heine, Gunnar, "The Air-Interface of GSM", in GSM Networks: Protocols, Terminology, and Implementation, (MA: Artech House, Inc.), pp. 89-100 (1999).

High Data Rate (HDR), cdmaOne optimized for high speed, high capacity data, Wireless Infrastructure, Qualcomm, Sep. 1998.

Hindelang et al., Using Powerful "Turbo" Codes for 14.4 Kbit/s Data Service in GSM or PCS Systems, IEEE Global Communications Conference, Phoenix, Arizona, USA, Nov. 3-8, 1997, vol. II, pp. 649-653..

*Introduction to cdma2000 Spread Spectrum Systems, Release C.* TIA/EIA Interim Standard. TIA/EIAa/IS-2000.1-C. May 2002.

James, J.R. et al., "Electrically Short Monopole Antennas with Dielectric or Ferrite Coatings," Proc. IEEE, vol. 125, pp. 793-803, (Sep. 1978).

James, J.R., et al., "Reduction of Antenna Dimensions with Dielectric Loading," *Electronics Letters*, vol. 10, No. 13, pp. 263-265 (May 1974).

Kaiser et al., Multi-Carrier CDMA with Iterative Decoding and Soft-Interference Cancellation, Proceedings of Globecom 1997, vol. 1, pp. 523-529.

King, R.W.P., "The Many Faces of the Insulated Antenna," Proc. IEEE, vol. 64, No. 2, pp. 228-238, (Feb. 1976).

Kingsley, S.P., et al., "Beam Steering and Monopulse Processing of Probe-Fed Dielectric Resonator Antennas," *IEEE Proc.-Radar, Sonar, Navigation,* vol. 146, No. 3, pp. 121-125, (Jun. 1999).

Knight, P., "Low-Frequency Behavior of the Beverage Aerial," *Electronics Letter,* vol. 13, No. 1, pp. 21-22, (Jan. 1977).

Knisely, Douglas, N. Telecommunications Industry Association Subcommittee TR-45.5 - *Wideband Spread Spectrum Digital Technologies Standards.* Banff, Alberta. Feb. 24, 1997 (TR45.5/97.02.24)21.

Knisely, Douglas, N. Telecommunications Industry Association Subcommittee Tr-45.5-Wideband Spread.Spectrum Digital Technologies Standards, Working Group III-Physical Layer. Banff, Alberta. Feb. 24, 1997 (TR45.5/97.02.24)22.

Knisely, Lucent Technologies Air Interface Proposal for CDMA High Speed Data Service, Jan. 16, 1997.

Krzymien et al., Rapid Acquisition Algorithms for Synchronization of Bursty Transmissions in CDMA Microcellular and Personal Wireless Systems, IEEE Journal on Selected Areas in Communications, vol. 14, No. 3, Apr. 1996, pp. 570-579.

Kumar et al, An Access Scheme for High Speed Packet Data Service on IS-95 based CDMA, Feb. 11, 1997.

Lau et al., A Channel-State-Dependent Bandwidth Allocation scheme for Integrated Isochronous and Bursty Media Data in a Cellular Mobile Information System, IEEE, 2000, pp. 524-528.

Lee et al., "A Novel Hybrid CDMA/TDMA Protocol with a Reservation Request Slot for Wireless ATM Networks, " IEICE Transactions on Communications, vol. E82-B, No. 7, pp. 1073-1076 (Jul. 25, 1999).

Liu et al., Channel Access and Interference Issues in Multi-Code DS-CDMA Wireless Packet (ATM) Networks, Wireless Networks 2, pp. 173-796, 1996.

Long, S.A., et al., "The Resonant Cylindrical Dielectric Cavity Antenna," *IEEE Trans. Antennas and Propagation,* vol. Ap-31, No. 3, pp. 406-412, (May 1983).

Lu, J., et al., "Multi-beam Switched Parasitic Antenna Embedded in Dielectric for Wireless Communications Systems," *Electronics Letters,* vol. 37, No. 14, pp. 871-872, (Jul. 5, 2001).

Lucent Technologies Presentation First Slide Titled, Summary of Multi-Channel Signaling Protocol, Apr. 6, 1997.

Lucent Technologies Presentation First Slide Titled, Why Support Symmetric HSD (Phase 1C), Feb. 21, 1997.

Luzwick, J., et al., "A Reactively Loaded Aperture Antenna Array," *IEEE Trans. Antennas and Propagation,* vol. Ap-26, No. 4, pp. 543-547, (Jul 1978).

McCallister, M.W. et al., "Resonant Hemispherical Dielectric Antenna," *Electronics Letters,* vol. 20, No. 16, pp. 657-659, (Aug. 1984).

Mccallister, M.W., et al., "Rectangular Dielectric Resonator Antenna," Electronics Letter, vol. 19, No. 6, pp. 218-219, (Mar. 1983).

Melanchuk et al. *CDPD and Emerging Digital Cellular Systems,* Digest of Papers of COMPCN, Computer Society Conference 1996, Santa Clara, CA, No. CONF. 41, Feb. 25, 1996, pp. 2-8, XP000628458.

Milne, R.M.T., "A Small Adaptive Array Antenna for Mobile Communications," *IEEE APS International Symposium Digest,* pp. 797-800, (1985).

Mobile Station-Base Station Compatibility Standard for Dual-Mode Wideband Spread Spectrum Cellular System, TIA Interim Standard, TIA/EIA/IS-95-A (Addendum to TIA/EIA/IS-95), May 1995.

Mobile Station-Base Station Compatibility Standard for Wideband Spread Spectrum Cellular Systems, TIA/EIA Standard, TIA/EIA-95-B (Upgrade and Revision of TIA/EIA-95-A), Mar. 1999.

Motorola, Version 1.0. *Motorola High Speed Data Air Interface Proposal Comparisions and Recommenations.* Jan. 27, 1997.

*MSC-BS Interface (A-Interface) for Public 800 MHz.* TIA/EIA/IS-634-A. TIA/EIA Interim Standard (Revision of TIA/EIA/IS-634) Jul. 1998.

*MSC-BS Interface for Public 800 MHz.* TIA.EIA/IS-634. TIA/EIA Interim Standard, Dec. 1995.

Network Wireless Systems Offer Business Unit (NWS OBU), Feature Definition Document for Code Division Multiple Access (CMDA) Packet Mode Data Services, FDD-1444, Nov. 26, 1996.

Ott, David TR45.5, CDMA WBSS Technical Standards Meeting Summary. Feb. 24-28, 1997 Banff, Alberta.

Ovesjö Frederik, European Telecommunication Standard, SMG2 UMTS physical Layer Expert Group, "UTRA Physical Layer Descriptions FDD parts" (v0.4, Jun. 25, 1998), pp. 1-41, XP-0021141421.

Packet Data Service Option Standard for Wideband Spread Spectrum Systems, TIA/EIA Interim Standard, TIA/EIA/IS-657, Jul. 1996.

*Physical Layer Standard for cdma2000 Spread Spectrum Systems, Release C.* TIA/EIA Interim Standard TIA/EIA/IS-2000.2C. May 2002.

Preston, S., et al., "Direction Finding Using a Switched Parasitic Antenna Array," *IEEE APS International Symposium Digest,* Montreal, CAX, pp. 1024-1027, (1997).

Preston, S.L., et al., 'A Multibeam Antenna Using Switched Parasitic and Switched Active Elements for Space-Division Multiple Access Application, *IEICE Trans. Electron.,* vol. E82-C, No. 7, pp. 1202-1210, (Jul. 1999).

Preston, S.L., et al., "Base-Station Tracking in Mobile Communications using a Switched Parasitic Antenna Array," *IEEE Trans. Antennas and Propagation,* vol. 46, No. 6, pp. 841-844, (Jun. 1998).

Preston, S.L., et al., "Electronic Beam Steering Using Switched Parasitic Patch Elements," *Electronics Letters,* vol. 33, No. 1, pp. 7-8, (Jan. 2, 1997).

Preston, S.L., et al., "Size Reduction of Switched Parasitic Directional Antennas Using Genetic Algorithm Optimization Techniques," *Asia Pacific Microwave Conference Proceedings,* Yokohama, Japan, pp. 1401-1404, (1998).

Preston, S.L., et al., "Systematic Approach to the Design of Directional Antennas Using Switched Parasitic and Switched Active Elements," *Asia Pacific Microwave Conference Proceedings,* Yokohama, Japan, pp. 531-534, (1998)

Puleston, PPP Protocol Spoofing Control Protocol, Global Village Communication (UK) Ltd., Feb. 1996.

Reed et al., Iterative Multiuser Detection for CDMA with FEC: Near-Single-User Performance, IEEE Transactions on Communications, vol. 46, No. 12, Dec. 1998, pp. 1693-1699.

Ruze, J., "Lateral-Feed Displacement in a Paraboloid," *IEEE Trans. Antennas and Propagation,* vol. 13, pp. 660-665, (1965).

Scott, N. L., et al., "Diversity Gain from a Single-Port Adaptive Antenna Using Switched Parasitic Elements Illustrated with a Wire and Monopole Prototype," *IEEE Trans. Antennas and Propagation,* vol. 47, No. 6, pp. 1066-1070, (Jun. 1999).

Shacham, et al., "A Selective-Repeat-ARQ Protocol for Parallel Channels and Its Resequencing Analysis," IEEE Transactions on Communications, XP000297814, 40 (4): 773-782 (Apr. 1997).

Sibille, A., et al., "Circular Switched Monopole Arrays for beam Steering Wireless Communications," *Electronics Letters,* vol. 33, No. 7, pp. 551-552, (Mar. 1997).

Simpson, W. (Editor). "RFC 1661—The Point-to-Point Protocol (PPP)." Network Working Group, Jul. 1994, pp. 1-35. http://www.faqs.org/rfcs/rfc1661.html.

Simpson, W. (Editor). "RFC 1662—PPP in HDLC-Like Framing." Network Working Group, Jul. 1994, pgs. 1-17. http://www.faqs.org/rfcs/rfc1662.html.

Skinner et al., Performance of Reverse-Link Packet Transmission in Mobile Cellular CDMA Networks, IEEE, 2001, pp. 1019-1023.

Stage 1 Service Description for Data Services—High Speed Data Services (Version 0.10) CDG RF 38. Dec. 3, 1996.

*Support for 14.4 kbps Data Rate and Pcs Interaction for Wideband Spread Spectrum Cellular Systems.* TSB74, Dec. 1995. TIA/EIA Telecommunications Systems Bulletin.

Telecommunications Industry Association Meeting Summary. Task Group I, Working Group III, Subcommittee TR45.5. Feb. 24-27, 1997. Banff, Alberta.

Telecommunications Industry Association Meeting Summary. Task Group I, Working Group III, Subcommittee TR45.5. Jan. 6-8, 1997. Newport Beach, California.

TIA/EIA Interim Standard, Mobile Station-Base Station Compatibility Standard for Dual-Mode Wideband Spread Spectrum Cellular System, TIA/EIA/IS-95 (Jul. 1993).

Tsui et al., "Sensitivity of EW Receivers," Microwave Journal, vol. 25, pp. 115-117, 120 (Nov. 1982).

*Upper Layer (Layer 3) Signaling Standard for cdma2000 Spread Spectrum Systems, Release C.* TIA/EIA Interim Standard. TIA/EIA/IS-2000.5-C. May, 2002.
Vaughn, R., "Switched Parasitic Elements for Antenna Diversity," *IEEE Trans. Antennas and Propagation,* vol. 47, No. 2, pp. 399-405, (Feb. 1999).
Viterbi, The Path to Next Generation Services with CDMA, Qualcomm Incorporated, 1998 CDMA Americas Congress, Los Angeles, California, Nov. 19, 1998.
Wang et al., The Performance of Turbo-Codes in Asynchronous DS-CDMA, IEEE Global Communications Conference, Phoenix, Arizona, USA, Nov. 3-8, 1007, Gol. III, pp. 1548-1551.
Yang, Samuel C., "Principles of Code Division Multiple Access," In CDMA RF System Engineering, (MA: Artech House, Inc.), 1998, Chapter 4, pp. 75-103.
Attachment 2, *High Speed Data RLP Lucent Technologies,* Version 0.1, Jan. 16, 1997.
Azad et al., Multirate Spread Spectrum Direct Sequence CDMA Techniques, 1994, The Institute of Electrical Engineers.
Bell Labs Technical Journal, Lucent Technologies, vol. 2, No. 3, Summer 1997.
Budka et al., Cellular Digital Packet Data Networks, Bell Labs Technical Journal, Summer 1997, pp. 164-181.
Cellular Digital Packet Data, System Specification, Release 1.1, Jan. 19, 1995.
Chelouah, A., et al., "Angular Diversity Based on Beam Switching of Circular Arrays for Hiperlan Terminals," *Electronics Letters,* vol. 36, No. 5, pp. 387-388, (Mar. 2, 2000).
Chih-Lin I et al., IS-95 Enhancements for Multimedia Services, Bell Labs Technical Journal, pp. 60-87, Autumn 1996.
Chih-Lin I et al., Load and Interference Based Demand Assignment (LIDA) for Integrated Services in CDMA Wireless Systems, Nov. 18, 1996, pp. 235-241.
Chih-Lin I et al., Multi-Code CDMA Wireless Personal Communications Networks, Jun. 18, 1005.
Chih-Lin I et al., Performance of Multi-Code CDMA Wireless Personal Communications Networks, Jul. 25, 1995.
Chih-Lin I et al., Variable Spreading Gain CDMA with Adaptive Control for True Packet Switching Wireless Network, 1995, pp. 725-730.
Chung et al., Packet Synchronization and Identification for Incremental Redundancy Transmission in FH-CDMA Systems, 1992, IEEE, pp. 292-295.
*Data Service Options for Wideband Spread Spectrum Systems.* TIA/EIA Interim Standard. TIA/EIA/IS-707-A Apr. 1999.
Data Service Options for Wideband Spread Spectrum Systems: Introduction, PN-3676. 1 (to be published as TIA/EIA/IS-707.1), Mar. 20, 1997 (Content Revision 1).
*Data Services Option Standard for Wideband Spread Spectrum Digital Cellular System.* TIA/EIA/IS-99. TIA/EIA Interim Standard. Jul. 1995.
*Data Services Options Standard for Wideband Spread Spectrum Systems: Packet Data Services.* PN-3676.5 (to be published as TIA/EAI/IS-707.5) Ballot Version, May 30, 1997.
Data Standard, Packet Data Section, PN-3676.5 (to be published as TIA/EIA/IS-Data.5), Dec. 8, 1996, Version 2 (Content Revision 3).
Draft Text for "*95C" Physical Layer (Revision 4), Part 1, Document #531-981-20814-95C, Part 1 on 3GPP2 website (ftp://ftp.3ppg2.org/tsgc/working/1998/1298_Maui/WG3-TG1/531-98120814-95c,%20part%201.pdf).
Draft Text for "95C" Physical Layer (Revision 4), Part 2, Document #531-981-20814-95C, part 2 on 3GGP2 website (ftp://ftp.3ggp2.org/tsgc/working/1998/1298_Maui/WG3-TG1/531-98120814-95c,%20part%202.pdf, 1998).
Durnan, G.J., et al. "Optimization of Microwave Parabolic Antenna Systems Using Switched Parasitic Feed Strytcures," URSI National Science Meeting, Boulder, CO, p. 323, (Jan. 4-8, 2000).
Durnan, G.J., et al., "Switched Parasitic Feeds for Parabolic Antenna Angle Diversity," *Microwave and Optical Tech. Letters,* vol. 23, No. 4, pp. 200-2003(Nov. 20, 1999).
Ejzak et al., Lucent Technologies Air Interface Proposal for CDMA High Speed Data Service, Revision 0.1, May 5, 1997.
Ejzak et al., Lucent Technologies Air Interface Proposal for CDMA High Speed Data Service, Apr. 14, 1997.
Ejzak, et al. *Proposal for High Speed Packet Data Service, Version 0.1.* Lucent Technologies, Jan. 16, 1997.
Elhakeem, Congestion Control in Signalling Free Hybrid ATM/CDMA Satellite Network, IEEE, 1995, pp. 783-787.
Giger, A.J., *Low-Angle Microwave Propagation: Physics and Modeling,* Norwood, MA, Artech House, (1991).
Hall et al., Design and Analysis of Turbo Codes on Rayleigh Fading Channels, IEEE Journal on Selected Areas in Communications, vol. 16, No. 2, Feb. 1998, pp. 160-174.
Harrington, R.F., "Reactively Controlled Antenna Arrays," *IEEE APS International Symposium Digest,* Amherst, MA, pp. 62-65, (Oct. 1976).
Harrington, R.F., "Reactively Controlled Directive Arrays," *IEEE Trans. Antennas and Propagation,* vol. AP-26, No. 3, pp. 390-395, (May 1978).
Heine, Gunnar, "The Air-Interface of GSM", in GSM Networks: Protocols, Terminology, and Implementation, (MA: Artech House, Inc.), pp. 89-100 (1999).
High Data Rate (HDR), cdmaOne optimized for high speed, high capacity data, Wireless Infrastructure, Qualcomm, Sep. 1998.
Hindelang et al., Using Powerful "Turbo" Codes for 14.4 Kbit/s Data Service in GSM or PCS Systems, IEEE Global Communications Conference, Phoenix, Arizona, USA, Nov. 3-8, 1997, vol. II, pp. 649-653.
*Introduction to cdma2000 Spread Spectrum Systems, Release C.* TIA/EIA Interim Standard. TIA/EIA/IS-2000.1-C. May, 2002.
James , J.R. et al., "Electrically Short Monopole Antennas with Dielectric or Ferrite Coatings," Proc. IEEE, vol. 125, pp. 793-803, (Sep. 1978).
James, J.R., et al., "Reduction of Antenna Dimensions with Dielectric Loading," *Electronics Letters,* vol. 10, No. 13, pp. 263-265, (May 1974).
Kaiser et al., Multi-Carrier CDMA with Iterative Decoding and Soft-Interference Cancellation, Proceedings of Globecom 1997, vol. 1, pp. 523-529.
King, R.W.P., "The Many Faces of the Insulated Antenna," Proc. IEEE, vol. 64, No. 2, pp. 228-238, (Feb. 1976).
Kingsley, S.P., et al., "Beam Steering and Monopulse Processing of Probe-Fed Dielectric Resonator Antennas," *IEEE Proc.-Radar, Sonar, Navigation,* vol. 146, No. 3, pp. 121-125, (Jun. 1999).
Knight, P., "Low-Frequency Behavior of the Beverage Aerial," *Electronics Letter,* vol. 13, No. 1, pp. 21-22, (Jan. 1977).
Knisely, Douglas, N. Telecommunications Industry Association Subcommittee TR-45.5— *Wideband Spread Spectrum Digital Technologies Standards.* Baff, Alberta. Feb. 24, 1997 (TR45.5-97.02.24)21.
Knisely, Douglas, N. Telecommunications Industry Association Subcommittee TR-45.5-Wideband Spread Spectru, Digital Technologies Standards, Working Group III-Physical Layer. Banff, Alberta. Feb. 24, 1997 9TR45.5/97.02.24)22.
Knisely, Lucent Technologies Air Interface Proposal for CDMA High Speed Data Service, Jan. 16, 1997.
Krzymien et al., Rapid Acquisition Algorithms for Synchronization of Bursty Transmissions in CDMA Microcellular and Personal Wireless Systems, IEEE Journal on Selected Areas in Communications, vol. 14, No. 3, Apr. 1996, pp. 570-579.
Kumar et al, An Access Scheme for High Speed Packet Data Service on IS-95 based CDMA, Feb. 11, 1997.
Lau et al., A Channel-State-Dependent Bandwidth Allocation scheme for Integrated Isochronous and Bursty Media Data in a Cellular Mobile Information Systems, IEEE, 2000, pp. 524-528.
Lee et al., "A Novel Hybrid CDMA/TDMA Protocol with a Reservation Request Slot for Wireless ATM Networks," IEICE Transactions on Communications, vol. E82-B, No. 7, pp. 1073-1076 (Jul. 25, 1999).
Liu et al., Channel Access and Interference Issues in Multi-Code DS-CDMA Wireless Packet (ATM) Networks, Wireless Networks 2, pp. 173-196, 1996.
Long, S.A., et al., "The Resonant Cylindrical Dielectric Cavity Antenna," *IEEE Trans. Antennas and Propagation,* vol. AP-31, No. 3, pp. 406-412, (May 1983).

Lu, J., et al., "Multi-beam Switched Parasitic Antenna Embedded in Dielectric for Wireless Communications Systems," *Electronics Letters*, vol. 37, No. 14, pp. 871-872, (Jul. 5, 2001).

Lucent Technologies Presentation First Slide Titled, Summary of Multi-Channel Signaling Protocol, Apr. 6, 1997.

Lucent Technologies Presentation First Slide Titled, Why Support Symmetric HSD (Phase 1C), Feb. 21, 1997.

Luzwick, J., et al., "A Reactively Loaded Aperture Antenna Array," *IEEE Trans. Antennas and Propagation*, vol. AP-26, No. 4, pp. 543-547, (Jul. 1978).

McCallister, M.W. et al., "Resonant Hemispherical Dielectric Antenna," *Electronics Letters*, vol. 20, No. 16, pp. 657-659, (Aug. 1984).

McCallister, M.W., et al., "Rectangular Dielectric Resonator Antenna," *Electronics Letter*, vol. 19, No. 6, pp. 218-219, (Mar. 1983).

Melanchuk et al. *CDPD and Emerging Digital Cellular Systems*, Digest of Papers of COMPCN, Computer Society Conference 1996, Santa Clara, CA, No. CONF. 41, Feb. 25, 1996, pp. 2-8, XP000628458.

Milne, R.M.T., "A Small Adaptive Array Antenna for Mobile Communications," *IEEE APS International Symposium Digest*, pp. 797-800, (1985).

Mobile Station-Base Station Compatibility Standard for Dual-Mode Wideband Spread Spectrum Cellular System, TIA Interim Standard, TIA/EIA.IS-95-A (Addendum to TIA/EIA/IS-95), May 1995.

Mobile Station-Base Station Compatibility Standard for Wideband Spread Spectrum Cellular Systems, TAI/EIA Standard, TIA/EIA-95-B (Upgrade and Revision of TIA/EIA-95-A), Mar. 1999.

Motorola, Version 1.0. *Motorola High Speed Data Air Interface Proposal Comparisions and Recommendations*. Jan. 27, 1997.

*MSC-BS Interface (A-Interface) for Public 800 MHz*. TIA/EIA/IS-634-A. TIA/EIA Interim Standard (Revision of TIA/EIA/IS-634) Jul. 1998.

*MSC-BS Interface for Public 800 MHz*. TIA/EIA/IS-634. TIA/EIA Interim Standard, Dec. 1995.

Network Wireless Systems Offer Business Unit (NWS OBU), Feature Definition Document for Code Division Multiple Access (CDMA) Packet Mode Data Services, FDD-1444, Nov. 26, 1996.

Ott, David TR45.5, CDMA WBSS Technical Standards Meeting Summary. Feb. 24-28, 1997 Banff, Alberta.

Ovesjö Frederik, European Telecommunication Standard, SMG2 UMTS physical Layer Expert Group, "UTRA Physical Layer Desriptions FDD parts" (v0.4 Jun. 25, 1998), pp. 1-41, XP-002141421.

Packet Data Service Option Standard for Wideband Spread Spectrum Systems, TIA/EIA Interim Standard, TIA/EIA.IS-657, Jul. 1996.

*Physical Layer Standard for cdma2000 Spread Spectrum Systems, Release C*. TIA/EIA Interim Standard TIA/EIA/IS-2000.2C. May 2002.

Preston, S., et al., "Direction Finding Using a Switched Parasitic Antenna Array," *IEEE APS International Symposium Digest*, Montreal, Canada, pp. 1024-1027, (1997).

Preston, S.L., et al., 'A Multibeam Antenna Using Switched Parasitic and Switched Active Elements for Space-Division Multiple Access Applications, *IEICE Trans. Electron.*, vol. E82-C, No. 7, pp. 1202-1210, (Jul. 1999).

Preston, S.L., et al., "Base-Station Tracking in Mobile Communications using a Switched Parasitic Antenna Array," *IEEE Trans. Antennas ans Propagation*, vol. 46, No. 6, pp. 841-844, (Jun. 1998).

Preston, S.L., et al., "Electronic Beam Steering Using Switched Parasitic Patch Elements," *Electronics Letters*, vol. 33, No. 1, pp. 7-8, (Jan. 2, 1997).

Preston, S.L., et al., "Size Reduction of Switched Parasitic Directional Antennas Using Genetic Algorithm Optimization Techniques, " *Asia Pacific Microwave Conference Proceedings*, Yokohama, Japan, pp. 1401-1404, (1998).

Preston, S.L., et al., "Systematic Approach to the Design of Directional Antennas Using Switched Parasitic and Switched Active Elements," *Asia Pacific Microwave Conference Proceedings*, Yokohama, Japan, pp. 531-534, (1998).

Puleston, PPP Protocol Spoofing Control Protocol, Global Village Communication (UK) Ltd., Feb. 1996.

Reed et al., Iterative Multiuser Detection for CDMA with FEC: Near-Single-User Performance, IEEE Transactions on Communications, vol. 46, No. 12, Dec. 1998, pp. 1693-1699.

Ruze, J., "Lateral-Feed Displacement in a Paraboloid," *IEEE Trans. Antennas and Propagation*, vol. 13, pp. 660-665, (1965).

Scott, N. L., et al., "Diversity Gain from a Single-Port Adaptive Antenna Using Switched Parasitic Elements Illustrated with a Wire and Monopole Prototype," *IEEE Trans. Antennas and Propagation*, vol. 47, No. 6, pp. 1066-1070, (Jun. 1999).

Shacham, et al., "A Selective-Repeat-ARQ Protocol for Parallel Channels and Its Resequencing Analysis," IEEE Transactions on Communications, XP000297814, 40 (4): 773-782 (Apr. 1997).

Sibille, A., et al., "Circular Switched Monopole Arrays for beam Steering Wireless Communications," *Electronics Letters*, vol. 33, No. 7, pp. 551-552, (Mar. 1997).

Simpson, W. (Editor). "RFC 1661—The Point-to-Point Protocol (PPP)." Network Working Group, Jul. 1994, pp. 1-35. http://www.faqs.org/rfcs/rfc1661.html.

Simpson, W. (Editor). "RFC 1662—PPP in HDLC-Like Framing." Network Working Group, Jul. 1994, pp. 1-17. http://www.faqs.org/rfcs/rfc1662.html.

Skinner et al., Performance of Reverse-Link Packet Transmission in Mobile Cellular CDMA Networks, IEEE, 2001, pp. 1019-1023.

Stage 1 Service Description for Data Services—High Speed Data Services (Version 0.10) CDG RF 38. Dec. 3, 1996.

*Support for 14.4 kbps Data Rate and Pcs Interaction for Wideband Spread Spectrum Cellular Systems*. TSB74, Dec. 1995. TIA/EIA Telecommunications Systems Bulletin.

*Telecommunications Industry Association Meeting Summary*. Task Group I, Working Group III, Subcommittee TR45.5. Feb. 24-27, 1997. Banff, Alberta.

*Telecommunications Industry Association Meeting Summary*. Task Group I, Working Group III, Subcommittee TR45.5. Jan. 6-8, 1997. Newport Beach, California.

TIA/EIA Interim Standard, Mobile Station-Base Station Compatibility Standard for Dual-Mode Wideband Spread Spectrum Cellular System, TIA/EIA/IS-95 (Jul. 1993).

Tsui et al., "Sensitivity of EW Receivers," Microwave Journal, vol. 25, pp. 115-117, 120 (Nov. 1982).

*Upper Layer (Layer 3) Signaling Standard for cdma2000 Spread Spectrum Systems, Release C*. TIA/EIA Interim Standard. TIA/EIA/IS-2000.5-C. May, 2002.

Vaughn, R., "Switched Parasitic Elements for Antenna Diversity," *IEEE Trans. Antennas and Propagation*, vol. 47, No. 2, pp. 399-405, (Feb. 1999).

Viterbi, The Path to Next Generation Services with CDMA, Qualcomm Incorporated, 1998 CDMA Americas Congress, Los Angeles, California, Nov. 19, 1998.

Wang et al., The Performance of Turbo-Codes in Asynchronous DS-CDMA, IEEE Global Communications Conference, Phoenix, Arizona, USA, Nov. 3-8, 1007, Gol. III, pp. 1548-1551.

Yang, Samuel C., "Principles of Code Division Multiple Access," In CDMA RF System Engineering, (MA: Artech House, Inc.), 1998, Chapter 4, pp. 75-103.

Attachment 2, *High Speed Data RLP* Lucent Technologies, Version 0.1, Jan. 16, 1997.

Azad et al., Multirate Spread Spectrum Direct Sequence CDMA Techniques, 1994, The Institute of Electrical Engineers.

Bell Labs Technical Journal, Lucent Technologies, vol. 2, No. 3, Summer 1997.

Budka et al., Cellular Digital Packet Data Networks, Bell Labs Technical Journal, Summer 1997, pp. 164-181.

Cellular Digital Packet Data, System Specification, Release 1.1, Jan. 19, 1995.

Chelouah, A., et al., "Angular Diversity Based on Beam Switching of Circular Arrays for Hiperlan Terminals," *Electronics Letters*, vol. 36, No. 5, pp. 387-388, (Mar. 2, 2000).

Chih-Lin I et al., IS-95 Enhancements for Multimedia Services, Bell Labs Technical Journal, pp. 60-87, Autumn 1996.

Chih-Lin I et al., Load and Interference Based Demand Assignment (LIDA) for Integrated Services in CDMA Wireless Systems, Nov. 18, 1996, pp. 235-241.

Chih-Lin I et al., Multi-Code CDMA Wireless Personal Communications Networks, Jun. 18, 1005.

Chih-Lin I et al., Performance of Multi-Code CDMA Wireless Personal Communications Networks, Jul. 25, 1995.

Chih-Lin I et al., Variable Spreading Gain CDMA with Adaptive Control for True Packet Switching Wireless Network, 1995, pp. 725-730.

Chung et al., Packet Synchronization and Identification for Incremental Redundancy Transmission in FH-CDMA Systems, 1992, IEEE, pp. 292-295.

*Data Service Options for Wideband Spread Spectrum Systems*. TIA/EIA Interim Standard. TIA/EIA/IS-707-A Apr. 1999.

Data Service Options for Wideband Spread Spectrum Systems: Introduction, PN-3676. 1 (to be published as TIA/EIA/IS-707.1), Mar. 20, 1997 (Content Revision 1).

*Data Services Option Standard for Wideband Spread Spectrum Digital Cellular System*. TIA/EIA/IS-99 TIA/EIA Interim Standard. Jul. 1995.

*Data Services Options Standard for Wideband Spread Spectrum Systems: Packet Data Services*. PN-3676.5 (to be publlished as TIA/EIA/IS-707.5) *Ballot Version*, May 30, 1997.

Data Standard, Packet Data Section, PN-3676.5 (to be published as TIA/EIA/IS-Data.5), Dec. 8, 1996, Version 2 (Content Revision 3).

Draft Text for "*95C*" Physical Layer (Revision 4), Part 1, Document #531-981-20814-95C, Part 1 on 3GPP2 website (ftp://ftp.3gpp2.org/tsgc/working/1998/1298_Maui/WG3-TG1/531-98120814c%20part%201.pdf).

Draft Text for "95C" Physical Layer (Revision 4), Part 2, Document #531-981-20814-95C, part 2 on 3GGP2 website (ftp://ftp.3gpp2.org/tsgc/working/1998/1298_Maui/WG3-TG1/531-98120814-95c,%20part%202.pdf, 1998).

Durnan, G.J., et al. "Optimization of Microwave Parabolic Antenna Systems Using Switched Parasitic Feed Structures," URSI National Science Meeting, Boulder, CO, p. 323, (Jan. 4-8, 2000).

Durnan, G.J., et al., "Switched Parasitic Feeds for Parabolic Antenna Angle Diversity," *Microwave and Optical Tech. Letters*, vol. 23, No. 4, pp. 200-2003(Nov. 20, 1999).

Ejzak et al., Lucent Technologies Air Interface Proposal for CDMA High Speed Data Service, Revision 0.1, May 5, 1997.

Ejzak et al., Lucent Technologies Air Interface Proposal for CDMA High Speed Data Service, Apr. 14, 1997.

Ejzak, et al. *Proposal for High Speed Packet Data Service, Version 0.1*. Lucent Technologies, Jan. 16, 1997.

Elhakeem, Congestion Control in Signalling Free Hybrid ATM/CDMA Satellite Network, IEEE, 1995, pp. 783-787.

Giger, A.J., *Low-Angle Microwave Propagation: Physics and Modeling*, Norwood, MA, Artech House, (1991).

Hall et al., Design and Analysis of Turbo Codes on Rayleigh Fading Channels, IEEE Journal on Selected Areas in Communications, vol. 16, No. 2, Feb. 1998, pp. 160-174.

Harrington, R.F., "Reactively Controlled Antenna Arrays," *IEEE APS International Symposium Digest*, Amherst, MA, pp. 62-65, (Oct. 1976).

Harrington, R.F., "Reactively Controlled Directive Arrays," *IEEE Trans. Antennas and Propagation*, vol. AP-26, No. 3, pp. 390-395, (May 1978).

Heine, Gunnar, "The Air-Interface of GSM", in GSM Networks: Protocols, Terminology, and Implementation, (MA: Artech House, Inc.), pp. 89-100 (1999).

High Data Rate (HDR), cdmaOne optimized for high speed, high capacity data, Wireless Infrastructure, Qualcomm, Sep. 1998.

Hindelang et al., Using Powerful "Turbo" Codes for 14.4 Kbit/s Data Service in GSM or PCS Systems, IEEE Global Communications Conference, Phoenix, Arizona, USA, Nov. 3-8, 1997, vol. II, pp. 649-653.

*Introduction to cdma2000 Spread Spectrum Systems, Release C*. TIA/EIA Interim Standard. TIA/EIA/IS-2000.1-C. May 20002.

James, J.R. et al., "Electrically Short Monopole Antennas with Dielectric or Ferrite Coatings," Proc. IEEE, vol. 125, pp. 793-803, (Sep. 1978).

James, J.R., et al., "Reduction of Antenna Dimensions with Dielectric Loading," *Electronics Letters*, vol. 10, No. 13, pp. 263-265, (May 1974).

Kaiser et al., Multi-Carrier CDMA with Iterative Decoding and Soft-Interference Cancellation, Proceedings of Globecom 1997, vol. 1, pp. 523-529.

King, R.W.P., "The Many Faces of the Insulated Antenna," Proc. IEEE, vol. 64, No. 2, pp. 228-238, (Feb. 1976).

Kingsley, S.P., et al., "Beam Steering and Monopulse Processing of Probe-Fed Dielectric Resonator Antennas," *IEEE Proc.-Radar, Sonar, Navigation*, vol. 146, No. 3, pp. 121-125, (Jun. 1999).

Knight, P., "Low-Frequency Behavior of the Beverage Aerial," *Electronics Letter*, vol. 13, No. 1, pp. 21-22, (Jan. 1977).

Knisely, Douglas, N. Telecommunications Industry Association Subcommittee TR-45.5—*Wideband Spread Spectrum Digital Technologies Standars*. Banff, Alberta. Feb. 24, 1997 (TR45.5/97.02.24)21.

Knisely, Douglas, N. Telecommunications Industry Association Subcommittee TR-45.5-Wideband Spread Spectrum Digital Technologies Standards, Working Group III-Physical Layer. Banff, Alberta. Feb. 24, 1997 (TR45.5/97.02.24)22.

Knisely, Lucent Technologies Air Interface Proposal for CDMA High Speed Data Service, Jan. 16, 1997.

Krzymien et al., Rapid Acquisition Algorithms for Synchronization of Bursty Transmissions in CDMA Microcellular and Personal Wireless Systems, IEEE Journal on Selected Areas in Communications, vol. 14, No. 3, Apr. 1996, pp. 570-579.

Kumar et al, An Access Scheme for High Speed Packet Data Service on IS-95 based CDMA, Feb. 11, 1997.

Lau et al., A Channel-State-Dependent Bandwidth Allocation scheme for Integrated Isochronous and Bursty Media Data in a Cellular Mobile Information System, IEEE, 2000, pp. 524-528.

Lee et al., "A Novel Hybrid CDMA/TDMA Protocol with a Reservation Request Slot for Wireless ATM Networks," IEICE Transactions on Communications, vol. E82-B, No. 7, pp. 1073-1076 (Jul. 25, 1999).

Liu et al., Channel Access and Interference Issues in Multi-Code DS-CDMA Wireless Packet (ATM) Networks, Wireless Networks 2, pp. 173-796, 1996.

Long, S.A., et al., "The Resonant Cylindrical Dielectric Cavity Antenna," *IEEE Trans. Antennas and Propagation*, vol. AP-31, No. 3, pp. 406-412, (May 1983).

Lu, J., et al., "Multi-beam Switched Parasitic Antenna Embedded in Dielectric for Wireless Communications Systems," *Electronics Letters*, vol. 37, No. 14, pp. 871-872, (Jul 5, 2001).

Lucent Technologies Presentation First Slide Titled, Summary of Multi-Channel Signaling Protocol, Apr. 6, 1997.

Lucent Technologies Presentation First Slide Titled, Why Support Symmetric HSD (Phase 1C), Feb. 21, 1997.

Luzwick, J., et al., "A Reactively Loaded Aperture Antenna Array," *IEEE Trans. Antennas and Propagation*, vol. AP-26, No. 4, pp. 543-547, (Jul 1978).

McCallister, M.W. et al., "Resonant Hemispherical Dielectric Antenna," *Electronics Letters*, vol. 20, No. 16, pp. 657-659, (Aug 1984).

McCallister, M.W., et al., "Rectangular Dielectric Resonator Antenna," *Electronics Letter*, vol. 19, No. 6, pp. 218-219, (Mar. 1983).

Melanchuk et al. *CDPD and Emerging Digital Cellular Systems*, Digest of Papers of COMPCN, Computer Society Conference 1996, Santa Clara, CA, No. CONF. 41, Feb. 25, 1996, pp. 2-8, XP000628458.

Milne, R.M.T., "A Small Adaptive Array Antenna for Mobile Communications," *IEEE APS International Symposium Digest*, pp. 797-800, (1985).

Mobile Station-Base Station Compatibility Standard for Dual-Mode Wideband Spread Spectrum Cellular Systems, TIA Interim Standard, TIA/EIA/IS-95-A (Addendum to TIA/EIA/IS-95), May 1995.

Mobile Station-Base Station Compatibility Standard for Wideband Spread Spectrum Cellular Systems, TIA/EIA Standard, TIA/EIA-95-B (Upgrade and Revision of TIA/EIA-95-A), Mar. 1999.

Motorola, Version 1.0. *Motorola High Speed Data Air Interface Proposal Comparisions and Recommendations*. Jan. 27, 1997.

*MSC-BS Interface (A-Interface) for Public 800 MHz*. TIA/EIA/ISs-634-A. TIA/EIA Interim Standard (Revision of TIA/EIA/IS-634) Jul. 1998.

*MSC-BS Interface for Public* 800 *MHz.* TIA/EIA/IS-634. TIA/EIA Interim Standard, Dec. 1995.

Network Wireless Systems Offer Business Unit (NWS OBU), Feature Definition Document for Code Division Multiple Access (CDMA) Packet Mode Data Services, FDD-1444, Nov. 26, 1996.

Ott, David TR45.5, CDMA WBSS Technical Standards Meeting Summary. Feb. 24-28, 1997 Banff, Alberta.

Ovesjö Frederik, European Telecommunication Standard, SMG2 UMTS physical Layer Expert Group, "UTRA Physical Layer Descriptions FDD parts" (v0.4, Jun. 25, 1998), pp. 1-41, XP-002141421.

Packet Data Service Option Standard for Wideband Spread Spectrum Systems, TIA/EIA Interim Standard, TIA/EIA/IS-657, Jul. 1996.

*Physical Layer Standard for cdma2000 Spread Spectrum Systems, Release C.* TIA/EIA Interim Standard. TIA/EIA/IS-2000.2C. May 2002.

Preston, S., et al., "Direction Finding Using a Switched Parasitic Antenna Array," *IEEE APS International Symposium Digest,* Montreal, Canada, pp. 1024-1027, (1997).

Preston, S.L., et al., 'A Multibeam Antenna Using Switched Parasitic and Switched Active Elements for Space-Division Multiple Access Applications, *IEICE Trans. Electron.,* vol. E82-C, No. 7, pp. 1202-1210, (Jul. 1999).

Preston, S.L., et al., "Base-Station Tracking in Mobile Communications using a Switched Parasitic Antenna Array," *IEEE Trans. Antennas and Propagation,* vol. 46, No. 6, pp. 941-844, (Jun. 1998).

Preston, S.L., et al., "Electronic Beam Steering Using Switched Parasitic Patch Elements," *Electronics Letters,* vol. 33, No. 1, pp. 7-8, (Jan. 2, 1997).

Preston, S.L., et al., "Size Reduction of Switched Parasitic Directional Antennas Using Genetic Algorithm Optimization Techniques," *Asia Pacific Microwave Conference Proceedings,* Yokohama, Japan, pp. 1401-1404, (1998).

Preston, S.L., et al., "Systematic Approach to the Design of Directional Antennas Using Switched Parasitic and Switched Active Elements," *Asia Pacific Microwave Conference Proceedings,* Yokohama, Japan, pp. 531-534, (1998).

Puleston, PPP Protocol Spoofing Control Protocol, Global Village Communication (UK) Ltd., Feb. 1996.

Reed et al., Iterative Multiuser Detection for CDMA with FEC: Near-Single-User Performance, IEEE Transactions on Communications, vol. 46, No. 12, Dec. 1998, pp. 1693-1699.

Ruze, J., "Lateral-Feed Displacement in a Paraboloid," *IEEE Trans. Antennas and Propagation,* vol. 13, pp. 660-665, (1965).

Scott, N. L., et al., "Diversity Gain from a Single-Port Adaptive Antenna Using Switched Parasitic Elements Illustrated with a Wire and Monopole Prototype," *IEEE Trans. Antennas and Propagation,* vol. 47, No. 6, pp. 1066-1070, (Jun. 1999).

Shacham, et al., "A Selective-Repeat-ARQ Protocol for Parallel Channels and Its Resequencing Analysis," IEEE Transactions On Communications, XP000297814, 40 (4): 773-782 (Apr. 1997).

Sibille, A., et al., "Circular Switched Monopole Arrays for beam Steering Wireless Communications," *Electronics Letters,* vol. 33, No. 7, pp. 551-552, (Mar. 1997).

Simpson, W. (Editor). "RFC 1661—The Point-to-Point Protocol (PPP)." Network Working Group, Jul. 1994, pp. 1-35. http://www.faqs.org/rfcs/rfc1661.html.

Simpson, W. (Editor). "RFC 1662 13 PPP in HDLC-Like Framing." Network Working Group, Jul. 1994, pp. 1-17. http://www/faqs.org/rfcs/rfc1662.html.

Skinner et al., Performance of Reverse-Link Packet Transmission in Mobile Cellular CDMA Networks, IEEE, 2001, pp. 1019-1023.

Stage 1 Service Description for Data Services—High Speed Data Services (Version 0.10) CDG RF 38. Dec. 3, 1996.

*Support for 14.4 kbps Data Rate and PCS Interaction for Wideband Spread Spectrum Cellular Systems.* TSB74, Dec. 1995. TIA/EIA Telecommunications Systems Bulletin.

*Telecommunications Industry Association Meeting Summary.* Task Group I, Working Group III, Subcommittee TR45.5. Feb. 24-27, 1997. Banff, Alberta.

*Telecommunications Industry Association Meeting Summary.* Task Group I, Working Group III, Subcommittee TR45.5. Jan. 6-8, 1997. Newport Beach, California.

TIA/EIA Interim Standard, Mobile Station-Base Station Compatibility Standard for Dual-Mode Wideband Spread Spectrum Cellular System, TIA/EIA/IS-95 (Jul. 1993).

Tsui et al., "Sensitivity of EW Receivers," Microwave Journal, vol. 25, pp. 115-117, 120 (Nov. 1982).

*Upper Layer (Layer 3) Signaling Standard for cdma2000 Spread Spectrum Systems, Release C.* TIA/EIA Interim Standard. TIA/EIA/IS-2000.5-C. May 2002.

Vaughn, R., "Switched Parasitic Elements for Antenna Diversity," *IEEE Trans. Antennas and Propagation,* vol. 47, No. 2, pp. 399-405, (Feb. 1999).

Viterbi, The Path to Next Generation Services with CDMA, Qualcomm Incorporated, 1998 CDMA Americas Congress, Los Angeles, California, Nov. 19, 1998.

Wang et al., The Performance of Turbo-Codes in Asynchronous DS-CDMA, IEEE Global Communications Conference, Phoenix, Arizona, USA, Nov. 3-8, 1007, Gol. III, pp. 1548-1551.

Yang, Samuel C., "Principles of Code Division Multiple Access," In CDMA RF System Engineering, (MA: Artech House, Inc.), 1998, Chapter 4, pp. 75-103.

Attachment 2, *High Speed Data RLP* Lucent Technologies, Version 0.1, Jan. 16, 1997.

Azad et al., Multirate Spread Spectrum Direct Sequence CDMA Techniques, 1994, The Institute of Electrical Engineers.

Bell Labs Technical Journal, Lucent Technologies, vol. 2, No. 3, Summer 1997.

Budka et al., Cellular Digital Packet Data Networks, Bell Labs Technical Journal, Summer 1997, pp. 164-181.

Cellular Digital Packet Data, System Specification, Release 1.1, Jan. 19, 1995.

Chelouah, A., et al., "Angular Diversity Based on Beam Switching of Circular Arrays for Hiperlan Terminals," *Electronics Letters,* vol. 36, No. 5, pp. 387-388, (Mar. 2, 2000).

Chih-Lin I et al., IS-95 Enhancements for Multimedia Services, Bell Labs Technical Journal, pp. 60-87, Autumn 1996.

Chih-Lin I et al., Load and Interference Based Demand Assignment (LIDA) for Integrated Services in CDMA Wirless Systems, Nov. 18, 1996, pp. 235-241.

Chih-Lin I et al., Multi-Code CDMA Wireless Personal Communications Networks, Jun. 18, 1005.

Chih-Lin I et al., Performance of Multi-Code CDMA Wireless Personal Communications Networks, Jul. 25, 1995.

Chih-Lin I et al., Variable Spreading Gain CDMA with Adaptive Control for True Packet Switching Wireless Networks, 1995, pp. 725-730.

Chung et al., Packet Synchronization and Identification for Incremental Redundancy Transmission in FH-CDMA Systems, 1992, IEEE, pp. 292-295.

*Data Service Options for Wideband Spread Spectrum Systems.* TIA/EIA Interim Standard. TIA/EIA/IS-707-A Apr. 1999.

Data Service Options for Wideband Spread Spectrum Systems: Introduction, PN-3676. 1 (to be published as TIA/EIA/IS-707.1), Mar. 20, 1997 (Content Revision 1).

*Data Services Option Standard for Wideband Spread Spectrum Digital Cellular System.* TIA/EIA/IS-99 TIA/EIA Interim Standard. Jul. 1995.

*Data Services Options Standard for Wideband Spread Spectrum Systems: Packet Data Services.* PN-3676.5 (to be published as TIA/EIA/IS-707.5) *Ballot Version,* May 30, 1997.

Data Standard, Packet Data Section, PN-3676.5 (to be published as TIA/EIA/IS-Data.5), Dec. 8, 1996, Version 2 (Content Revision 3).

Draft Text for "*95C" Physical Layer (Revision 4), Part 1, Document #531-981-20814-95C, Part 1 on 3GPP2 website (ftp://ftp.3gpp2.org/tsgc/working/1998-1298_Maui/WG3-TG1/531-98120814-95c,%20part%201.pdf).

Draft Text for "95C" Physical Layer (Revision 4), Part 2, Document #531-981-20814-95C, part 2 on 3GGP2 website (ftp://ftp.3gpp2.org.tsgc/working/1998/1298_Maui/WG3-TG1/531-98120814-95c,%20part%202.pdf, 1998).

Durnan, G.J., et al. "Optimization of Microwave Parabolic Antenna Systems Using Switched Parasitic Feed Structures," URSI National Science Meeting, Boulder, CO, p. 323, (Jan. 4-8, 2000).

Durnan, G.J., et al., "Switched Parasitic Feeds for Parabolic Antenna Angle Diversity," *Microwave and Optical Tech. Letters*, vol. 23, No. 4, pp. 200-2003 (Nov. 20, 1999).
Ejzak et al., Lucent Technologies Air Interface Proposal for CDMA High Speed Data Service, Revision 0.1, May 5, 1997.
Ejzak et al., Lucent Technologies Air Interface Proposal for CDMA High Speed Data Service, Apr. 14, 1997.
Ejzak, et al. *Proposal for High Speed Packet Data Service, Version 0.1*. Lucent Technologies, Jan. 16, 1997.
Elhakeem, Congestion Control in Signalling Free Hybrid ATM/CDMA Satellite Network, IEEE, 1995, pp. 783-787.
Giger, A.J., *Low-Angle Microwave Propagation: Physics and Modeling*, Norwood, MA, Artech House, (1991).
Hall et al., Design and Analysis of Turbo Codes on Rayleigh Fading Channels, IEEE Journal on Selected Areas in Communications, vol. 16, No. 2, Feb. 1998, pp. 160-174.
Harrington, R.F., "Reactively Controlled Antenna Arrays," *IEEE APS International Symposium Digest*, Amherst, MA, pp. 62-65, (Oct. 1976).
Harrington, R.F., "Reactively Controlled Directive Arrays," *IEEE Trans. Antennas and Propagation*, vol. AP-26, No. 3, pp. 390-395, (May 1978).
Heine, Gunnar, "The Air-Interface of Gsm", in GSM Networks: Protocols, Terminology, and Implementation, (MA: Artech House, Inc.), pp. 89-100 (1999).
High Data Rate (HDR), cdmaOne optimized for high speed, high capacity data, Wireless Infrastructure, Qualcomm, Sep. 1998.
Hindelang et al., Using Powerful "Turbo" Codes for 14.4 Kbit/s Data Service in Gsm or Pcs Systems, IEEE Global Communications Conference, Phoenix, Arizona, USA, Nov. 3-8, 1997, vol. II, pp. 649-653.
*Introduction to cdma2000 Spread Spectrum Systems, Release C.* TIA/EIA Interim Standard. TIA/EIA/IS-2000.1-C. May 2002.
James, J.R. et al., "Electrically Short Monopole Antennas with Dielectric or Ferrite Coatings," Proc. IEEE, vol. 125, pp. 793-803, (Sep. 1978).
James, J.R., et al., "Reduction of Antenna Dimensions with Dielectric Loading," *Electronics Letters*, vol. 10, No. 13, pp. 263-265, (May 1974).
Kaiser et al., Multi-Carrier CDMA with Iterative Decoding and Soft-Interference Cancellation, Proceedings of Globecom 1997, vol. 1, pp. 523-529.
King, R.W.P., "The Many Faces of the Insulated Antenna," Proc. IEEE, vol. 64, No. 2, pp. 228-238, (Feb. 1976).
Kingsley, S.P., et al., "Beam Steering and Monopulse Processing of Probe-Fed Dielectric Resonator Antennas," *IEEE Proc.-Radar, Sonar, Navigation*, vol. 146, No. 3, pp. 121-125, (Jun. 1999).
Knight, P., "Low-Frequency Behavior of the Beverage Aerial," *Electronics Letter*, vol. 13, No. 1, pp. 21-22, (Jan. 1977).
Knisely, Douglas, N. Telecommunications Industry Association Subcommittee TR-45.5—*Wideband Spread Spectrum Digital Technologies Standards*. Banff, Alberta. Feb. 24, 1997 (TR45.5-97.02.24)21.
Knisely, Douglas, N. Telecommunications Industry Association Subcommittee TR-45.5-Wideband Spread Spectrum Digital Technologies Standards, Working Group III-Physical Layer. Banff, Alberta, Feb. 24, 1997 (TR45.5/37.02.24)22.
Knisely, Lucent Technologies Air Interface Proposal for CDMA High Speed Data Service, Jan. 16, 1997.
Krzymien et al., Rapid Acquisition Algorithms for Synchronization of Bursty Transmissions in CDMA Microcellular and Personal Wireless Systems, IEEE Journal on Selected Areas in Communications, vol. 14, No. 3, Apr. 1996, pp. 570-579.
Kumar et al, An Access Scheme for High Speed Packet Data Service on IS-95 based CDMA, Feb. 11, 1997.
Lau et al., A Channel-State-Dependent Bandwidth Allocation scheme for Integrated Isochronous and Bursty Media Data in a Cellular Mobile Information System, IEEE, 2000, pp. 524-528.
Lee et al., "A Novel Hybrid CDMA/TDMA Protocol with a Reservation Request Slot for Wireless ATM Networks," IEICE Transactions on Communications, vol. E82-B, No. 7, pp. 1073-1076 (Jul, 25, 1999).
Liu et al., Channel Access and Interference Issues in Multi-Code DS-CDMA Wireless Packet (ATM) Networks, Wireless Networks 2, pp. 173-196, 1996.

Long, S.A., et al., "The Resonant Cylindrical Dielectric Cavity Antenna," *IEEE Trans. Antennas and Propagation*, vol. AP-31, No. 3, pp. 406-412, (May 1983).
Lu, J., et al., "Multi-beam Switched Parasitic Antenna Embedded in Dielectric for Wireless Communications Systems," *Electronics LEtters*, vol. 37, No. 14, pp. 871-872, (Jul. 5, 2001).
Lucent Technologies Presentation First Slide Titled, Summary of Multi-Channel Signaling Protocol, Apr. 6, 1997.
Lucent Technologies Presentation First Slide Titled, Why Support Symmetric HSD (Phase 1C), Feb. 21, 1997.
Luzwick, J., et al., "A Reactively Loaded Aperture Antenna Array," *IEEE Trans. Antennas and Propagation*, vol. AP-26, No. 4, pp. 543-547, (Jul. 1978).
McCallister, M.W. et al., "Resonant Hemispherical Dielectric Antenna," *Electronics Letters*, vol. 20, No. 16, pp. 657-659, (Aug. 1984).
McCallister, M.W., et al., "Rectangular Dielectric Resonator Antenna," *Electronics Letter*, vol. 19, No. 6, pp. 218-219, (Mar. 1983).
Melanchuk et al. *CDPD and Emerging Digital Cellular Systems*, Digest of Papers of CONPCN, Computer Society Conference 1996, Santa Clara, CA, No. CONF. 41, Feb. 25, 1996, pp. 2-8, XP000628458.
Milne, R.M.T., "A Small Adaptive Array Antenna for Mobile Communications," *IEEE APS International Symposium Digest*, pp. 797-800, (1985).
Mobile Station-Base Station Compatibility Standard for Dual-Mode Wideband Spread Spectrum Cellular System, TIA Interim Standard, TIA/EIA/IS-95-A (Addendum to TIA.EIA/IS-95), May 1995.
Mobile Station-Base Station Compatibility Standard for Wideband Spread Spectrum Cellular Systems, TIA/EIA Standard, TIA/EIA-95-B (Upgrade and Revision of TIA/EIA-95-A), Mar. 1999.
Motorola, Version 1.0. *Motorola High Speed Data Air Interface Proposal Comparisions and Recommendations*. Jan. 27, 1997.
*MSC-BS Interface (A-Interface) for Public 800 MHz*. TIA/EIA/IS-634-A. TIA/EIA Interim Standard (Revision of TIA/EIA/IS-634) Jul. 1998.
*MSC-BS Interface for Public 800 MHz*. TIA/EIA/IS-634. TIA/EIA Interim Standard, Dec. 1995.
Network Wireless Systems Offer Business Unit (NWS OBU), Feature Definition Document for Code Division Multiple Access (CDMA) packet Mode Data Services, FDD-1444, Nov. 26, 1996.
Ott, David TR45.5, CDMA WBSS Technical Standards Meeting Summary. Feb. 24-28, 1997 Banff, Alberta.
Ovesjö Frederik, European Telecommunication Standard, SMG2 UMTS physical Layer Expert Group, "UTRA Physical Layer Descriptions FDD parts" (v.0.4, Jun. 25, 1998), pp. 1-41, XP-002141421.
Packet Data Service Option Standard for Wideband Spread Spectrum Systems, TIA/EIA Interim Standard, TIA/EIA/IS-657, Jul. 1996.
*Physical Layer Standard for cdma2000 Spread Spectrum Systems, Release C*. TIA/EIA Interim Standard. TIA/EIA/IS-2000.2C. May 2002.
Preston, S., et al., "Direction Finding Using a Switched Parasitic Antenna Array," *IEEE APS International Symposium digest*, Montreal, Canada, pp. 1024-1027, (1997).
Preston, S.L., et al., 'A Multibeam Antenna Using Switched Parasitic and Switched Active Elements for Space-Division Multiple Access Applications, *IEICE Trans. Electron.*, vol. E82-C, No. 7, pp. 1202-1210, (Jul. 1999).
Preston, S.L., et al., "Base-Station Tracking in Mobile Communications using a Switched Parasitic Antenna Array," *IEEE Trans. and Propagation*, vol. 46, No. 6, pp. 841-844, (Jun. 1998).
Preston, S.L., et al., "Electronic Beam Steering Using Switched Parasitic Patch Elements," *Electronics Letters*, vol. 33, No. 1, pp. 7-8, (Jan. 2, 1997).
Preston, S.L., et al., "Size Reduction of Switched Parasitic Directional Antennas Using Genetic Algorithm Optimization Techniques," *Asia Pacific Microwave Conference Proceedings*, Yokohama, Japan, pp. 1401-1404, (1998).
Preston, S.L., et al., "Systematic Approach to the Design of Directional Antennas Using Switched Parasitic and Switched Active Elements," *Asia Pacific Microwave Conference Proceedings,* Yokohama, Japan, pp. 531-534, (1998).

Puleston, PPP Protocol Spoofing Control Protocol, Global Village Communication (UK) Ltd., Feb. 1996.

Reed et al., Iterative Multiuser Detection for CDMA with FEC: Near-Single-User Performance, IEEE Transactions on Communications, vol. 46, No. 12, Dec. 1998, pp. 1693-1699.

Ruze, J., "Lateral-Feed Displacement in a Paraboloid," *IEEE Trans. Antennas and Propagation,* vol. 13, pp. 660-665, (1965).

Scott, N. L., et al., "Diversity Gain from a Single-Port Adaptive Antenna Using Switched Parasitic Elements Illustrated with a Wire Monopole Prototype," *IEEE Trans. Antennas and Propagation,* vol. 47, No. 6, pp. 1066-1070, (Jun. 1999).

Shacham, et al., "A Selective-Repeat-ARQ Protocol for Parallel Channels and Its Resequencing Analysis," IEEE Transactions On Communications, XP0001297814, 40 (4): 773-782 (Apr. 1997).

Sibille, A., et al., "Circular Switched Monopole Arrays for beam Steering Wireless Communications," *Electronics Letters,* vol. 33, No. 7, pp. 551-552, (Mar. 1997).

Simpson, W. (Editor). "RFC 1661—The Point-to-Point Protocol (PPP)." Network Working Group, Jul. 1994, pp. 1-35. http://www.faqs.org/rfcs/rfc1661.html.

Simpson, W. (Editor). "RFC 1662—PPP in HDLC-Like Framing." Network Working Group, Jul. 1994, pp. 1-17. http://www.faqs.org/rfcs/rfc1662.html.

Skinner et al., Performance of Reverse-Link Packet Transmission in Mobile Cellular CDMA Networks, IEEE, 2001, pp. 1019-1023.

Stage 1 Service Description for Data Services—High Speed Data Services (Version 0.10) CDG RF 38. Dec. 3, 1996.

*Support for 14.4 kbps Data Rate and PCS Interaction for Wideband Spread Spectrum Cellular Systems.* TSB74, Dec. 1995. TIA/EIA Telecommunications Systems Bulletin.

*Telecommunications Industry Association Meeting Summary.* Task Group I, Working Group III, Subcommittee TR45.5. Feb. 24-27, 1997. Banff, Alberta.

*Telecommunications Industry Association Meeting Summary.* Task Group I, Working Group III, Subcommittee TR45.5. Jan. 6-8, 1997. Newport Beach, California.

TIA/EIA Interim Standard, Mobile Station-Base Station Compatibility Standard for Dual-Mode Wideband Spread Spectrum Cellular System, TIA/EIA/IA-95 (Jul. 1993).

Tsui et al., "Sensitivity of EW Receivers," Microwave Journal, vol. 25, pp. 115-117, 120 (Nov. 1982).

*Upper Layer (Layer 3) Signaling Standard for cdma2000 Spread Spectrum Systems, Release C.* TIA/EIA Interim Standard. TAI/EIA/IS-2000.5-C. May, 2002.

Vaughn, R., "Switched Parasitic Elements for Antenna Diversity," *IEEE Trans. Antennas and Propagation,* vol. 47, No. 2, pp. 399-405, (Feb. 1999).

Viterbi, The Path to Next Generation Services with CDMA, Qualcomm Incorporated, 1998 CDMA Americas Congress, Los Angeles, California, Nov. 19, 1998.

Wang et al., The Performance of Turbo-Codes in Asynchronous DS-CDMA, IEEE Global Communications Conference, Phoenix, Arizona, USA, Nov. 3-8, 1007, Gol. III, pp. 1548-1551.

www.cdg.org/news/press/1997.asp. CDA Press Release Archive. 1997.

Yang, Samuel C., "Principles of Code Division Multiple Access," In CDMA RF System Engineering, (MA: Artech House, Inc.), 1998, Chapter 4, pp. 75-103.

Attachment 2, *High Speed Data RLP Lucent Technologies,* Version 0.1, Jan. 16, 1997.

Azad et al., Multirate Spread Spectrum Direct Sequence CDMA Techniques, 1994, The Institute of Electrical Engineers.

Bell Labs Technical Journal, Lucent Technologies, vol. 2, No. 3, Summer 1997.

Budka et al., Cellular Digital Packet Data Networks, Bell Labs Technical Journal, Summer 1997, pp. 164-181.

Cellular Digital Packet Data, System Specification, Release 1.1, Jan. 19, 1995.

Chelouah, A., et al., "Angular Diversity Based on Beam Switching of Circular Arrays for Hiperlan Terminals," *Electronics Letters,* vol 36, No. 5, pp. 387-388, (Mar. 2, 2000).

Chih-Lin I et al., IS-95 Enhancements for Multimedia Services, Bell Labs Technical Journal, pp. 60-87, Autumn 1996.

Chih-Lin I et al., Load and Interference Based Demand Assignment (LIDA) for Integrated Services in CDMA Wireless Systems, Nov. 18, 1996, pp. 235-241.

Chih-Lin I et al., Multi-Code CDMA Wireless Personal Communications Networks, Jun. 18, 1005.

Chih-Lin I et al., Performance of Multi-Code CDMA Wireless Personal Communications Networks, Jul. 25, 1995.

Chih-Lin I et al., Variable Spreading Gain CDMA with Adaptive Control for True Packet Switching Wireless Network, 1995, pp. 725-730.

Chung et al., Packet Synchronization and Identification for Incremental Redundancy Transmission in FH-CDMA Systems, 1992, IEEE, pp. 292-295.

*Data Service Options for Wideband Spread Spectrum Systems.* TIA/EIAa Interim Standard. TIA/EIA/IS-707-A Apr. 1999.

Data Service Options for Wideband Spread Spectrum Systems: Introduction, PN-3676. 1 (to be published as TIA/EAI/IS-707.1), Mar. 20, 1997 (Content Revision 1).

*Data Services Option Standard for Wideband Spread Spectrum Digital Cellular System.* TIA/EIA/IS-99. TIA/EIA Interim Standard. Jul. 1995.

*Data Services Options Standard for Wideband Spread Spectrum Systems: Packet Data Services.* PN-3676.5 (to be published as TIA/EIA/IS-707.5) *Ballot Version,* May 30, 1997.

Data Standard, Packet Data Section, PN-3676.5 (to be published as TIA/EIA/IS-Data.5), Dec. 8, 1996, Version 2 (Content Revision 3).

Draft Text for "*95C" Physical Layer (Revision 4), Part 1, Document #531-981-20814-95C, Part 1 on 3GPP2 website (ftp://ftp.3gpp2.org/tsgc/working/1998/1298_Maui/WG3-TG1/531-9814-95c,%20part%201.pdf).

Draft Text for "95C" Physical Layer (Revision 4), Part 2, Document #531-981-20814-95C, part 2 on 3GGP2 website (ftp://ftp.3gpp2.org/tsgc/working/1998/1298_Maui/WG3-TG1/531-98120814-95c,%20part%202.pdf, 1998).

Durnan, G.J., et al. "Optimization of Microwave Parabolic Antenna Systems Using Switched Parasitic Feed Structures," URSI National Science Meeting, Boulder, CO, p. 323, (Jan. 4-8, 2000).

Durnan, G.J., et al., "Switched Parasitic Feeds for Parabolic Antenna Angle Diversity," *Microwave and Optical Tech, Letters,* vol. 23, No. 4, pp. 200-2003 (Nov. 20, 1999).

Ejzak et al., Lucent Technologies Air Interface Proposal for CDMA High Speed Data Service, Revision 0.1, May 5, 1997.

Ejzak et al., Lucent Technologies Air Interface Proposal for CDMA High Speed Data Service, Apr. 14, 1997.

Ejzak, et al. *Proposal for High Speed Packet Data Service, Version 0.1.* Lucent Technologies, Jan. 16, 1997.

Elhakeem, Congestion Control in Signalling Free Hybrid ATM/CDMA Satellite Network, IEEE, 1995, pp. 783-787.

Giger, A.J., *Low-Angle Microwave Propagation: Physics and Modeling,* Norwood, MA, Artech House, (1991).

Hall et al., Design and Analysis of Turbo Codes on Rayleigh Fading Channels, IEEE Journal on Selected Areas in Communications, vol. 16, No. 2, Feb. 1998, pp. 160-174.

Harrington, R.F., "Reactively Controlled Antenna Arrays," *IEEE APS International Symposium Digest,* Amherst, MA, pp. 62-65, (Oct. 1976).

Harrington, R.F., "Reactively Controlled Directive Arrays," *IEEE Trans. Antennas and Propagation,* vol. Ap-26, No. 3, pp. 390-395, (May 1978).

Heine, Gunnar, "The Air-Interface of GSM", in GSM Networks: Protocols, Terminology, and Implementation, (MA: Artech House, Inc.), pp. 89-100 (1999).

High Data Rate (HDR), cdmaOne optimized for high speed, high capacity data, Wireless Infrastructure, Qualcomm, Sep. 1998.

Hindelang et al., Using Powerful "Turbo" Codes for 14.4 Kbit/s Data Service in GSM or PCS Systems, IEEE Global Communications Conference, Phoenix, Arizona, USA, Nov. 3-8, 1997, vol. II, pp. 649-653.

*Introduction to cdma2000 Spread Spectrum Systems, Release C.* TIA/EIA Interim Standard. TIA/EIA/IS-2000.1-C. May 2002.

James, J.R. et al., "Electrically Short Monopole Antennas with Dielectric or Ferrite Coatings," Proc. IEEE, vol. 125, pp. 793-803, (Sep. 1978).

James, J.R., et al., "Reduction of Antenna Dimensions with Dielectric Loading," *Electronics Letters,* vol. 10, No. 13, pp. 263-265, (May 1974).

Kaiser et al., Multi-Carrier CDMA with Iterative Decoding and Soft-Interference Cancellation, Proceedings of Globecom 1997, vol. 1, pp. 523-529.

King, R.W.P., "The Many Faces of the Insulated Antenna," Proc. IEEE, vol. 64, No. 2, pp. 228-238, (Feb. 1976).

Kingsley, S.P., et al., "Beam Steering and Monopulse Processing of Probe-Fed Dielectric Resonator Antennas," *IEEE Proc.-Radar, Sonar, Navigation,* vol. 146, No. 3, pp. 121-125, (Jun. 1999).

Knight, P., "Low-Frequency Behavior of the Beverage Aerial," *Electronics Letter,* vol. 13, No. 1, pp. 21-22, (Jan. 1977).

Knisely, Douglas, N. Telecommunications Industry Association Subcommittee TR-45.5—*Wideband Spread Spectrum Digital Technologies Standards.* Banff, Alberta. Feb. 24, 1997 (TR45.5-97.02.24)21.

Knisely, Douglas, N. Telecommunications Industry Association Subcommittee TR-45.5-Wideband Spread Spectrum Digital Technologies Standards, Working Group III-Physical Layer. Banff, Alberta. Feb. 24, 1997 (TR45.5/97.02.24)22.

Knisely, Lucent Technologies Air Interface Proposal for CDMA High Speed Data Service, Jan. 16, 1997.

Krzymien et al., Rapid Acquisition Algorithms for Synchronization of Bursty Transmissions in CDMA Microcellular and Personal Wireless Systems, IEEE Journal on Selected Areas in Communications, vol. 14, No. 3, Apr. 1996, pp. 570-579.

Kumar et al, An Access Scheme for High Speed Packet Data Service on IS-95 based CDMA, Feb. 11, 1997.

Lau et al., A Channel-State-Dependent Bandwidth Allocation scheme for Integrated Isochronous and Bursty Media Data in a Cellular Mobile Information System, IEEE, 2000, pp. 524-258.

Lee et al., "A Novel Hybrid CDMA/TDMA Protocol with a Reservation Request Slot for Wireless ATM Networks," IEICE Transactions on Communications, vol. E82-B, No. 7, pp. 1073-7076 (Jul. 25, 1999).

Liu et al., Channel Access and Interference Issues in Multi-Code DS-CDMA Wireless Packet (ATM) Networks, Wireless Networks 2, pp. 173-796, 1996.

Long, S.A., et al., "The Resonant Cylindrical Dielectric Cavity Antenna," *IEEE Trans. Antennas and Propagation,* vol. AP-31, No. 3, pp. 406-412, (May 1983).

Lu, J., et al., "Multi-beam Switched Parasitic Antenna Embedded in Dielectric for Wireless Communications Systems," *Electronics Letters,* vol. 37, No. 14, pp. 871-872, (Jul. 5, 2001).

Lucent Technologies Presentation First Slide Titled, Summary of Multi-Channel Signaling Protocol, Apr. 6, 1997.

Lucent Technologies Presentation First Slide Titled, Why Support Symmetric HSD (Phase 1C), Feb. 21, 1997.

Luzwick, J., et al., "A Reactively Loaded Aperture Antenna Array," *IEEE Trans. Antennas and Propagation,* vol. AP-26, No. 4, pp. 543-547, (Jul. 1978).

McCallister, M.W. et al., "Resonant Hemispherical Dielectric Antenna," *Electronics Letters,* vol. 20, No. 16, pp. 657-659, (Aug. 1984).

McCallister, M.W., et al., "Rectangular Dielectric Resonator Antenna," *Electronics Letter,* vol. 19, No. 6, pp. 218-219, (Mar. 1983).

Melanchuk et al. *CDPD and Emerging Digital Cellular Systems,* Digest of Papers of COMPCN, Computer Society Conference 1996, Santa Clara, CA, No. CONF. 41, Feb. 25, 1996, pp. 2-8, XP000628458.

Milne, R.M.T., "A Small Adaptive Array Antenna for Mobile Communications," *IEEE APS International symposium Digest,* pp. 797-800, (1985).

Mobile Station-Base Station Compatibility Standard for Dual-Mode Wideband Spread Spectrum Cellular System, TIA Interim Standard, TIA/EIA/IS-95-A (Addendum to TIA/EIA/IS-95), May 1995.

Mobile Station-Base Station Compatibility Standard for Wideband Spread Spectrum Cellular Systems, TIAa/EIA Standard, TIA/EIA-95-B (Upgrade and Revision of TIA/EIA-95-A), Mar. 1999.

Motorola, Version 1.0. *Motorola High Speed Data Air Interface Proposal Comparisions and Recommendations.* Jan. 27, 1997.

MSC-BS Interface (A-Interface) for Public 800 MHz. TIA/EIA/IS-634-A. TIA/EIA Interim Standard (Revision of TIA/EIA/IS-634) Jul. 1998.

*MSC-BS Interface for Public 800 MHz.* TIA/EIA-634. TIA/EIA Interim Standard, Dec. 1995.

Network Wireless Systems Offer Business Unit (NWS OBU), Feature Definition Document for Code Division Multiple Access (CDMA) Packet Mode Data Services, FDD-1444, Nov. 26, 1996.

Ott, David TR45.5, CDMA WBSS Technical Standards Meeting Summary. Feb. 24-28, 1997 Banff, Alberta.

Ovesjö Frederik, European Telecommunication Standard, SMG2 UMTS physical Layer Expert Group, "UTRA Physical Layer Descriptins FDD parts" (v0.4, Jun. 26, 1998), pp. 1-41, XP002141421.

Packet Data Service Option Standard for Wideband Spread Spectrum Systems, TIA/EIA Interim Standard, TIA/EIA/IS-657, Jul. 1996.

*Physical Layer Standard for cdma2000 Spread Spectrum Systems, Release C.* TIA/EIA Interim Standard. TIA/EIA/IS-2000.2C. May 2002.

Preston, S., et al., "Direction Finding Using a Switched Parasitic Antenna Array," *IEEE APS International Symposium Digest,* Montreal, Canada, pp. 1024-1027, (1997).

Preston, S.L., et al., 'A Multibeam Antenna Using Switched Parasitic and Switched Active Elements for Space-Division Multiple Access Applications, *IEICE Trans. Electron.,* vol. E82-C, No. 7, pp. 1202-1210, (Jul. 1999).

Preston, S.L., et al., "Base-Station Tracking in Mobile Communications using a Switched Parasitic Antenna Array," *IEEE Trans Antennas and Propagatin,* vol. 46, No. 6, pp. 841-844, (Jun. 1998).

Preston, S.L., et al., "Electronic Beam Steering Using Switched Parasitic Patch Elements," *Electronics Letters,* vol. 33, No. 1, pp. 7-8, (Jan. 2, 1997).

Preston, S.L., et al., "Size Reduction of Switched Parasitic Directional Antennas Using Genetic Algorithm Optimization Techniques," *Asia Pacific Microwave Conference Proceedings,* Yokohama, Japan, pp. 1401-1404, (1998).

Preston, S.L., et al., "Systematic Approach to the Design of Directional Antennas Using Switched Parasitic and Switched Active Elements," *Asia Pacific Microwave Conference Proceedings,* Yokojama, Japan, pp. 531-534, (1998).

Puleston, PPP Protocol Spoofing Control Protocol, Global Village Communication (UK) Ltd., Feb. 1996.

Reed et al., Iterative Multiuser Detection for CDMA with FEC: Near-Single-User Performance, IEEE Transactions on Communications, vol. 46, No. 12, Dec. 1998, pp. 1693-1699.

Ruze, J., "Lateral-Feed Displacement in a Paraboloid," *IEEE Trans. Antennas and Propagation,* vol. 13, pp. 660-665, (1965).

Scott, N. L., et al., "Diversity Gain from a Single-Port Adaptive Antenna Using Switched Parasitic Elements Illustrated with a Wire and Monopole Prototype," *IEEE Trans. Antennas and Propagation,* vol. 47, No. 6, pp. 1066-1070, (Jun. 1999).

Shacham, et al., "A Selective-Repeat-ARQ Protocol for Parallel Channels and Its Resequencing Analysis," IEEE Transactions on Communications, XP000297814, 40 (4): 773-782 (Apr. 1997).

Sibille, A., et al., "Circular Switched Monopole Arrays for beam Steering Wireless Communications," *Electronics Letters,* vol. 33, No. 7, pp. 551-552, (Mar. 1997).

Simpson, W. (Editor). "RFC 1661—The Point-to-Point Protocol (PPP)." Network Working Group, Jul. 1994, pp. 1-35. http://www.faqs.org/rfcs/rfc1661.html.

Simpson, W. (Editor). "RFC 1662—PPP in HDLC-Like Framing." Network Working Group, Jul. 1994, pp. 1- 17. http://www.faqs.org/rfcs/rfc1662.html.

Skinner et al., Performance of Reverse-Link Packet Transmission in Mobile Cellular CDMA Networks, IEEE, 2001, pp. 1019-1023.

Stage 1 Service Description for Data Services—High Speed Data Services (Version 0.10) CDG RF 38. Dec. 3, 1996.

*Support for 14.4 kbps Data Rate and PCS Interaction for Wideband Spread Spectrum Cellular Systems.* TSB74, Dec. 1995. TIA/EIA Telecommunications Systems Bulletin.

*Telecommunications Industry Association Meeting Summary.* Task Group I, Working Group III, Subcommittee TR45.5. Feb. 24-27, 1997. Banff, Alberta.
*Telecommunications Industry Association Meeting Summary.* Task Group I, Working Group III, Subcommittee TR45.5. Jan. 6-8, 1997. Newport Beach, California.
TIA/EIA Interim Standard, Mobile Station-Base Station Compatibility Standard for Dual-Mode Wideband Spread Spectrum Cellular System, TIA/EIA/IS-95 (Jul. 1993).
Tsui et al., "Sensitivity of EW Receivers," Microwave Journal, vol. 25, pp. 115-117, 120 (Nov. 1982).
*Upper Layer (Layer 3) Signaling Standard for cdma2000 Spread Spectrum Systems, Release C.* TIA/EIA Interim Standard. TIA/EIA/IS-2000.5-C. May, 2002.
Vaughn, R., "Switched Parasitic Elements for Antenna Diversity," *IEEE Trans. Antennas and Propagation,* vol. 47, No. 2, pp. 399-405, (Feb. 1999).
Viterbi, The Path to Next Generation Services with CDMA, Qualcomm Incorporated, 1998 CDMA Americas Congress, Los Angeles, California, Nov. 19, 1998.
Wang et al., The Performance of Turbo-Codes in Asynchronous DS-CDMA, IEEE Global Communications Conference, Phoenix, Arizona, USA, Nov. 3-8, 1007, Gol. III, pp. 1548-1551.
www.cdg.org/news/press/1997.asp. CDA Press Release Archive, 1997.
Yang, Samuel C., "Principles of Code Division Multiple Access," In CDMA RF System Engineering, (MA: Artech House, Inc.), 1998, Chapter 4, pp. 75-103.
Attachment 2, *High Speed Data RLP* Lucent Technologies, Version 0.1, Jan. 16, 1997.
Azad et al., Multirate Spread Spectrum Direct Sequence CDMA Techniques, 1994, The Institute of Electrical Engineers.
Bell Labs Technical Journal, Lucent Technologies, vol. 2, No. 3, Summer 1997.
Budka et al., Cellular Digital Packet Data Networks, Bell Labs Technical Journal, Summer 1997, pp. 164-181.
Cellular Digital Packet Data, System Specification, Release 1.1, Jan. 19, 1995.
Chelouah, A., et al., "Angular Diversity Based on Beam Switching of Circular Arrays for Hiperlan Terminals," *Electronics Letters,* vol. 36, No. 5, pp.387-388, (Mar. 2, 2000).
Chih-Lin I et al., IS-95 Enhancements for Multimedia Services, Bell Labs Technical Journal, pp. 60-87, Autumn 1996.
Chih-Lin I et al., Load and Interference Based Demand Assignment (LIDA) for Integrated Services in CDMA Wirless Systems, Nov. 18, 1996, pp. 235-241.
Chih-Lin I et al., Multi-Code CDMA Wireless Personal Communications Networks, Jun. 18, 1005.
Chih-Lin I et al., Performance of Multi-Code CDMA Wireless Personal Communications Networks, Jul. 25, 1995.
Chih-Lin I et al., Variable Spreading Gain CDMA with Adaptive Control for True Packet Switching Wireless Network, 1995, pp. 725-730.
Chung, Packet Synchronization and Identification for Incremental Redundancy Transmission in FH-CDMA Systems, 1992, IEEE, pp. 292-295.
*Data Service Options for Wideband Spread Spectrum Systems.* TIA/EIA Interim Standard. TIA/EIA/IS-707-A Apr. 1999.
Data Service Options for Wideband Spread Spectrum Systems: Introduction, PN-3676. 1 (to be published as TIA/EIA/IS-707.1), Mar. 20, 1997 (Content Revision 1).
*Data Services Option Standard for Wideband Spread Spectrum Digital Cellular System.* TIA/EIA/IS-99. TIA/EIA Interim Standard. Jul. 1995.
*Data Services Options Standard for Wideband Spread Spectrum Systems: Packet Data Services.* PN-36765 (to be published as TIA/EIA/IS-707.5) Ballot Version, May 30, 1997.
Data Standard, Packet Data Section, PN-3676.5 (to be published as TIA/EIA/IS-DATA.5), Dec. 8, 1996, Version 2 (Content Revision 3).
Draft Text for "*95C" Physical Layer (Revision 4), Part 1, Document #531-981-20814-95C, Part 1 on 3GPP2 website 9ftp://ftp.3gpp2.org/tsgc/working/1998/1298_Maui/WG3-TG1/531-98120814-95c,%20part%201.pdf).

Draft Text for "95C" Physical Layer (Revision 4), Part 2, Document #531-981-20814-95C, part 2 on 3GGP2 website (ftp://ftp.3gpp2.org/tsgc/working/1998/1298_Maui/WG3-TG1-98120814-95c,%part%202.pdf, 1998).
Durnan, G.J., et al. "Optimization of Microwave Parabolic Antenna Systems Using Switched Parasitic Feed structures," URSO National Science Meeting, Boulder, CO, p. 323, (Jan. 4-8, 2000).
Durnan, G.J., et al., "Switched Parasitic Feeds for Parabolic Antenna Angle Diversity," *Microwave and Optical Tech. Letters,* vol. 23, No. 4, pp. 200-2003 (Nov. 20, 1999).
Ejzak et al., Lucent Technologies Air Interface Proposal for CDMA High Speed Data Service, Revision 0.1, May 5, 1997.
Ejzak et al., Lucent Technologies Air Interface Proposal for CDMA High Speed Data Service, Apr. 14, 1997.
Ejzak, et al. *Proposal for High Speed Packet Data Service, Version 0.1.* Lucent Technologies, Jan. 16, 1997.
Elhakeem, Congestion Control in Signalling Free Hybrid ATM/CDMA Satellite Network, IEEE, 1995, pp. 783-787.
Giger, A.J., *Low-Angle Microwave Propagation: Physics and Modeling,* Norwood, MA, Artech House, (1991).
Hall et al., Design and Analysis of Turbo Codes on Rayleigh Fading Channels, IEEE Journal on Selected Areas in Communications, vol. 16, No. 2, Feb. 1998, pp. 160-174.
Harrington, R.F., "Reactively Controlled Antenna Arrays," *IEEE APS International Symposium Digest,* Amherst, MA, pp. 62-65, (Oct. 1976).
Harrington, R.F., "Reactively Controlled Directive Arrays," *IEEE Trans. Antennas and Propagation,* vol. AP-26, No. 3, pp. 390-395, (May 1978).
Heine, Gunnar, "The Air-Interface of GSM", in GSM Networks: Protocols, Terminology, and Implementation, (MA: Artech House, Inc.), pp. 89-100 (1999).
High Data Rate (HDR), cdmaOne optimized for high speed, high capacity data, Wireless Infrastructure, Qualcomm, Sep. 1998.
Hindelang et al., Using Powerful "Turbo" Codes for 14.4 Kbit/s Data Service in GSM or PCS Systems, IEEE Global Communications Conference, Phoenix, Arizona, USA, Nov. 3-8, 1997, vol. II, pp. 649-653.
*Introduction to cdma2000 Spread Spectrum Systems, Release C.* TIA/EIA Interim Standard. TIA/EIA/IS-2000.1-C. May 2002.
James, J.R. et al., "Electrically Short Monopole Antennas with Dielectric or Ferrite Coatings," Proc. IEEE, vol. 125, pp. 793-803, (Sep. 1978)
James, J.R et al "Reduction of Antenna Dimensions with Dielectric Loading," *Electronics Letters,* vol. 10, No. 13, pp. 263-265, (May 1974).
Kaiser et al., Multi-Carrier CDMA with Iterative Decoding and Soft-Interference Cancellation, Proceedings of Globecom 1997, vol. 1, pp. 523-529.
King, R.W.P., "The Many Faces of the Insulated Antenna," Proc. IEEE, vol. 64, No. 2, pp. 228-238, (Feb. 1976).
Kingsley, S.P., et al., "Beam Steering and Monopulse Processing of Probe-Fed Dielectric Resonator Antennas," *IEEE Proc.-Radar, Sonar, Navigation,* vol. 146, No. 3, pp. 121-125, (Jun. 1999).
Knight, P., "Low-Frequency Behavior of the Beverage Aerial," *Electronics Letter,* vol. 13, No. 1, pp. 21-22, (Jan. 1977).
Knisely, Douglas, N. Telecommunications Industry Association Subcommittee TR-45.5—*Wideband Spread Spectrum Digital Technologies Standards.* Banff, Alberta. Feb. 24, 1997 (TR45.5/97.02.24)21.
Knisely, Douglas, N. Telecommunications Industry Association Subcommittee TR-45.5-Wideband Spread Spectrum Digital Technologies Standards, Working Group III-Physical Layer. Banff, Alberta, Feb. 24, 1997 (TR-45.5/97.02.24)22.
Knisely, Lucent Technologies Air Interface Proposal for CDMA High Speed Data Service, Jan. 16, 1997.
Krzymien et al., Rapid Acquisition Algorithms for Synchronization of Bursty Transmissions in CDMA Microcellular and Personal Wireless Systems, IEEE Journal on Selected Areas in Communications, vol. 14, No. 3, Apr. 1996, pp. 570-579.
Kumar et al, An Access Scheme for High Speed Packet Data Service on IS-95 based CDMA, Feb. 11, 1997.

Lau et al., A Channel-State-Dependent Bandwidth Allocation scheme for Integrated Isochronous and Bursty Media Data in a Cellular Mobile Information System, IEEE, 2000, pp. 524-528.

Lee et al., "A Novel Hybrid CDMA/TDMA Protocol with a Reservation Request Slot for Wireless ATM Networks," IEICE Transactions on Communications, vol. E82-B, No. 7, pp. 1073-1076 (Jul. 25, 1999).

Liu et al., Channel Access and Interference Issues in Multi-Code DS-CDMA Wireless Packet (ATM) Networks, Wireless Networks 2, pp. 173-796, 1996.

Long, S.A., et al. "The Resonant Cylindrical Dielectric Cavity Antenna," *IEEE Trans. Antennas and Propagation*, vol. AP-31, No. 3, pp. 406-412, (May 1983).

Lu, J. et al., "Multi-beam Switched Parasitic Antenna Embedded in Dielectric for Wireless Communications Systems," *Electronics Letters*, vol. 37, No. 14, pp. 871-872, (Jul. 5, 2001).

Lucent Technologies Presentation First Slide Titled, Summary of Multi-Channel Signaling Protocol, Apr. 6, 1997.

Lucent Technologies Presentation First Slide Titled, Why Support Symmetric HSD (Phase 1C), Feb. 21, 1997.

Luzwick, J., et al., "A Reactively Loaded Aperture Antenna Array," *IEEE Trans. Antennas and Propagation*, vol. AP-26, No. 4, pp. 543-547, (Jul. 1978).

McCallister, M.W. et al., "Resonant Hemispherical Dielectric Antenna," *Electronics Letters*, vol. 20, No. 16, pp. 657-659, (Aug. 1984).

McCallister, M.W., et al "Rectangular Dielectric Resonator Antenna," *Electronics Letter*, vol. 19, No. 6, pp. 218-219, (Mar. 1983).

Melanchuk et al. *CDPD and Emerging Digital Cellular Systems*, Digest of Papers of COMPCN, Computer Society Conference 1996, Santa Clara, CA, No. CONF. 41, Feb. 25, 1996, pp. 2-8, XP000628458.

Milne, R.M.T., "A Small Adaptive Array Antenna for Mobile Communications," *IEEE APS International Symposium Digest*, pp. 797-800, (1985).

Mobile Station-Base Station Compatibility Standard for Dual-Mode Wideband Spread Spectrum Cellular Systems, TIA Interim Standard, TIA/EIA/IS-95-A (Addendum to TIA/EIA/IS-95), May 1995.

Mobile Station-Base Station Compatibility Standard for Wideband Spread Spectrum Cellular Systems, TIA/EIA Standard, TIA/EIA-95-B (Upgrade and Revision of TIA/EIA-95-A), Mar. 1999.

Motorola, Version 1.0. *Motorola High Speed Data Air Interface Proposal Comparisions and Recommendations*. Jan. 27, 1997.

*MSC-BS Interface (A-Interface) for Public 800 MHz.* TIA/EIA/IS-634-A. TIA/EIA Interim Standard (Revision of TIA/EIA/IS-634) Jul. 1998.

*MSC-BS Interface for Public 800 MHz.* TIA/EIA/IS-634. TIA/EIA Interim Standard, Dec. 1995.

Network Wireless Systems Offer Business Unit (NWS OBU), Feature Definition Document for Code Division Multiple Access (CDMA) Packet Mode Data Services, FDD-1444, Nov. 26, 1996.

Ott, David TR45.5, CDMA WBSS Technical Standards Meeting Summary. Feb. 24-28, 1997 Banff, Alberta.

Ovesjö Frederik, European Telecommunication Standard, SMG2 UMTS physical Layer Expert Group, "UTRA Physical Layer Descriptions FDD parts" (v0.4, Jun. 25, 1998), pp. 1-41, XP-002141421.

Packet Data Service Option Standard for Wideband Spread Spectrum Systems, TIA/EIA Interim Standard, TIA/EIA Interim Standard, TIA/EIA/IS-657, Jul. 1996.

*Physical Layer Standard for cdma2000 Spread Spectrum Systems, Release C.* TIA/EIA Interim Standard. TIA/EIA/IS-2000.2C. May 2002.

Preston, S et al., "Direction Finding Using a Switched Parasitic Antenna Array," *IEEE APS International Symposium Digest*, Montreal, Canada, pp. 1024-1027, (1997).

Preston, S.L., et al., 'A Multibeam Antenna Using Switched Parasitic and Switched Active Elements for Space-Division Multiple Access Applications, *IEICE Trans. Electron.*, vol. E82-C, No. 7, pp. 1202-1210, (Jul 1999).

Preston, S.L., et al., "Base-Station Tracking in Mobile Communications using a Switched Parasitic Antenna Array," *IEEE Trans. Antennas and Propagation*, vol. 46, No. 6, pp. 841-844, (Jun. 1998).

Preston, S.L., et al., "Electronic Beam Steering Using Switched Parasitic Patch Elements," *Electronics Letters*, vol. 33, No. 1, pp. 7-8, (Jan. 2, 1997).

Preston, S.L., et al., "Size Reduction of Switched Parasitic Directional Antennas Using Genetic Algorithm Optimization Techniques," *Asia Pacific Microwave Conference Proceedings*, Yokohama, Japan, pp. 1401-1404, (1998).

Preston, S.L., et al., "Systematic Approach to the Design of Directional Antennas Using Switched Parasitic and Switched Active Elements," *Asia Pacific Microwave Conference Proceedings*, Yokohama, Japan, pp. 531-534, (1998).

Puleston, PPP Protocol Spoofing Control Protocol, Global Village Communication (UK) Ltd., Feb. 1996.

Reed et al., Iterative Multiuser Detection for CDMA with FEC: Near-Single-User Performance, IEEE Transactions on Communications, vol. 46, No. 12, Dec. 1998, pp. 1693-1699.

Ruze, J., "Lateral-Feed Displacement in a Paraboloid," *IEEE Trans. Antennas and Propagation*, vol. 13, pp. 660-665, (1985).

Scott, N. L., et al., "Diversity Gain from a Single-Port Adaptive Antenna Using Switched Parasitic Elements Illustrated with a Wire and Monopole Prototype," *IEEE Trans. Antennas and Propagation*, vol. 7, No. 6, pp. 1066-1070, (Jun. 1999).

Shacham, et al., "A Selective-Repeat-ARQ Protocol for Parallel Channels and Its Resequencing Analysis," IEEE Transactions On Communications, XP000297814, 40 (4): 773-782 (Apr. 1997).

Sibille, A., et al., "Circular Switched Monopole Arrays for beam Steering Wireless Communications," *Electronics Letters*, vol. 33, No. 7, pp. 551-552, (Mar. 1997).

Simpson, W. (Editor). "RFC 1661—The Point-to-Point Protocol (PPP)." Network Working Group, Jul. 1994, pp. 1-35. http://www.faqs.org/rfcs/rfc1661.html.

Simpson, W. (Editor). "RFC 1662—PPP in HDLC-Like Framing." Network Working Group, Jul. 1994, pp. 1-17. http://www.faqs.org/rfcs/rfc1662.html.

Skinner et al., Performance of Reverse-Link Packet Transmission in Mobile Cellular CDMA Networks, IEEE, 2001, pp. 1019-1023.

Stage 1 Service Description for Data Services—High Speed Data Services (Version 0.10) CDG RF 38. Dec. 3, 1996.

*Support for 14.4 kbps Data Rate and PCS Interaction for Wideband Spread Spectrum Cellular Systems.* TSB74, Dec. 1995. TIA/EIA Telecommunicatoins Systems Bulletin.

*Telecommunications Industry Association Meeting Summary.* Task Group I, Working Group III, Subcommittee TR45.5. Feb. 24-27, 1997. Banff, Alberta.

*Telecommunications Industry Association Meeting Summary.* Task Group I, Working Group III, Subcommittee TR45.5. Jan. 6-8, 1997. Newport Beach, CA.

TIA/EIA Interim Standard, Mobile Station-Base Station Compatibility Standard for Dual-Mode Wideband Spread Spectrum Cellular Systems, TIA/EIA/IS-95 (Jul. 1993).

Tsui et al., "Sensitivity of EW Receivers," Microwave Journal, vol. 25, pp. 115-117, 120 (Nov. 1982).

*Upper Layer (Layer 3) Signaling Standard for cdma2000 Spread Spectrum Systems, Release C.* TIA/EIA Interim Standard. TIA/EIA/IS-2000.5-C. May, 2002.

Vaughn, R. "Switched Parasitic Elements for Antenna Diversity," *IEEE Trans. Antennas and Propagation*, vol. 47, No. 2, pp. 399-405, (Feb. 1999).

Viterbi, The Path to Next Generation Services with CDMA, Qualcomm Incorporated, 1998 CDMA Americas Congress, Los Angeles, California, Nov. 19, 1998.

Wang et al., The Performance of Turbo-Codes in Asynchronous DS-CDMA, IEEE Global Communications Conference, Phoenix, Arizona, USA, Nov. 3-8, 1007, Gol. III, pp. 1548-1551.

www.cdg.org/news/press/1997.ssp. CDA Press Release Archive, 1997.

Yang, Samuel C., "Principles of Code Division Multiple Access," In CDMA RF System Engineering, (MA: Artech House, Inc.), 1998, Chapter 4, pp. 75-103.

\* cited by examiner

ANTENNA CONTROL SYSTEM AND METHOD

RELATED APPLICATIONS

This application claims the benefit of U.S. Provisional Application Ser. No. 60/250,908 filed on Dec. 1, 2000 entitled "Antenna Power Control System and Method," and U.S. Provisional Application Ser. No. 60/251,148 filed on Dec. 4, 2000 entitled "Antenna Power Control System and Method," the entire teachings of both being incorporated herein by this reference.

BACKGROUND

Precise power control in wireless communication systems such as cellular mobile telephone systems can be problematic, especially at the edge of a cell where interference is often the highest. Due to potential interference, the benefit of techniques such as high order modulation to transmit at higher data rates can be limited.

Code Division Multiple Access (CDMA) systems such as IS-95 and IS-2000 are interference limited, and their inherent capacity generally can be enhanced using beam-steering techniques. For example, based on indoor and outdoor field trials, significant improvements in signal to interference ratio (SIR) has been achieved using directional antenna arrays.

SUMMARY OF THE INVENTION

One aspect of the present invention is directed toward a system and method to increase the bandwidth of a wireless communication system. In an illustrative embodiment, each of multiple directional transmissions from a transmitter of a subscriber unit is received at a receiver unit such as a base unit of a CDMA (Code Division Multiple Access) communication system. A quality of received signals at the receiver unit is then determined for each of the multiple directional transmissions from the transmitter. Based on the detected quality of received signals, the directional transmission from the transmitter that produces a higher quality received signal at the receiver can be identified. More optimal antenna settings of the transmitter can thus be determined by comparing link quality metrics generated for each of multiple directional transmissions. Consequently, settings of the subscriber unit transmitter can be adjusted to support more efficient directional transmissions to a base station receiver.

A link quality message indicating which of multiple directional transmissions from the transmitter produces a higher quality received signal can then be communicated to the subscriber unit. This feedback information can be conveyed in a number of ways. For example, a link quality message can be transmitted to the subscriber units over a dedicated, shared channel such as a feedback channel partitioned into periodically repeating sequences of frames. In a more specific application, feedback messages are communicated to a subscriber unit on a forward link CDMA channel via a technique such as bit-puncturing on an assigned forward link channel.

A link quality message can be a metric based on system parameters. For instance, the receiver unit or base unit can measure a power level of a received signal for each of multiple directional transmissions from the transmitter of a subscriber unit. Based on received power levels for each of multiple directional transmissions, a preferred antenna setting for the subscriber unit and corresponding transmitter can be determined. A link quality message can be based on other suitable system parameters such as a signal to noise ratio or bit error rate detected at the receiver unit.

In one application, a link quality message communicated to a subscriber unit is a single bit indicating which of two previous directional transmissions from the subscriber unit produces a higher quality received signal at the base unit. Typically, a subscriber unit is synchronized with the base station for transmitting a majority of data information to the base unit based on first directional antenna settings and occasionally transmitting from the subscriber unit to the base unit based on second directional antenna settings.

A transmit lobe of the subscriber unit and corresponding wireless transmitter can be multiplexed between two or more different angular positions in a horizontal plane. In this way, the subscriber unit can transmit along two or more paths, each having a potentially different path loss depending on environmental conditions.

If it is determined that new antenna settings of a subscriber unit would be more optimal in lieu of previously used settings, the transmitter or antenna array of the subscriber unit can be adjusted accordingly. Consequently, a beam-steering subscriber unit that is mobile with respect to a base unit can be adjusted so that a wireless communication link is continually optimized for use. The receiver can use beam-steering techniques to receive a wireless signal.

Link quality messages can be transmitted to corresponding subscriber units over a dedicated or shared channel. In this instance, a forward link channel from the base unit can be partitioned to transmit multiple feedback messages to each of multiple subscriber units on a forward link CDMA channel.

Each subscriber unit is optionally assigned use of particular time slots or data fields of the feedback channel to retrieve feedback messages. Part of a time-slot can be allocated for use by a subscriber unit to receive feedback messages indicating how to adjust its antenna settings.

Based on these techniques, a base unit can monitor received signals and generate feedback information to maintain efficient wireless links with each of multiple subscriber units.

Another aspect of the present invention involves providing feedback information to one or multiple subscriber units so that their corresponding transmit settings such as power output levels are minimized for a particular antenna orientation and position in a shared wireless communication system. For instance, a subscriber unit can transmit Power Control Groups (PCGs) to the base unit over multiple successive time slots or frames. In this instance, the PCGs can be analyzed at the base unit for generating feedback information that is communicated to the subscriber unit.

A feedback channel from the base unit to the subscriber unit can be used to adjust power settings of a transmitter at the subscriber unit so that its data transmissions are optimized. For example, a continuous, periodic or intermittent bit stream can be transmitted on a feedback channel to the subscriber unit indicating whether it should increase or decrease its power output level for future transmissions along a particular path.

Generally, multiple types of antenna or transmitter settings can be adjusted based on receiving two or more types of feedback messages in a feedback channel. Consequently, two or more feedback control loops can be supported to adjust directional transmissions of the transmitter.

A single feedback bit such as a power control bit received in the feedback channel can indicate whether power output at the subscriber unit should be increased or decreased for future transmissions. Thus, for each of multiple framed transmissions from the subscriber unit, a power level can be increased or decreased, for example, by 1 dB. The power control bit can be dithered between logic high and logic low levels for successive transmissions over the feedback channel so that the subscriber unit transmits at an optimal or near-optimal power output level.

In one application, the power control bit is occasionally substituted with a lobe compare bit to control a directional output of the transmitter rather than power output. Accordingly, information transmitted in a data field, time slot or frame of the feedback channel can be used to control multiple aspects of a subscriber unit.

In certain situations, the transmitter settings will be adjusted to transmit along a new direction. Since a path loss can be different for the new directional transmissions, the power control feedback messages can then be communicated to readjust a power output of the transmitter.

A specific subscriber unit can identify a type of feedback control message based on a time slot or frame in which it is transmitted. For example, a position of a feedback message in a frame of multiple repeating sequences of frames can be used to identify a type of feedback message received over the feedback channel. No additional data such as a tag indicating the type of feedback message is necessary. However, it should be noted that in one application, a tag or message type identifier is used to indicate the type of feedback message rather than the position of a frame in a sequence of frames to identify a message type. Consequently, a power control loop and lobe control loop can be established between a subscriber unit and base unit to optimize transmitter settings at the subscriber unit.

As discussed, the subscriber unit can occasionally transmit along a different direction in a specified time interval, time slot or frame. The base unit can be synchronized to receive the signal along the different direction and, instead of communicating a power control bit back to the subscriber unit in a specified feedback time slot, the base station can transmit a lobe compare bit in a feedback channel to the subscriber unit. The lobe compare bit can indicate which transmitter setting at the subscriber unit is perceived to be better for directional data transmissions.

A bit or bit sequence in a time slot of a feedback channel can have a unique purpose depending on which time slot or data field it is transmitted. In one application, feedback is provided to control two aspects of a transmitter. First, messages in the feedback channel can be used to provide feedback information to control transmitter power output settings for directional transmissions from a subscriber unit to the base unit. Second, a bit or sequence of bits in the feedback channel can be used to identify which of multiple directional settings of the subscriber unit is optimal for the wireless communication system. Consequently, a two-tiered control loop including multiple types of feedback messages can be used to maintain antenna settings.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF A PREFERRED EMBODIMENT

Figure 1:
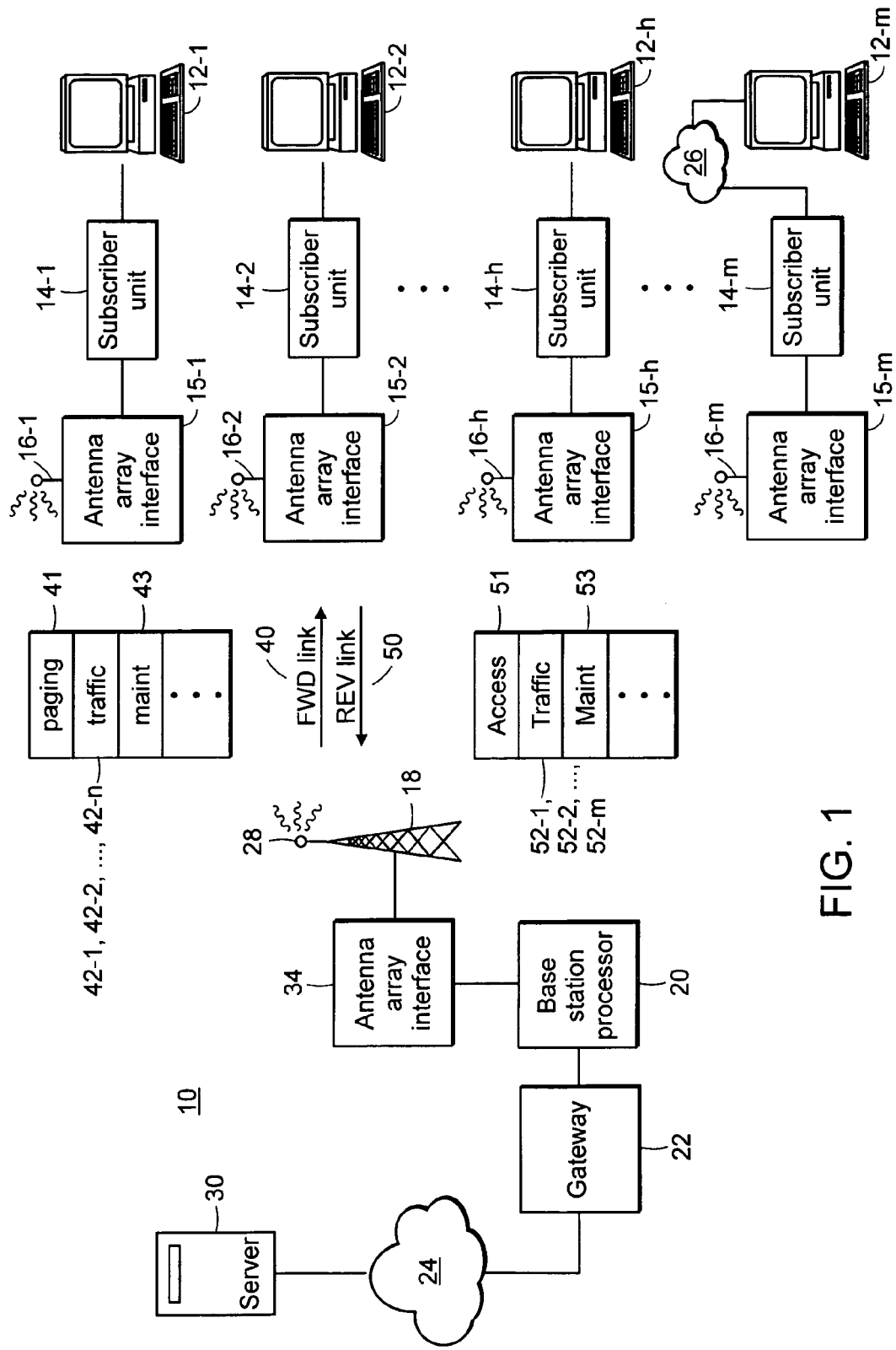
FIG. 1 is a block diagram of a wireless communication system according to certain principles of the present invention.

FIG. 1 is a block diagram illustrating a communication system supporting the transmission of data information over multiple allocated wireless communication channels according to certain principles of the present invention. Users at remote terminals such as personal computer device 12 can compete for wireless bandwidth allocation. Hence, it is desirable that limited resources in wireless communication system 10 are optimized for data throughput.

According to the following description, communication system 10 is described as a wireless communication link such as a wireless CDMA (Code Division Multiple Access) or other spread spectrum system in which radio channels are shared among multiple users. However, it should be noted that the techniques described herein can be applied in any suitable application supporting shared access. For example, the principles of the present invention can be applied to other types of media such as cellular telephone connections, wireless Local Area Network (LAN) connections, line of sight connections, or other physical media to which allocation of wireless resources such as data channels are granted on an as-needed basis.

As shown, communication system 10 can include a number of Personal Computer (PC) devices 12-1, 12-2, ... 12-h, ... 12-m, corresponding Subscriber Access Units (SAUs) or terminals 14-1, 14-2, ... 14-h, ... 14-m, and associated directional antenna arrays 16-1, 16-2, ... 16-h, ... 16-m. Centrally located equipment can include base station antenna array 28, and corresponding base station processor (BSP) 20 and antenna array interface 34. The use of specific types of equipment can vary depending on an application. For example, base station antenna array 28 and subscriber unit antenna array 16 can include antenna devices, transmitter, receivers, transceivers, dipole antennas, and transducers that transmit or receive wireless signals.

Generally, base station processor 20 can provide connections to and from a network gateway 22, network 24 such as the Internet, and network file server 30. Connectivity can include additional wireless links to support multiple logical connections.

In one application, communication system 10 is a demand access, point to multi-point wireless communication system such that PC devices 12 can transmit data to and receive data from network server 30 through bi-directional wireless, logical connections implemented over forward links 40 and reverse links 50. That is, in the point to multi-point multiple access wireless communication system 10 as shown, a given base station processor 20 can support communication with a number of different subscriber units 14 in a manner which is similar to a cellular telephone or mobile communication network. Accordingly, system 10 can provide a framework for a CDMA wireless communication system in which digital information is relayed on-demand between multiple mobile cellular users and a hardwired network 24 such as the Internet.

PC devices 12 are typically laptop computers, handheld units, Internet-enabled cellular telephones, Personal Digital Assistant (PDA)-type computers, digital processors or other end user devices, although any suitable type of processing device can be used in place of PC devices 12.

It should be noted that PC devices 12 need not be terminal devices. For example, a subscriber or access unit 14-$m$ can be connected to network 26 such as LAN (Local Area Network).

Typically, each PC device 12 is connected to a respective subscriber unit 14 through a suitable wired connection such as an Ethernet-type connection or similar cable.

Each subscriber unit 14 can permit its associated PC device 12 access to network file server 30 or other target devices on network 24. In a reverse link 50 direction, that is, for data traffic traveling from PC device 12 towards server 30, PC device 12 transmits based on a transport protocol such as an Internet Protocol (IP) level packet to the subscriber unit 14. One aspect of the transport layer or transport protocol is to ensure quality of service and accurate delivery of information between logical computer-to-computer connections. In the OSI (Organization for Standardization's Open Systems Interconnection) model, the transport layer is one level above the network layer and is the fourth of seven layers.

In addition to the use of a transport protocol to support computer-to-computer communications, subscriber unit 14 then encapsulates the wired framing information (i.e., Ethernet framing) with appropriate wireless connection framing that is used to frame information for transmissions over wireless reverse link 50. In other words, data packets are split, combined, or rebundled for transmission over the wireless link.

After the information is framed, the appropriately formatted wireless data packets then travel over one of the radio channels that comprise reverse link 50 through antennas 16 and 28. At the central base station location, base station processor 20 and antenna array interface then extract the radio link framed data packets and reformats the packets into an original or near original IP format. The packets can then be subsequently routed through gateway 22 and any number or type of networks 24 to an ultimate destination such as a network file server 30. Accordingly, network data messages can be packed for transmission over a wireless link and unpacked for transmission over a wired or optical network.

In one application, information generated by PC devices 12 are based on a TCP/IP protocol. Consequently, PC devices 12 can have access to digital information such as web pages available on the Internet.

It should be noted that other types of digital information can be transmitted over radio channels or sub-channels of communication system 10 based on the principles of the present invention. More specifically, the data information can be any type of data information encapsulated using a suitable network protocol.

Data can also be transmitted from network file server 30 to PCs 12 on forward link 40. In this instance, network data such as an Internet Protocol (IP) packets originating at file server 30 travel on network 24 through gateway 22 to eventually arrive at base station processor 20. In a similar manner as discussed, appropriate wireless protocol framing can then be added to raw data such as IP packets for communication of the packets over a wireless forward link 40. Modulation and up-converter circuits can be employed to produce a signal suitable for radio transmission on one or more forward link traffic channels 42.

The newly framed packets travel through base unit 18 and antenna array 16 to the intended receiver subscriber unit 14. An appropriate target subscriber unit 14 demodulates and decodes the radio signal or signals to receive the wireless packet formatting layer, and forwards the packet or data packets to the intended PC device 12 that performs IP layer processing. It should be noted that subscriber unit 14-$m$ can be coupled to another network such as network 26 as shown.

A given PC device 12 and file server 30 can therefore be viewed as the end points of a duplex connection at the IP level.

Once a connection is established between base station processor 20 and a corresponding subscriber unit 14, a user at PC device 12 can transmit data to and receive data from file server 30 on an as-needed basis. More specifically, one or multiple channels can be allocated to each of multiple users on an as-needed basis to transmit at higher data rates.

Reverse link 50 optionally includes different types of logical and/or physical radio channels such as access channel 51, multiple traffic channels 52-1, . . . 52-$m$, and maintenance channel 53.

A combination of these channels can be used to maintain one or multiple wireless links. Reverse link access channel 51 can be used by the subscriber units 14 to send messages to base station processor 20 and request that traffic channels be granted to them. For example, traffic channels carrying data packets can be assigned or reallocated to one or multiple users on an as-needed basis. Assigned traffic channels 52 then carry payload data from subscriber unit 14 to base station processor 20. Notably, a given connection can have more than one traffic channel 52 assigned to it.

Maintenance channel 53 can also carry information such as synchronization and power control messages to further support transmission of information over both the reverse link 50 and forward link 40.

In a similar manner, the forward link 40 can include a paging channel 41, which is used by base station processor 20 to inform a subscriber unit 14 of general information such as that one or multiple forward link traffic channels 52 have been allocated or assigned to it for the transmission of data. Additionally, the channel can be used to inform subscriber units 14 of allocated or assigned traffic channels 52 in the reverse link direction.

Traffic channels 42-1 . . . 42-$n$ on forward link 40 can be used to carry payload information from base station processor 20 to subscriber units 14. Additionally, maintenance channels can carry synchronization and power control information on forward link 40 from base station processor 20 to subscriber units 14.

Traffic channels 42 on forward link 40 can be shared based on a Time Division Multiplexing scheme among multiple subscriber units 14. Specifically, a forward link traffic channel 42 can be partitioned into a predetermined number of periodically repeating time slots for transmission of data packets to multiple subscriber units 14.

It should be noted that a given subscriber unit 14 can have, at any instant in time, multiple time slots or no time slots of a wireless channel assigned to it for use. However, in certain applications, an entire time-slotted forward or reverse link traffic channel can be assigned for use by a particular subscriber unit 16. Consequently, multiple subscriber units 14 sharing wireless resources can transmit short bursts of sporadically generated data at high throughput rates.

Base station 18 includes antenna array 28 that can be used in conjunction with antenna array interface 34 for detecting the received signal quality level of reverse link directional transmissions from corresponding antenna arrays 16 coupled to subscriber units 14.

Antenna array 16 coupled to corresponding subscriber units 14 can be steerable so that a radiation pattern from a subscriber unit 14 can be directed towards a particular target such as base unit 18 and, more specifically antenna array 28.

Additionally, directional transmissions from antenna array 16 can vary depending on a time slot of a channel in which it is transmitted. That is, a transmitter can transmit a wireless signal in a first direction for one time slot and transmit in a second direction for another time slot.

Implementations of directional antenna systems are described in co-pending U.S. patent application entitled "A Method of Use for an Adaptive Antenna in Same Frequency Networks" Ser. No. 09/579,084 filed on May 25, 2000, and U.S. patent application entitled "Adaptive Antenna for Use in Wireless Communication Systems" Ser. No. 09/859,001 filed on May 16, 2001 the entire teachings of which are incorporated herein by this reference. Generally, any directional antenna array or transducer device can be advantageously employed to transmit and receive wireless signals according to certain principles of the present invention.

Since multiple users can be assigned CDMA channels on the same frequency, typically there is interference among users competing for available wireless bandwidth. For example, two different subscriber units 16 can transmit information over a reverse link channel to base unit 18 from the same general direction. Thus, a signal from a subscriber unit 14 can appear as noise to another subscriber unit 14 when such channels are generated onto the same carrier frequency, but using different coded channels.

Certain aspects of antenna array 16 can be controlled to reduce interference between adjacently transmitting subscriber units 14 to increase the overall bandwidth of wireless communication system 10. For example, the shape of the radiation pattern of antenna array 16 and its power output level can be optimized for a particular application. More specifically, directional transmissions from antenna array 16 can be adjusted so that the output beam or lobe is wider or narrower.

Additionally, the power output level at which the data is transmitted on reverse link 50 from antenna array 16 can be controlled so that a corresponding wireless signal in the reverse link can be detected by base unit 18, but not at such a high power transmit level that it causes unnecessary interference with other users. Typically, there is an optimal signal-to-noise ratio for a given reverse link channel that results in maximum throughput of communication system 10 and reduction of overall power consumption by subscriber unit 14. Reduced power consumption can be particularly important in applications where subscriber units 14 and related equipment such as computer devices 12 are powered by a finite power source such as a battery. Generally, aspects of the present invention can be employed so that a power source lasts longer.

Figure 2:
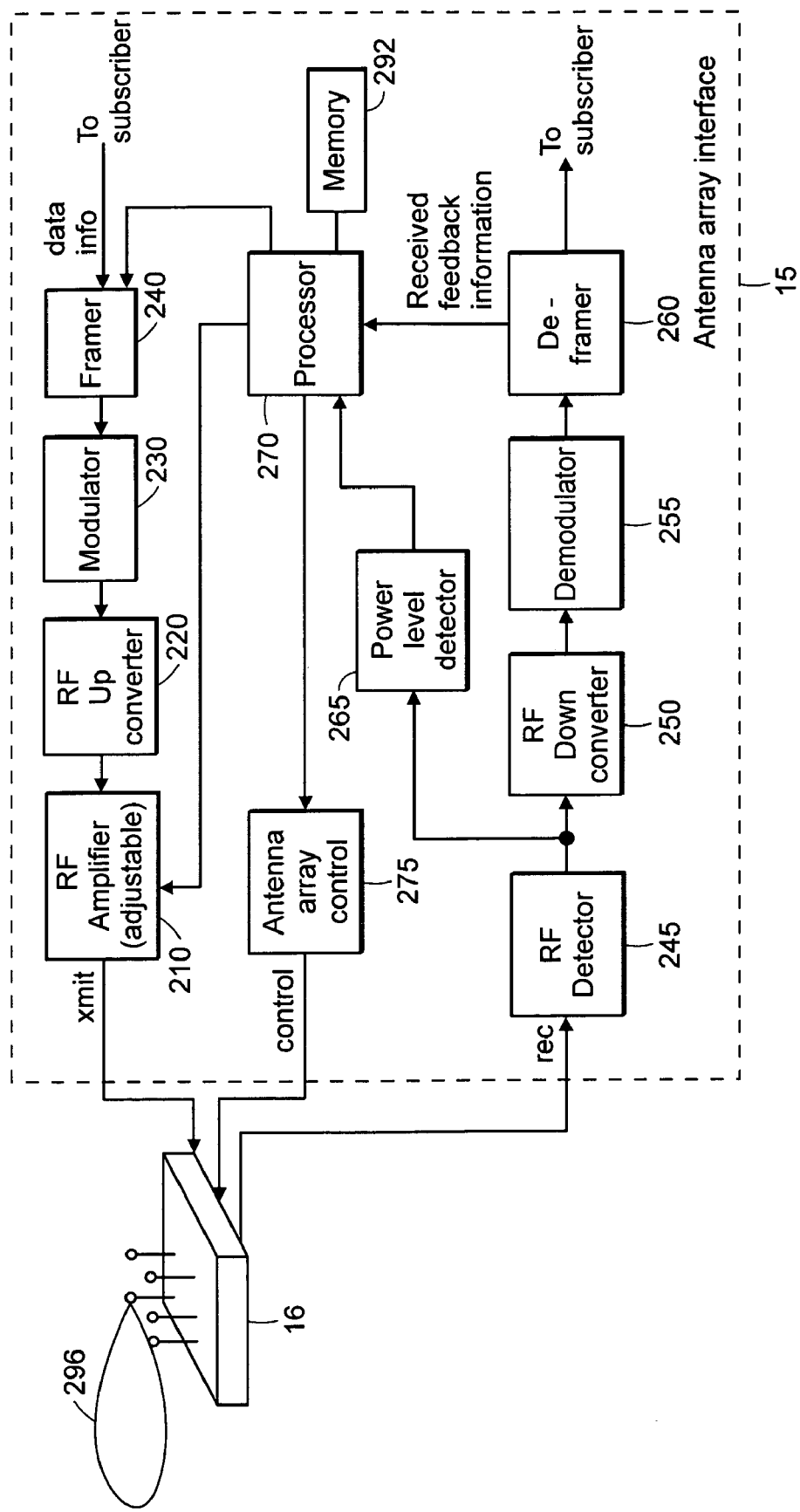
FIG. 2 is a block diagram of a transceiver interface at a subscriber unit according to certain principles of the present invention.

FIG. 2 is a block diagram of an antenna array and corresponding interface to transmit and receive a wireless signal from a subscriber unit according to certain principles of the present invention.

As shown, antenna array 16 is controlled by array controller 275 to steer a transmit or receive beam. Consequently, antenna array 16 can steer the directionality and coverage area of output beam 296.

Antenna array 16 can be coupled to antenna array interface 15 via a cable or it is optionally integrated with interface 15 as a single unit. Likewise a corresponding subscriber unit 14 can be connected to antenna array interface 15 via a cable or the combination of subscriber unit 14 and interface 15 optionally integrated as a single unit.

The power level of output beam 296 can be controlled by adjusting RF amplifier 210. Generally, processor 270 generates control signals to adjust RF amplifier 210 and corresponding output beam 296.

In a transmit mode, data information from subscriber unit 14 is fed into framer 240 where it is framed with a protocol for transmission over a wireless link as discussed. The framed data is in turn is fed to modulator 230 for modulation of data onto a carrier frequency. Modulation can be any suitable type such as BPSK (Binary Phase Shift Keying), QPSK (Quadrature Phase Shift Keying), 8-psk, up to n-psk.

Modulated signals generated by modulator 230 are then fed to RF converter 220 that, in combination with RF amplifier 210, drive antenna array 16. RF amplifier 210 is adjustable so that a power level of output beam 296 can be controlled based on input from processor 270.

Antenna array interface 15 can be adjusted for receiving wireless data information from base unit 18. RF detector 245 detects the presence of a received RF signal. Power level detector 265 can be used to detect a power level of the received signal. Output information generated by power level detector 265 can be analyzed by processor 270.

As depicted in the block diagram, RF down converter 250 converts the received signal and feeds the signal to demodulator 255. The signal is then demodulated and decoded by de-framer 260 to retrieve packaged data information that is eventually reformatted and forwarded to subscriber unit 14.

More details of wireless transmitter and receiver circuits can be found in U.S. application Ser. No. 09/775,304 entitled "Alternate Channel for Carrying Selected Message Types" filed on Feb. 1, 2001, the teachings of which are incorporated herein by reference.

Figure 3:
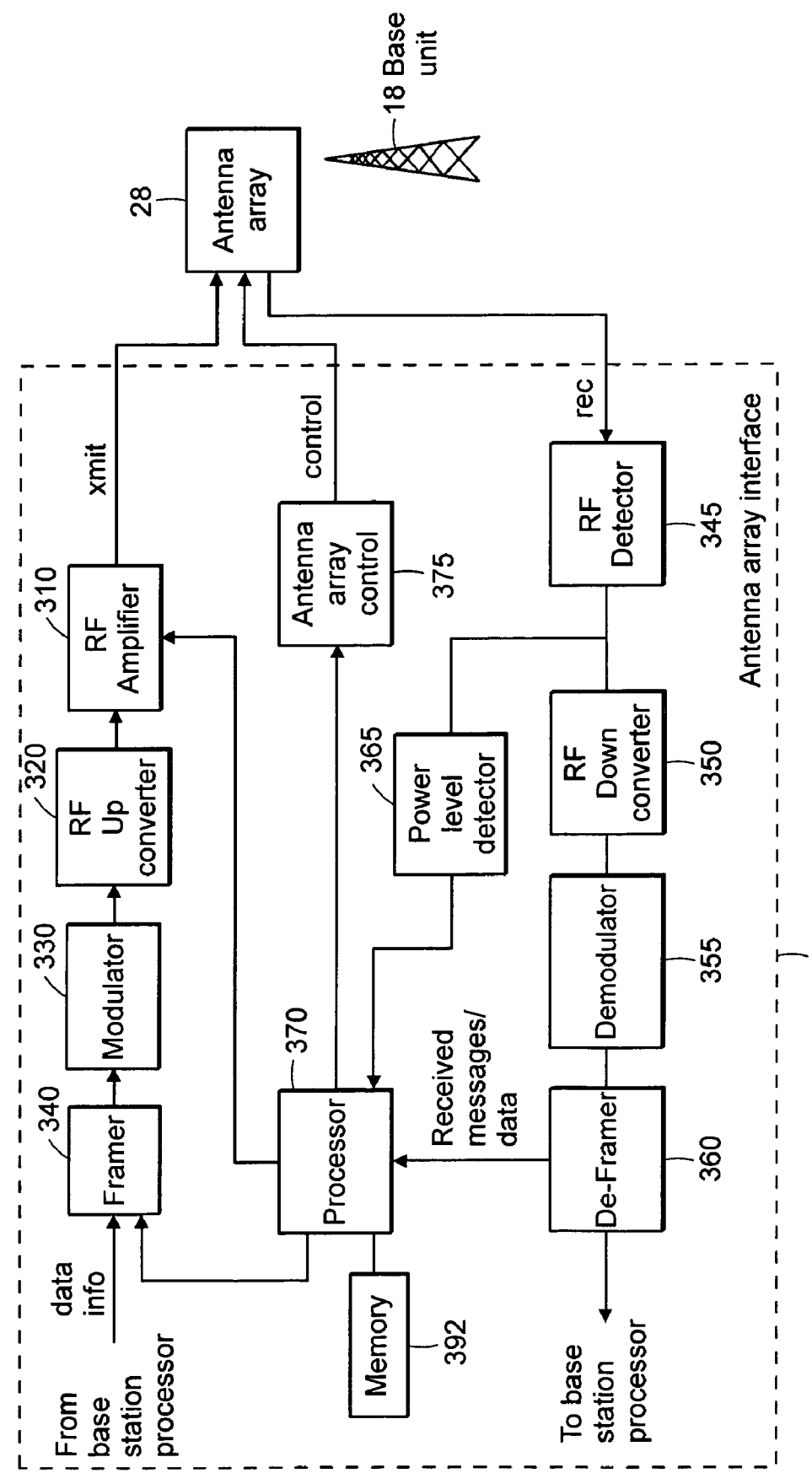
FIG. 3 is a block diagram of a transceiver interface at a base station according to certain principles of the present invention.

FIG. 3 is a block diagram of an antenna array and corresponding interface to transmit and receive wireless signals from a base unit according to certain principles of the present invention.

As shown, antenna array interface 34 can include similar circuitry and functionality as that described in FIG. 2 for transmitting and receiving wireless signals. More details regarding how base unit 18 communicates with subscriber unit 14 will be described later in this specification.

Figure 4:
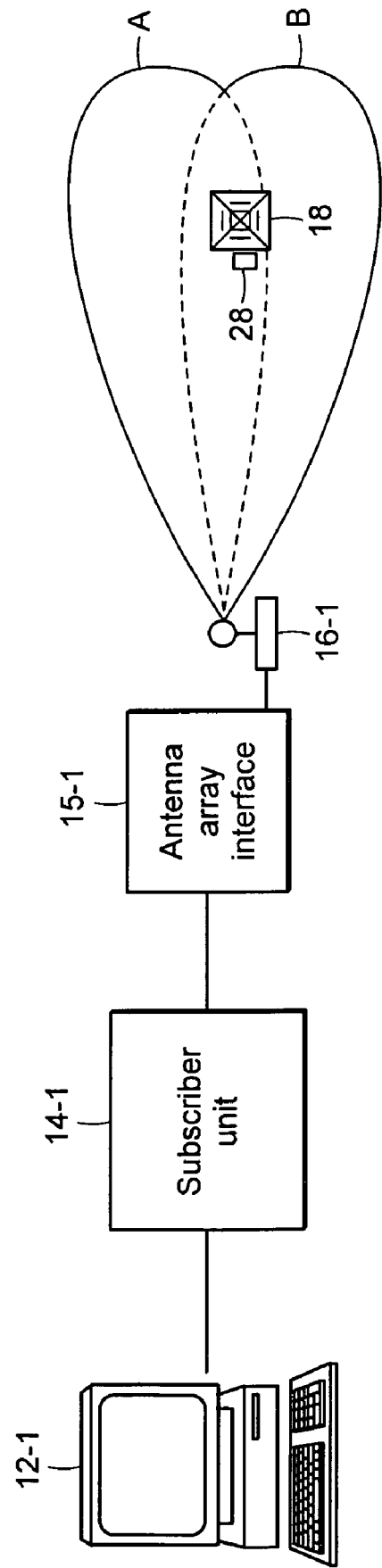
FIG. 4 is a diagram illustrating different radiation lobe patterns generated by an antenna device according to certain principles of the present invention.

FIG. 4 is a top view diagram of exemplary radiation patterns produced by a corresponding directional antenna array according to certain principles of the present invention. As shown, subscriber unit 14-1 and antenna array interface 15-1 control a receive or transmit radiation pattern of antenna array 16-1 directed towards base unit 18. In this instance, both lobes A and B can be used to transmit information to base unit 18, although base unit 18 is near the edge of lobe A and, therefore, is almost out of receiving range. If antenna array 16-1 happened to rotate an appreciable amount in a counter clockwise direction from the top view as shown, lobe A would no longer be received at base unit 18. In this latter instance, a transmit lobe may not be detectable at base unit 18 due to its directionality or low power transmit level at a particular point on the lobe.

As previously discussed, one aspect of the radiation output pattern 296 of transmitter or antenna array 16 involves controlling a direction of a lobe while another aspect involves controlling its power output level. Lobe A illustrates that antenna array 16 needlessly transmits extra power to base unit 18, potentially causing unnecessary interference to other subscriber units 14-2, . . . 14-m. Interference can be exacerbated when a subscriber unit 14 is at the edge of a cell. Generally, base station 18 can receive corresponding reverse link 50 data transmissions from antenna array 16-1 at the side of lobe A. Comparatively, lobe B is approximately centered so that base unit 18 can receive the reverse link signal even if the power output level of lobe B were reduced.

Although antenna array 16-1 can be controlled to transmit a wireless signal in different directions such as that shown by lobe A and lobe B, antenna array 16-1 can be designed to transmit along any vertical direction as well as horizontal direction. In one application, antenna array 16-1 transmits a directional beam using beam-steering techniques. Accordingly, communication system 10 can support more efficient communication between subscriber units 14 and base station 18 no matter their position in 3-dimensional space.

Figure 5:
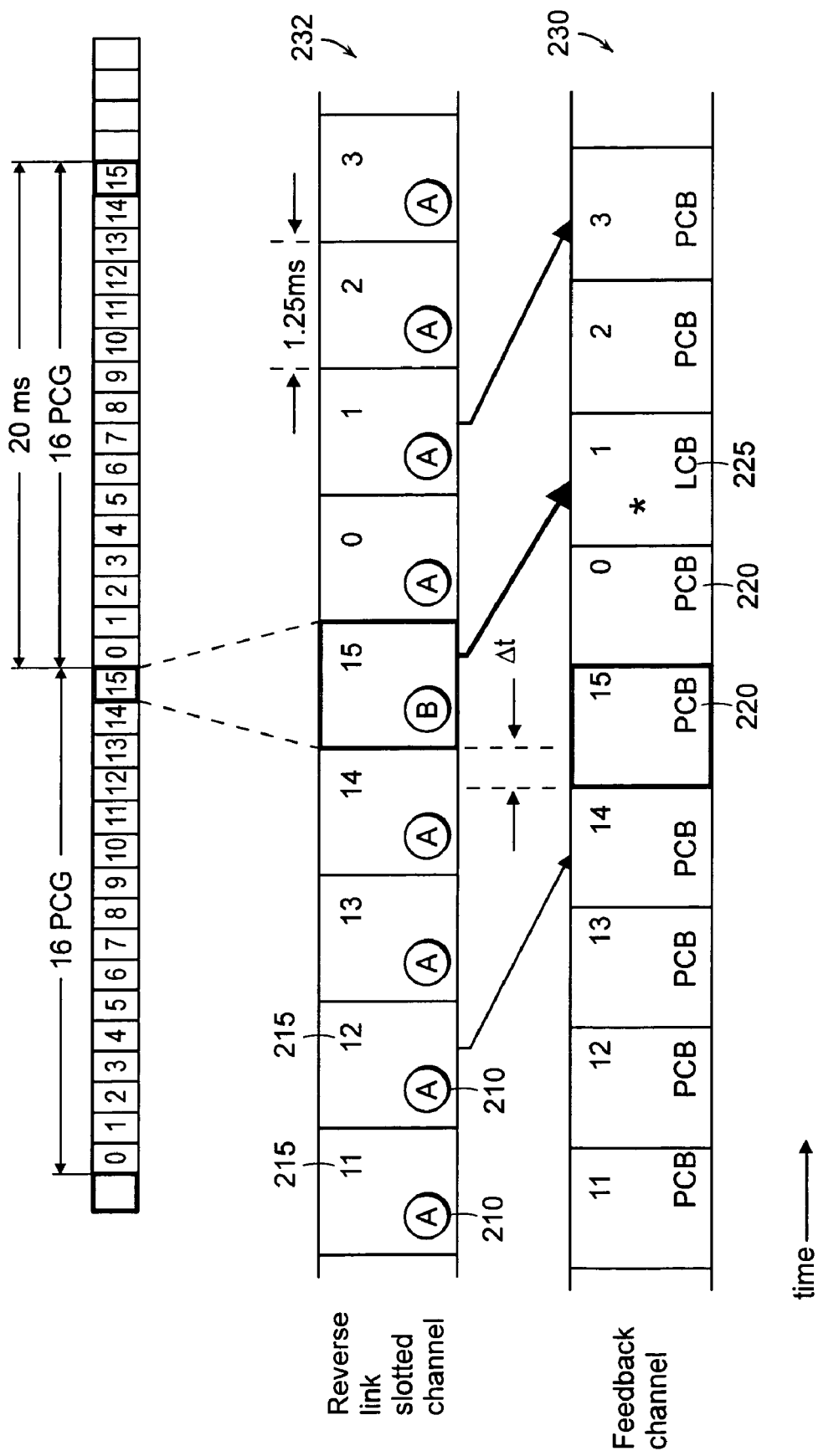
FIG. 5 is a timing diagram illustrating a time-slotted forward and reverse link channel supporting feedback according to certain principals of the present invention.

FIG. 5 is a diagram illustrating message frame information for reverse and forward link channels according to certain principles of the present invention. As shown, forward link frames are offset in time by round-trip delay Δt. Generally, a signal is transmitted from antenna array 16 to antenna array 28 or generally base unit 18 in a time frame 215 of reverse link channel 232. A quality of received signal can be analyzed at base unit 18 to provide feedback information to transmitting antenna array 16. For example, feedback messages can be transmitted in the opposite direction on forward link 40 and, more specifically, feedback channel 230 to one or multiple subscriber units 14.

According to one aspect of the present invention as mentioned, an optimal directional transmission from a subscriber unit 14 and corresponding antenna array 16 can be determined so that data information can be efficiently transmitted on the reverse link 50 without causing undue noise interference to other subscribers 14-2 . . . 14-m or yet other subscriber units in different cells. This technique of optimizing the use of particular antenna arrays 16 of corresponding subscriber units 14 can include adjusting both the power level and directionality of a corresponding output from an antenna array 16.

Notably, a path loss between base unit 18 and subscriber unit 14 can vary depending on directionality of antenna array 16. Thus, shifting a direction of a transmitting lobe of a single antenna array 16 for future directional transmissions can result in a power savings since the power transmission level of other subscriber units 14 can then be reduced as a result of reduced interference. The power transmission level of reverse links can also be increased if a signal is not detected. Consequently, communication system 10 can support more robust communications between one or multiple base stations and multiple subscriber units 14.

As previously mentioned, another aspect of the present invention involves adjusting a power level of the signals transmitted by antenna array 16. Reverse link slotted channel 232 of an exemplary reverse link channel 50 can include periodically repeating time slotted messages in which information is transmitted on reverse link 50 to base unit 18 and, more specifically, to antenna array 28.

As previously discussed, the information transmitted from a subscriber unit 14 can be rebundled network messages. As shown, time-slots or sequence of frames 0-15 can periodically repeat every 20 ms. Each of the 16 frames or 16 PCGs (Power Control Groups) is preferably 1.25 mS (milliseconds) in duration. This can vary depending on the application.

Generally, reverse link slotted channel 232 can be any suitable, partitioned reverse link channel 50 such as those previously discussed. Similarly, feedback channel 230 can be a shared or dedicated channel for transmitting feedback messages from base unit 18 to one or multiple subscriber units 14.

As its name suggests, frame reference numeral 215 indicates the number of a time slot in a given cycle of 16 PCGs as shown. Circled letter 210 indicates the lobe over which information is transmitted in that particular time frame from subscriber unit 14-1 over antenna array 16-1 to base unit 18 as shown in FIG. 2. For example, antenna array 16-1 can transmit information over a reverse link channel to base unit 18 using lobe A for each of frames 0-14. Antenna device 16-1 can then alter its directional transmissions to transmit information over the reverse link channel using lobe B during frame 15. In this way, subscriber unit 14-1 multiplexes its directional transmissions to base unit 18 using different directional lobe patterns.

It should be noted that this method of multiplexing can be expanded so that antenna array 16 multiplexes its data transmissions along any number of lobes or directions. In other words, a subscriber unit 14 can utilize a scanning technique to identify which of multiple directional transmissions are optimal.

Since base unit 18 and subscriber unit 16-1 are synchronized with respect to each other for receiving transmitted data in either the reverse or forward link direction, power level detector 365 at base unit 18 can be used to measure a power level of a received signal at antenna array 28 for a given time frame as transmitted by antenna device 16-1. Subsequently, a message can be transmitted from antenna array 28 to subscriber unit 14-1 regarding the power level measurement. In this way, feedback information can be provided by base unit 18 to a corresponding subscriber unit 14.

It should be noted that occasional, newly directed data transmissions from multiple subscriber units 14 can be offset in time from each other so that communication system 10 does not experience a sudden change in interference levels that may otherwise result if multiple subscriber units 14 simultaneously transmit in new directions at the same time.

Referring again to FIGS. 2-5 subscriber unit 14 generates a wireless signal to base unit 18 in reverse link slotted channel 232. Processor 270 of antenna array interface 15 drives array controller 275 to adjust the antenna array settings for each frame or time slot. For example, array controller 275 adjusts the settings of antenna array 16 so that it transmits output beam Lobe A for time slots 0-14 and output beam Lobe B for time slot 15.

In this instance, the output signal transmitted by antenna array 16 is received at base unit antenna array 28. The received signal is processed and decoded as previously discussed. A quality of received signal during each time frame can be determined by detecting a power level of the received signal via power level detector 365.

As previously discussed, the quality of received signal also can be quantified based on a bit error rate or signal-to-noise ratio. Based on the quality of received signal, processor 370 generates a feedback message that is transmitted to subscriber unit 14 over feedback channel 230.

One type of feedback message is a power control message. For example, a Power Control Bit (PCB) 220 is transmitted from base unit 18. Generally, subscriber unit 14 transmits over Lobe A to base unit 18, which then detects a quality of received signal as discussed. Processor 370 in base unit 18 then compares the detected link quality of received signal to a threshold. If the quality of received signal is below the threshold, a PCB 220 such as a logic '1' is transmitted from the base unit in feedback channel 230 to indicate that subscriber unit 14 should increase its power output level for successive transmissions. Conversely, if a quality or power level of a received signal is higher than the threshold, processor 370 can generate a PCB 220 feedback message at a logic '0' indicating that subscriber unit 14 should decrease its power output level for successive transmissions. Thresholds are chosen so that use of resources in communication system 10 are optimized for multiple users.

In this way, the power transmission level can be controlled via the feedback information transmitted to the base unit 18 over the forward link channel. More specifically, successive packets of Power Control Bit (PCB) 220 information can be transmitted to a corresponding subscriber unit 14 to indicate whether to increase or decrease its power transmission level. Thus, a power level output of antenna array 16 can be adjusted to account for changes in the immediate environment and path loss. For example, a new subscriber may begin transmitting information in the immediate vicinity, increasing the noise level in the area. In this instance, subscriber unit 14 may need to increase its power output level to maintain a wireless link with base unit 18. In other situations, a path loss for a particular lobe may change depending on weather conditions or movement of a subscriber unit 14.

Power Control Bit (PCB) 220 can indicate that the subscriber unit 14-1 should increase or decrease its power output level by a specified amount such as one dB, depending on the state of the bit. For example, a logic "1" can indicate to increase the power output level of antenna array 16-1 while a logic "0" can indicate to decrease its power output level. In this way, the power output level of antenna array 16-1 can be optimized so that it does not needlessly transmit at excessive levels, which could appear as interfering noise to other channels.

It should be noted that power control bit 220 as transmitted in a forward link channel to a corresponding subscriber unit 14 is typically delayed since it can take time to process the received reverse link signal at base unit 18 and make a determination whether the corresponding subscriber unit 14-1 should increase or decrease its power level output. As shown in FIG. 5, power control bit 220 in frame 14 of feedback channel 230 as transmitted by base unit 18 is a feedback message based on a previous power measurement of the reverse link slotted channel 232 transmitted from a subscriber unit 14 during frame 12. The amount of such a delay can vary depending on the application.

A particular metric reflecting the power output level of transmitting antenna array 16-1 can be based on one or multiple parameters. For example, the metric can be based on a link quality measurement such as bit error rate or signal-to-noise ratio of a selected reverse link channel, or both. Generally, any suitable metric reflecting link quality can be used to generate feedback information to subscriber unit 14.

Antenna array 16-1 can multiplex transmissions in different directions such as along lobe A and lobe B to transmit during a reverse link frame. As shown, subscriber unit 14-1 transmits information in the selected reverse link channel through lobe B in frame 15 of the reverse link channel. Prior to transmission of data along lobe B during frame 15, data from subscriber unit 14-1 on the reverse link channel can be transmitted along lobe A for each of multiple frames 0-14. This 15:1 multiplexing ratio is merely exemplary and can modified depending on the application.

Feedback information transmitted on feedback channel 230 is received at subscriber unit 14 and, specifically, antenna array 16. The message is processed by processor 270 that, in turn, uses the feedback message to adjust aspects of antenna array 16. For example, based on feedback messages, processor 270 can generate control commands to adjust RF amplifier 210 and the power output level of subscriber unit 14.

Typically, the power output for data transmissions using lobe A and lobe B are equal or within 1 dB of each other. Similar to previous reverse link transmissions for frames 0-14, the power level or other suitable link quality metric of the received reverse link signal for the duration of frame 15 is measured at base unit 18. More specifically, signals transmitted by subscriber unit 14 in time slots of the reverse link slotted channel 232 can be received at base unit 18. As discussed the link quality of the received signal at base unit 18 can be detected by power level detector 365 or determined by a bit error rate of received signal data. Based on calculated link quality and a comparison of the received signal for previous lobe transmissions, processor 370 can generate feedback information that is transmitted to the subscriber unit 14 indicating which previous directional transmission from subscriber unit 14 produces a high quality received signal. In one application, an actual link quality metric calculated at base station 18 is communicated to subscriber unit 14 over a wireless channel.

Instead of processing a power measurement to generate a power control bit 220 and transmitting the power control bit 220 to a subscriber unit 14-1 in the feedback channel 230, base unit 18 can analyze a received signal for a new directional transmission and generate a lobe compare bit (LCB) 225 that is transmitted in forward link slot #1. As discussed for PCB bit 220, LCB bit 225 in forward link frame 1 is delayed so that base unit 18 can process information received in reverse link frame 15. A position of the frame in a sequence of periodically repeating frames can be used to identify the type of feedback message received.

Lobe compare bit 225 can provide a relative indication of the received power level or link quality on the reverse link channel 232 for multiple directional transmissions such as successive frames 14 and 15. For example, base unit 18 and, more specifically, antenna array interface 15 can separately measure a received link quality of reverse link channel 232 for frame 14 and, thereafter, frame 15. These link quality measurements for different lobe transmissions can be compared to each other by processor 370 to generate the lobe compare bit (LCB) 225. Thus, LCB bit 225 can be used to indicate which of the lobes, A or B, provides a stronger signal or better link quality. A logic "1" transmitted in feedback channel 230 can indicate that lobe B has a greater received power level than lobe A, while a logic "0" can indicate that lobe B has a lower received power level than lobe A. Thus, a corresponding subscriber unit 14 can be notified via feedback messages in the forward link channel which of multiple directional transmission of antenna device 16-1 is optimal for use. A subscriber unit 14 can then adjust its directional transmissions based on the LCB bit 225. More specifically, received feedback information can be used by processor 270 to generate commands that are in turn used by array controller 275 to adjust directional output beam 296 from antenna array 16.

Subscriber unit 14 or base station 18 can determine in which direction the occasional new lobe will be directed based on past experience and information stored in memory. Base unit 18 can send a message to base unit 18 indicating an experimental directional lobe or general antenna settings that are to be used for future directional transmissions.

As discussed, lobe compare bit 225 can be transmitted to a subscriber unit 16-1 in lieu of the power control bit 220 as transmitted in previous frames. Based on this method of providing dual-mode feedback, subscriber unit 14-1 can be notified which directional transmissions on antenna array 16-1 are optimal and, in addition, how the power output level of the antenna device 16-1 should be adjusted to maintain a link between the subscriber unit 14-1 and base unit 18. Future directional transmissions from antenna array 16-1 therefore can be based on lobe B when it is a more optimal path. Accordingly, when lobe B becomes the main transmission direction, its power level can be reduced via the power control bit 220 as previously discussed so that its output is optimized for system 10.

It should be noted that functionality provided by antenna array interface 15 can be duplicated in base unit 18 so that corresponding directional transmissions from the base unit 18 can be adjusted and monitored in a similar, but reverse manner as that previously discussed.

Directional transmissions based on multiplexing between lobes can be performed to sample potentially better wireless transmission paths to base unit 18. For example, alternate paths from subscriber unit 14-1 to base unit 18 can be tested periodically or intermittently whether they have a lower path loss and would otherwise support data transmissions at lower power levels.

In certain applications, power control bit 220 and lobe compare bit 225 information are transmitted to subscriber unit 14-1 via bit-puncturing on a corresponding assigned forward link traffic channel. Alternatively, each subscriber unit 14 can be assigned a time-slot or a data field of repeating time slots of a dedicated forward link CDMA channel to receive the power control bit 220 and lobe compare bit 225. Feedback messages are optimally tagged to identify their type.

According to other aspects of the present invention, multiple additional lobe positions can be compared with a base lobe setting, such as lobe A, to determine which of multiple possible directional antenna settings is optimal for subscriber unit 14-1 and communication system 10. For example, subscriber unit 14-1 can be set to transmit data on baseline lobe A from subscriber unit 14-1 to base unit 18. A received power level for lobe A and lobe B data transmissions can be compared as previously mentioned to determine which path or lobe provides a more optimal link between subscriber unit 14-1 and base unit 18. Other lobe settings such as lobe B, lobe C, lobe D and so on can be compared to baseline setting of lobe A to determine which if any of the new possible lobe settings can be used to transmit data more efficiently to base unit 18. It is anticipated, at least at times, that the power transmit level of a particular subscriber unit 14 can be reduced based on a new directional antenna setting. Accordingly, a new antenna setting can account for a changing position of a user or antenna array with respect to base unit 18 so that a wireless link is constantly maintained.

In a manner as previously mentioned, the additional power level compare information for multiple possible antenna or lobe settings can be transmitted to subscriber unit 14-1. Lobe compare bits 225 for multiple possible new antenna settings can be used by subscriber unit 14 to determine an optimal antenna setting on which information shall be transmitted to base unit 18.

Based on a comparison of multiple potential antenna settings with the baseline settings such as lobe A, subscriber unit 14-1 can optionally transmit information in a new direction or at a new power output level. Accordingly, a more precise determination as to which of the multiple lobe settings is optimal can be made prior to transmitting information on a new lobe setting. More specifically, multiple possible antenna settings can be considered before actually transmitting information based on a new setting. Two lobe settings such as lobe B and lobe C can be compared in multiple 20 mS cycles to determine which of the two antenna settings shall eventually be used to transmit data to base unit 18.

It should be noted that subscriber unit 14-1 can monitor multiple lobe compare bits 225 for two or more potential lobe settings before changing from one lobe setting to another. This ensures that the lobe settings are not changed unnecessarily. Consider a situation where a baseline lobe setting is unusually noisy for a short period of time. For instance, a lobe compare bit may erroneously indicate that one lobe setting is better than another due to sporadic noise on a particular frequency channel even though such a channel otherwise generally provides a good link between subscriber unit 14-1 and base unit 18. In this instance, it may not be desirable to switch to a new lobe setting until it is reasonably certain that the new lobe setting can sustain continued communications between the subscriber unit 14-1 and base unit 18 and that the new lobe setting is more optimal for future communications. A new lobe setting may unnecessarily interfere with another user.

When transmissions from a subscriber unit 14-1 in the reverse link will be switched to a new lobe setting, a message can be sent from the subscriber unit 14-1 to base unit 18 indicating these and other new antenna settings. In this way, base unit 18 can be apprised of the different lobe settings upon which information is transmitted from subscriber unit 14-1 to base unit 18. Thus, base unit 18 can keep track of the antenna array settings of various subscriber units 14 in communication system 10.

In one application, base unit 18 rather than individual subscriber units 14 determine how to set antenna parameters for directional transmissions of each of multiple subscriber units 14. For example, based upon the lobe compare information, base unit 18 can transmit a message to the corresponding subscriber unit 14 indicating an antenna setting that is to be used for transmitting data in the reverse link. In this way, a single central tracking unit and controller located at base unit 18 can determine antenna settings for multiple subscriber units 14 to optimize a use of wireless resources of communication system 10 in which the multiple subscriber units 14 compete for the allocation of wireless resources.

Antenna devices 16 of corresponding subscriber units 14 can also operate in an omni-directional transmission mode in which information is transmitted in all or multiple directions from a corresponding antenna array. More specifically, although lobe B shows a directional lobe pattern for transmitting data, a new directional lobe setting is optionally omni-directional or multi-directional. An omni-directional, multi-directional or narrowly-directional antenna setting can then be compared to any other type of antenna array setting as previously discussed.

Notably, it can be advantageous in some applications to initially transmit information in the reverse link to base unit 18 based on an omni-directional antenna setting because it is not known in which direction to initially transmit information to base unit 18. Thereafter, an optimal directional antenna array setting on which to transmit information can be determined using the above-mentioned method. In this way, a subscriber unit 14 initially transmitting information on a new reverse link channel can be set to transmit in an omni-directional mode until a more efficient or directional lobe is determined. Data can be transmitted in quadrants or the like until an optimal narrow beam width antenna setting is determined.

It can be determined via the use of lobe compare bit 225 that the orientation or position of a subscriber unit's 14 corresponding antenna device 16 changes frequently. In certain instances, an omni-directional antenna setting may be the most efficient setting for establishing a wireless link between a subscriber unit 14 and base unit 18.

An omni-directional antenna setting can also be advantageously used in hard hand-offs between one base unit 18 and another. For instance, a subscriber unit 14-1 can maintain a continuous connection with a hardwired network on the ground, but via a new base station at a different location.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method comprising:
monitoring wireless transmissions, at least two of which are based on different directional transmissions from a transmitter;
generating a first type of feedback messages to control a power output level of the transmitter;
generating a second type of feedback messages to indicate which of the at least two different directional transmissions from the transmitter supports a higher quality received signal;
communicating the first and second type of feedback messages over a shared feedback channel to adjust settings of the transmitter;
partitioning the shared feedback channel into multiple repeating sequences of frames; and
communicating either a first or second type of feedback message in a frame of the shared feedback channel depending on a position of the frame in a sequence of periodically repeating frames.

2. The method as in claim 1 further comprising:
in a first frame of the shared feedback channel, transmitting a first type of feedback message, and
in a frame contiguous with the first frame, transmitting a second type of feedback message.

3. The method as in claim 2, wherein at least one of the first type of feedback message or the second type of feedback message is a single bit.

4. The method as in claim 2, wherein the first type of feedback message is a power control bit.

5. The method as in claim 2, wherein the second type of feedback message is a lobe control bit.

6. The method as in claim 1 further comprising:
partitioning a data channel into frames in which data information is transmitted; and
for two successive frames of the data channel, generating two different directional transmissions from the transmitter.

7. The method as in claim 6 further comprising:
receiving a feedback message at the transmitter indicating which of the two different directional data transmissions results in a higher quality received signal.

8. A method comprising:
monitoring wireless transmissions, at least two of which are based on different directional transmissions from a transmitter;
generating a feedback message of a first type to control a power output level of the transmitter;
generating a feedback message of a second type to indicate which of the at least two different directional transmissions from the transmitter supports a higher quality received signal; and
communicating the feedback message of the first type and the feedback message of the second type over a feedback channel to adjust settings of the transmitter, wherein
the feedback channel is partitioned into a repeating sequence of frames; and
each of the feedback messages is communicated in a frame of the repeating sequence of frames, wherein a position of that frame in the repeating sequence of frames is used to identify the type of each of the feedback messages.

9. The method as in claim 8 wherein the feedback channel is a shared feedback channel.

* * * * *